(12) United States Patent
Nachtigall-Fournier et al.

(10) Patent No.: US 12,279,593 B2
(45) Date of Patent: Apr. 22, 2025

(54) ANIMAL WASHING SYSTEM

(71) Applicant: Puppywash, Inc., Palos Verdes Peninsula, CA (US)

(72) Inventors: Jasmine Emmei Nachtigall-Fournier, Rolling Hills, CA (US); Gary Matthew Fournier, Rolling Hills, CA (US); Dawid Bogdal, Santa Clara, CA (US); John Stewart Caldwell, San Jose, CA (US)

(73) Assignee: Puppy Wash, Inc., Palos Verdes Peninsula, CA (US)

( * ) Notice: Subject to any disclaimer, the term of this patent is extended or adjusted under 35 U.S.C. 154(b) by 153 days.

(21) Appl. No.: 17/959,926

(22) Filed: Oct. 4, 2022

(65) Prior Publication Data

US 2023/0122984 A1    Apr. 20, 2023

Related U.S. Application Data

(60) Provisional application No. 63/310,892, filed on Feb. 16, 2022, provisional application No. 63/256,088, filed on Oct. 15, 2021.

(51) Int. Cl.
*A01K 13/00* (2006.01)

(52) U.S. Cl.
CPC .................. *A01K 13/001* (2013.01)

(58) Field of Classification Search
CPC ..... A01K 13/00; A01K 13/001; A01K 1/0047
See application file for complete search history.

(56) References Cited

U.S. PATENT DOCUMENTS

| | | | |
|---|---|---|---|
| 1,760,017 A | 5/1930 | Ellen | |
| 3,023,734 A | 3/1962 | Schaub | |
| 4,057,032 A * | 11/1977 | Dimitriadis | ............ A61D 11/00 |
| | | | 119/671 |
| 4,228,765 A | 10/1980 | Berlin | |
| 4,535,601 A | 4/1985 | Newell, Jr. et al. | |
| 4,930,453 A | 6/1990 | Laliberte | |
| 5,448,966 A * | 9/1995 | McKinnon | ........... A01K 13/001 |
| | | | 119/676 |

(Continued)

FOREIGN PATENT DOCUMENTS

| | | | | |
|---|---|---|---|---|
| CA | 3109975 A1 * | 9/2021 | ........... A01K 13/001 |
| CN | 205567424 U | 9/2016 | | |

(Continued)

OTHER PUBLICATIONS

"IClean Dog Wash", retrieved on Oct. 4, 2022, 4 pages. https://icleandogwash.com.

(Continued)

*Primary Examiner* — Ebony E Evans
(74) *Attorney, Agent, or Firm* — Lowenstein Sandler LLP

(57) ABSTRACT

An animal washing system includes an enclosure structure forming an interior volume. An animal is to be located at least partially in the interior volume. The animal washing system further includes spray devices and valves. The spray devices are configured to wash the animal. Each valve is configured to selectively provide fluid to a corresponding spray device to wash the animal. The animal washing system further includes a controller configured to selectively actuate each valve to wash the animal.

15 Claims, 23 Drawing Sheets

(56) References Cited

U.S. PATENT DOCUMENTS

| | | | |
|---|---|---|---|
| 5,662,069 A * | 9/1997 | Smith | A01K 13/001 119/673 |
| 5,671,697 A | 9/1997 | Rutman | |
| 5,794,570 A | 8/1998 | Foster | |
| 8,061,304 B1 | 11/2011 | Ramsay | |
| 2002/0040500 A1 | 4/2002 | Noguchi | |
| 2003/0196608 A1* | 10/2003 | Lee | A01K 13/001 119/651 |
| 2005/0263091 A1 | 12/2005 | Knapp | |
| 2006/0102096 A1 | 5/2006 | Cho | |
| 2007/0039559 A1 | 2/2007 | Foster | |
| 2007/0079766 A1 | 4/2007 | Park | |
| 2007/0289548 A1* | 12/2007 | Smoot | A01K 13/001 119/668 |
| 2011/0132274 A1* | 6/2011 | Cagle | A01K 1/034 119/501 |
| 2012/0048209 A1 | 3/2012 | Tarbutton | |
| 2013/0263794 A1* | 10/2013 | Knurr | A01K 7/06 119/475 |
| 2014/0216356 A1 | 8/2014 | Glover | |
| 2015/0189857 A1 | 7/2015 | Qirjazi | |
| 2015/0230428 A1 | 8/2015 | Fussell, Jr. | |
| 2016/0128302 A1* | 5/2016 | Stauber | A01K 13/001 119/671 |
| 2016/0288142 A1 | 10/2016 | Johnson | |
| 2018/0077900 A1* | 3/2018 | Kang | A01K 13/001 |
| 2019/0021280 A1 | 1/2019 | DeMaster | |
| 2020/0100464 A1* | 4/2020 | Kim | A01K 15/04 |
| 2020/0100465 A1* | 4/2020 | Kim | A01K 13/001 |
| 2020/0100466 A1* | 4/2020 | Kim | A01K 13/001 |
| 2020/0113153 A1 | 4/2020 | Yoo | |
| 2021/0100214 A1 | 4/2021 | Arnott | |
| 2021/0274751 A1 | 9/2021 | Ohanian | |
| 2023/0122984 A1 | 4/2023 | Nachtigall-Fournier et al. | |
| 2023/0263134 A1 | 8/2023 | Parker | |

FOREIGN PATENT DOCUMENTS

| | | |
|---|---|---|
| CN | 108464256 A | 8/2018 |
| CN | 114985129 A | 9/2022 |
| GB | 2339666 A | 2/2000 |
| KR | 20130006497 U | 11/2013 |
| KR | 20200071536 A | 6/2020 |
| KR | 20210097284 A | 8/2021 |
| WO | 2021219983 A1 | 11/2021 |

OTHER PUBLICATIONS

"Evolution dog wash", retrieved on Oct. 4, 2022, 3 pages. https://evolutiondogwash.com.

"New Home Pet Spa", retrieved on Oct. 4, 2022, 2 pages. https://web.archive.org/web/20220126233524/https:/homepetspa.com.

"Barkbath dual use portable dog bathdeep cleaning system", retrieved on Oct. 4, 2022, 9 pages. https://www.bissell.com/barkbath-dual-use-portable-dog-bathdeep-cleaning-system-2592.html.

"Aquapaw", retrieved on Oct. 4, 2022, 8 pages. https://www.aquapaw.com/collections/all.

"PetEdge.Groomer Stylist", retrieved on Oct. 4, 2022, 7 pages. https://www.petedge.com/brands/master-equipment?p=2&product_list_dir=desc&product_list_order=price.

Amazon, com, "Oster Deluxe Pet Power Bathing System for Professional Grooming". Retrieved on Oct. 4, 2022, 8 pages, https://www.amazon.com/Oster-Deluxe-Bathing-Professional-Grooming/dp/B000LRN1DK.

Amazon.com, "Waterpik PPR-252E Pet Wand Pro Shower Sprayer Attachment, 1.8 GPM, for Fast and Easy at Hom Dog Cleaning, Blue/Grey". Retrieved on Oct. 4, 2022, 11 pages, https://www.amazon.com/Waterpik-PPR-252E-Sprayer-Attachment-Cleaning/dp/B088GTZ57S.

Amazon.com, "Aquapaw Dog Bath Brush—Sprayer and Scrubber Tool in One—Indoor/Outdoor Dog Bathing Supplies Pet Grooming for Dogs or Cats with Long and Short Hair—Dog Wash with Hose and Shower Attachment". Retrieved on Oct. 4, 2022, 13 pages. https://www.amazon.com/Aquapaw-Bathing-Scrubber-Compatible-Grooming/dp/B06Y3QSGWP.

Amazon.com, "Bissell Barkbath Dual Use 2-in-1 Portable Dog Bath and Carpet & Upholstery Cleaner". Retrieved on Oct. 4, 2022, 12 pages. https://www.amazon.com/Bissell-BARKBATH-Portable-Cleaner-2592/dp/B07YLDNM1P?th=1.

Amazon.com, "Booster Bath Elevated Pet Bathing". Retrieved on Oct. 4, 2022, 12 pages. https://www.amazon.com/Booster-Bath-Elevated-Bathing-Large/dp/B01K8AAJNE?th=1.

Amazon.com, "Furesh Elevated Folding Dog Bath Tub and Wash Station". Retrieved on Oct. 4, 2022, 13 pages. https://www.amazon.com/Furesh-Elevated-Grooming-Foldable-Portable/dp/B0858ZL2P1/ref=sr_1_1?dchild=1&keywords=Furesh%2BElevated%2BFolding%2BDog%2BBath%2BTub%2Band%2BWash%2BStation&qid=1619740356&s=pet-supplies&sr=1-1&th=1.

Amazon.com, "Pet Wash Enclosure with Splash Guard, Wheels & Removable Shelf". Retrieved on Oct. 4, 2022, 6 pages. https://www.amazon.com/Pet-Enclosure-Splash-Wheels-Removable/dp/B00ZYTVHZE/ref=sr_1_2?dchild=1&keywords=Home+Pet+Spa&qid=1619740555&sr=8-2.

Amazon.com, "Master Equipment Poly/Pro Dog Grooming Tub". Retrieved on Oct. 4, 2022, 7 pages. https://www.amazon.com/Master-Equipment-PolyPro-Dog-Grooming/dp/B004WP8TEI/ref=sr_1_1?dchild=1&keywords=Master+Equipment+PolyPro+Grooming+Tub&qid=1619740377&s=pet-supplies&sr=1-1.

Amazon.com, Master Equipment White PolyPro Motor Lift Grooming Tub for Heavy Pets Up to 220 Lbs—Unit Measures 58"x30.75"x49.5". Retrieved on Oct. 4, 2022, 8 pages. https://www.amazon.com/Master-Equipment-Poly-Grooming-Purple/dp/B00HWZVV54/ref=sr_1_2?dchild=1&keywords=Master+Equipment+PolyPro+Lift+Grooming+Tub&qid=1619740411&s=pet-supplies&sr=1-2.

International Search Report and Written Opinion received for PCT International Application No. PCT/US2022/046256.

International Search Report and Written Opinion received for PCT International Application No. PCT/US2024/015432.

* cited by examiner

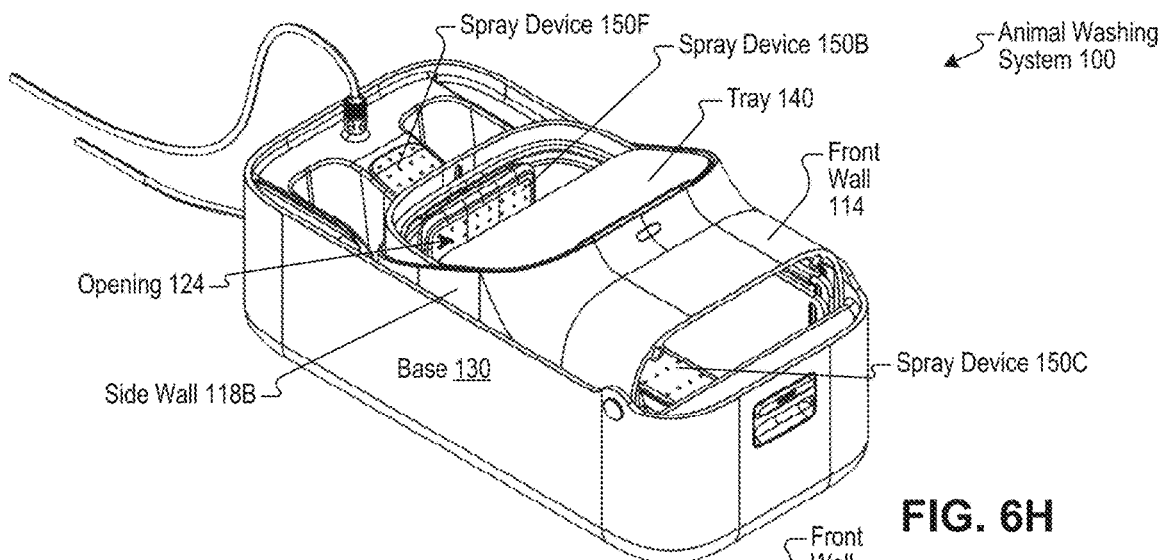
FIG. 6H
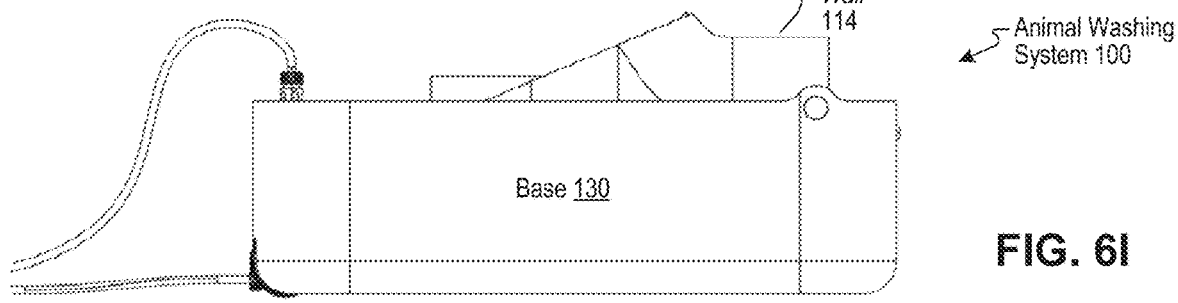
FIG. 6I
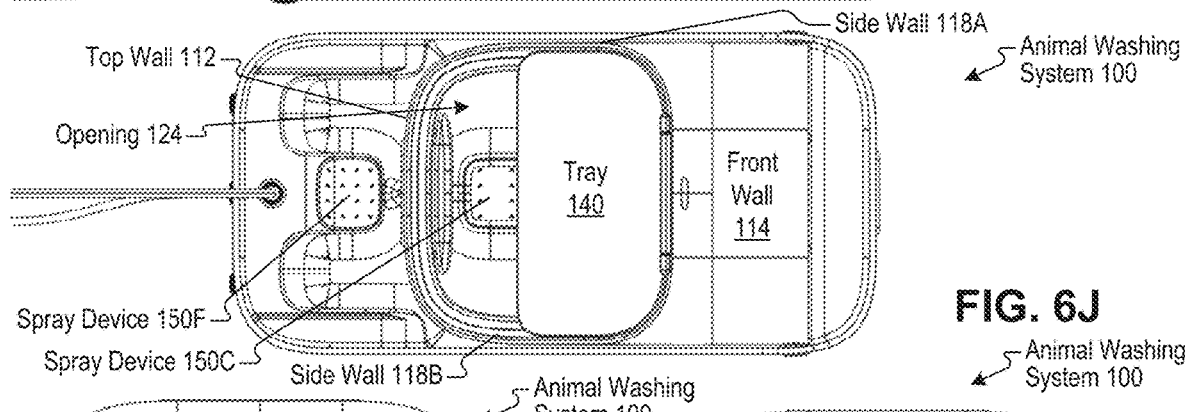
FIG. 6J
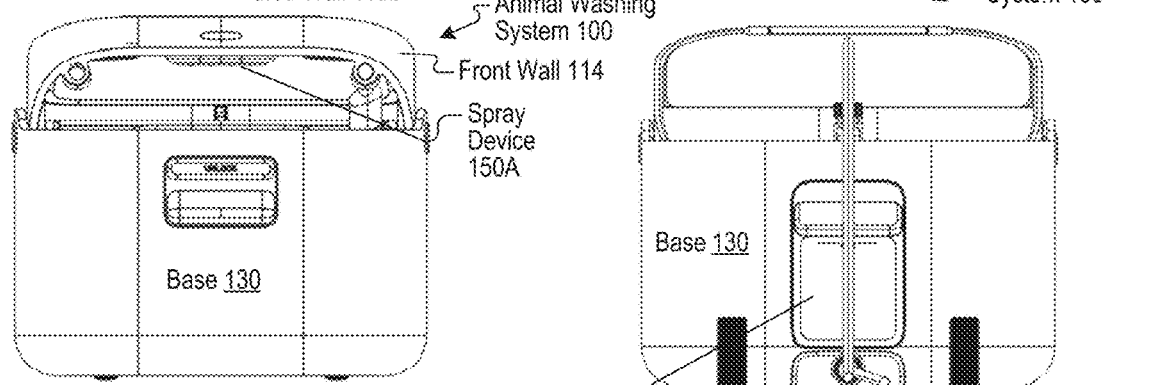
FIG. 6K
FIG. 6L

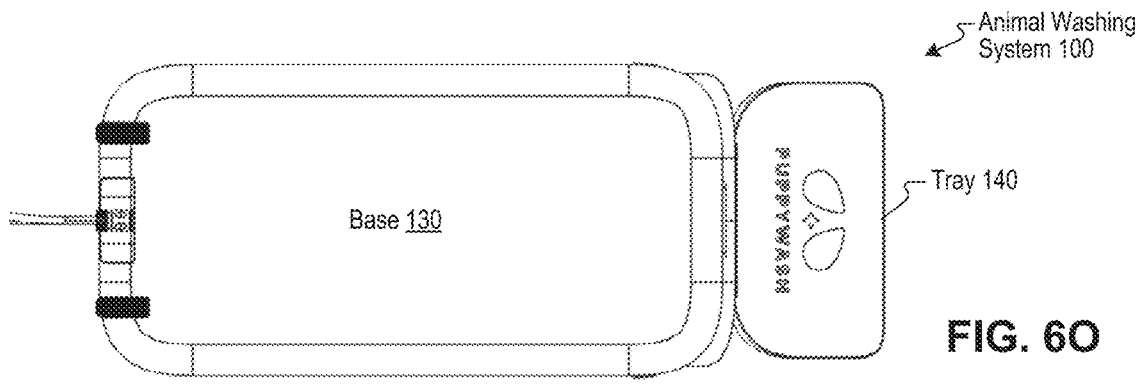
FIG. 6O
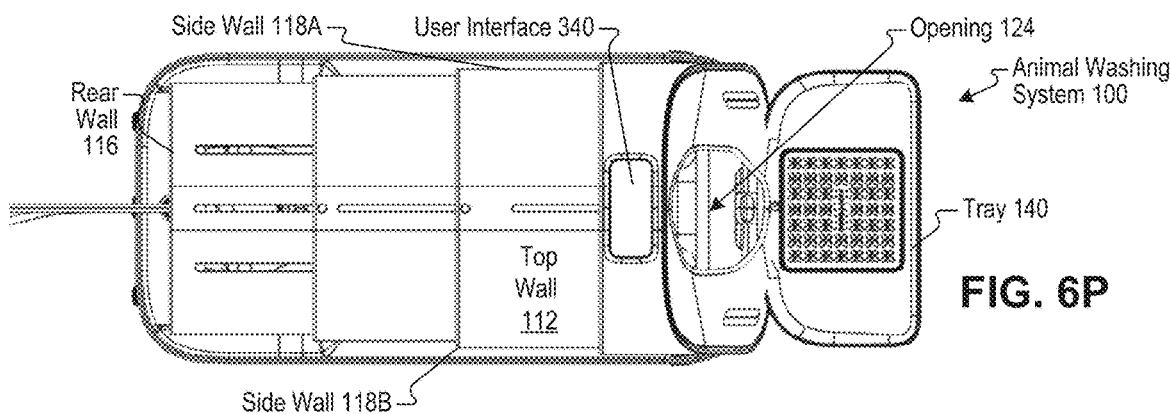
FIG. 6P
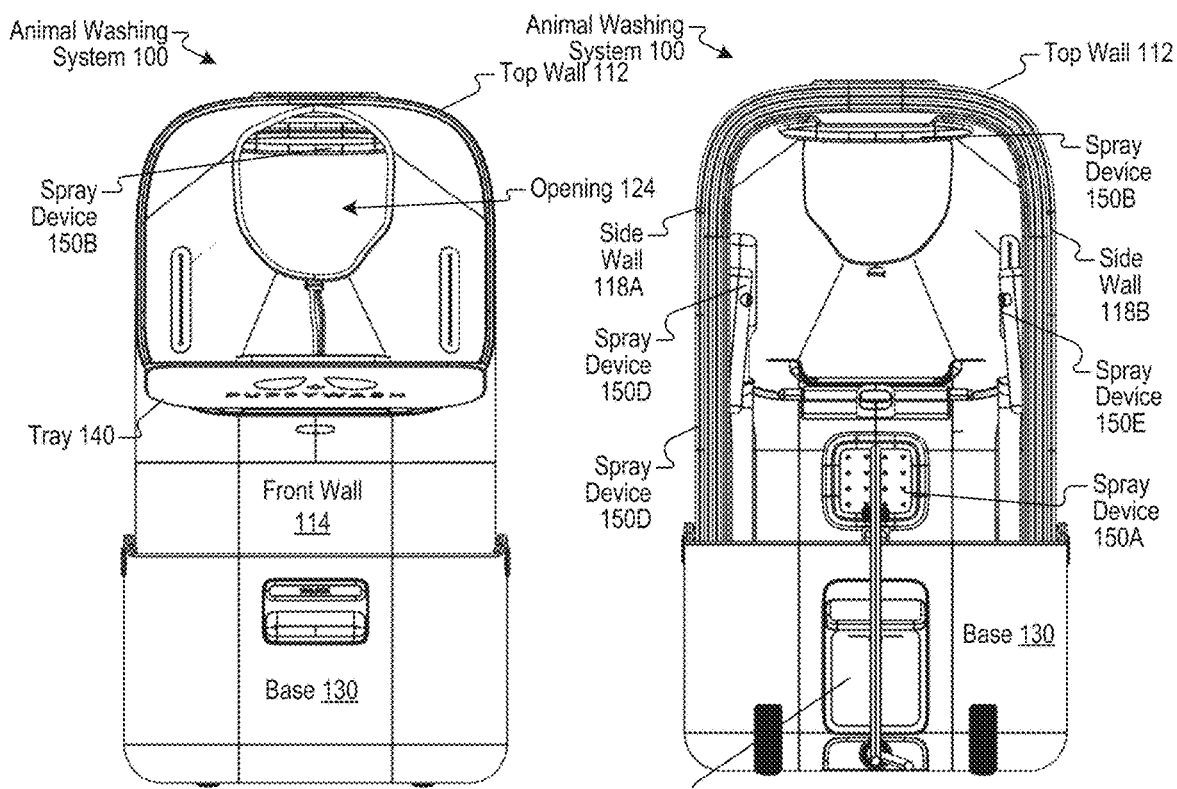
FIG. 6Q
FIG. 6R

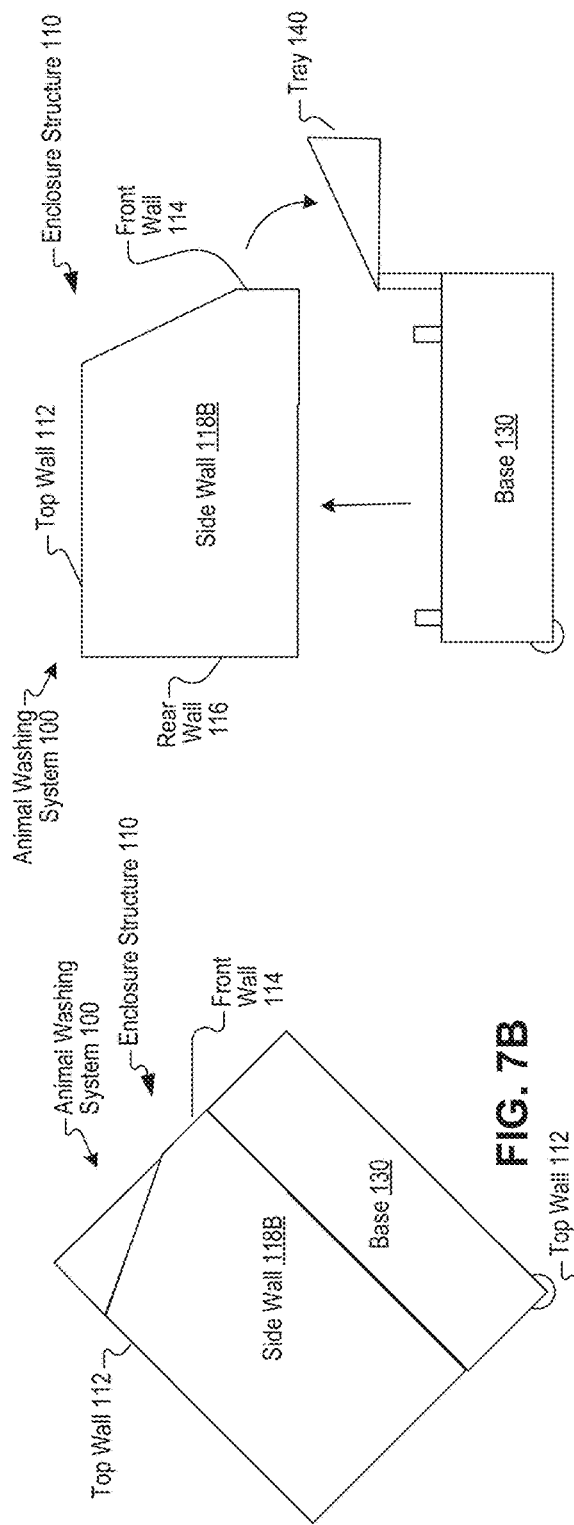
FIG. 7B
FIG. 7C
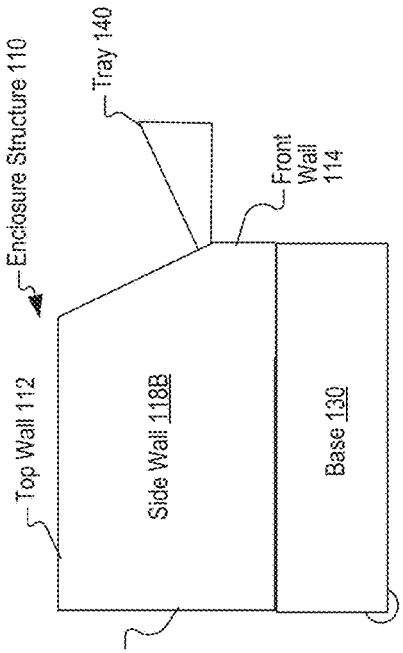
FIG. 7E
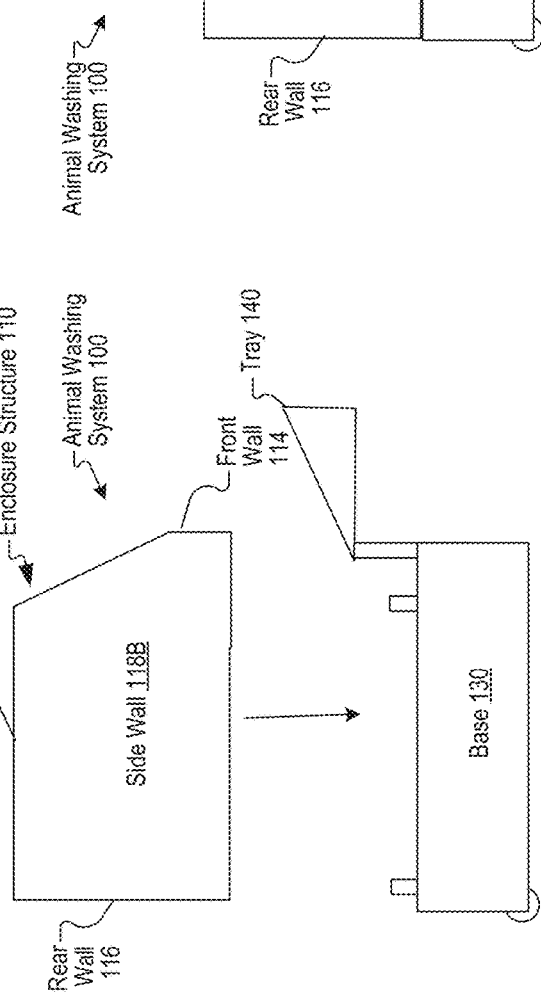
FIG. 7D

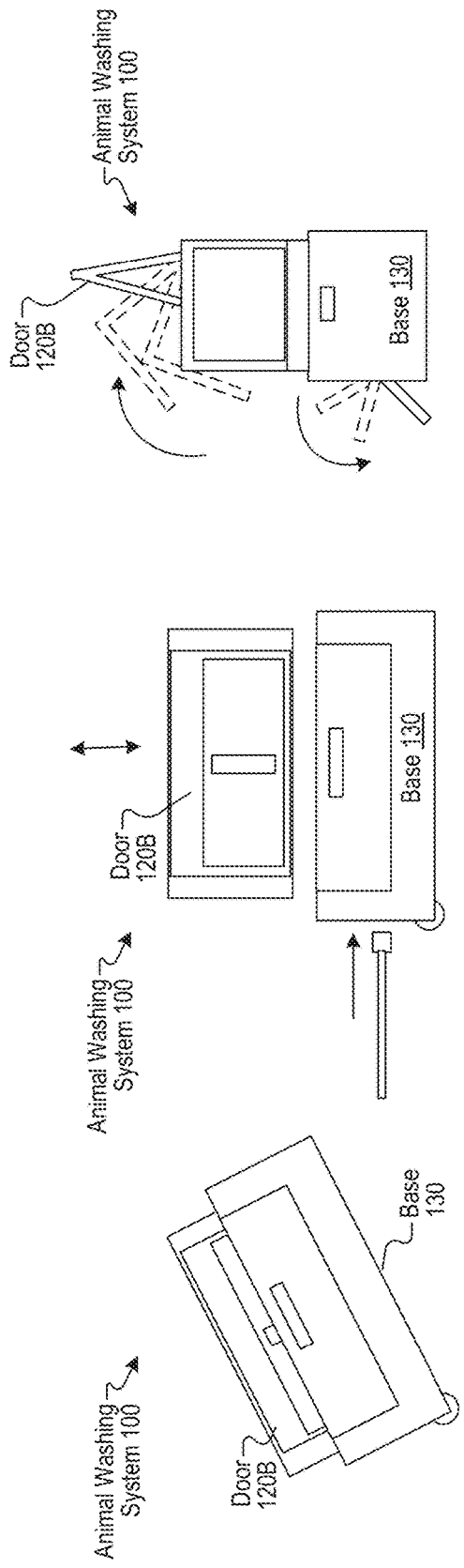
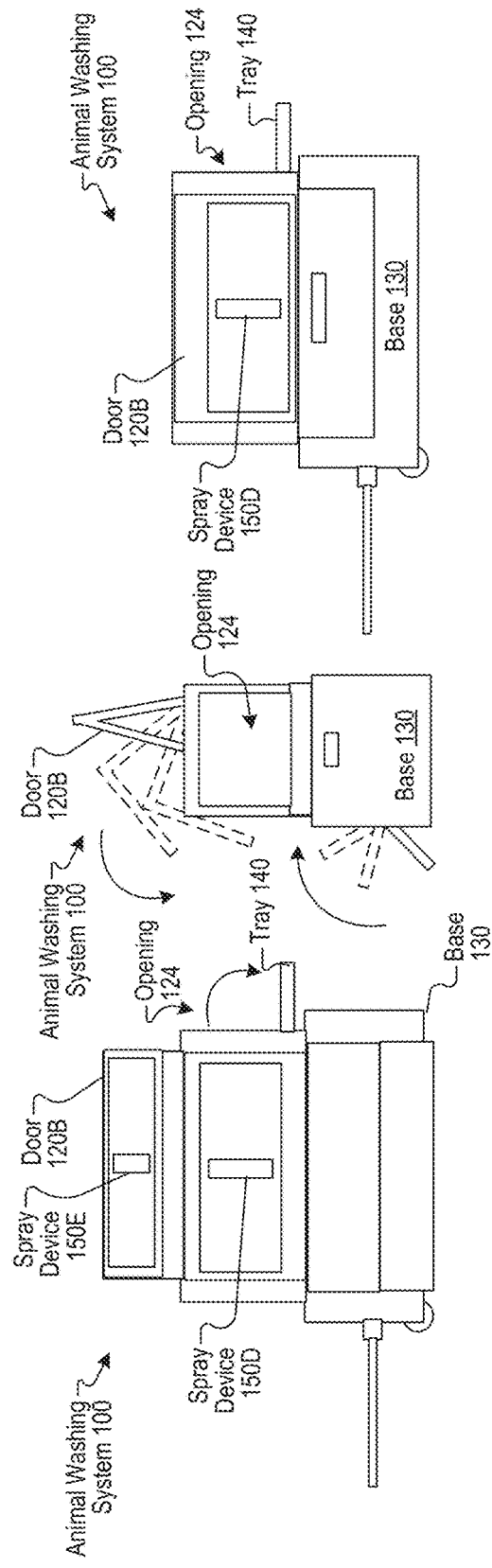

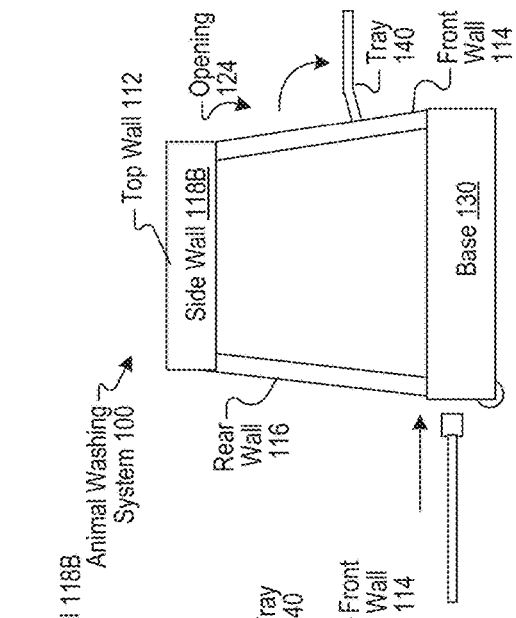
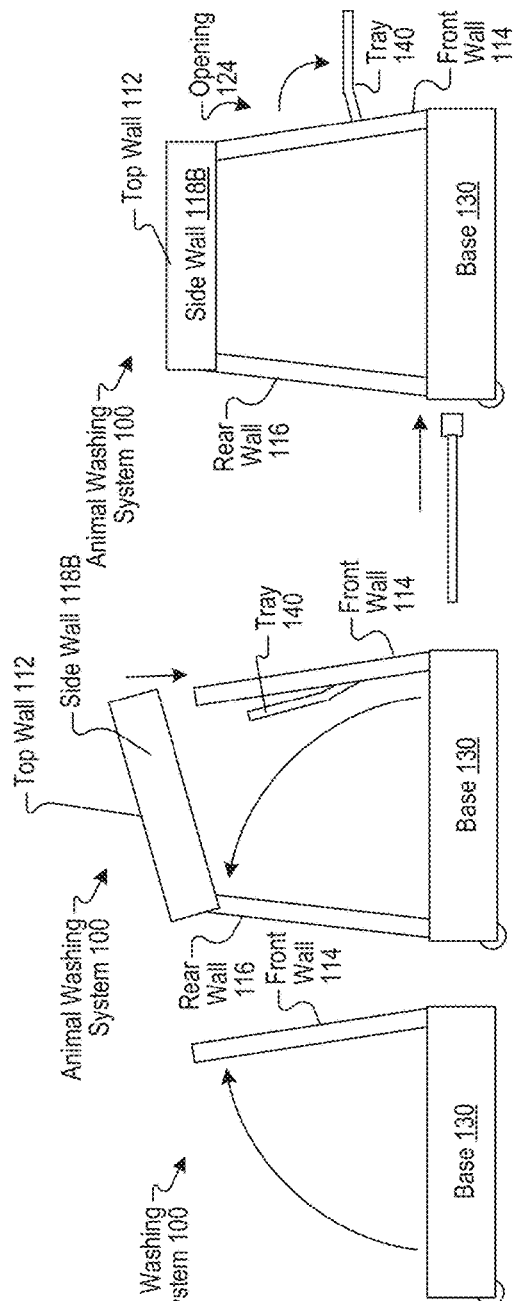
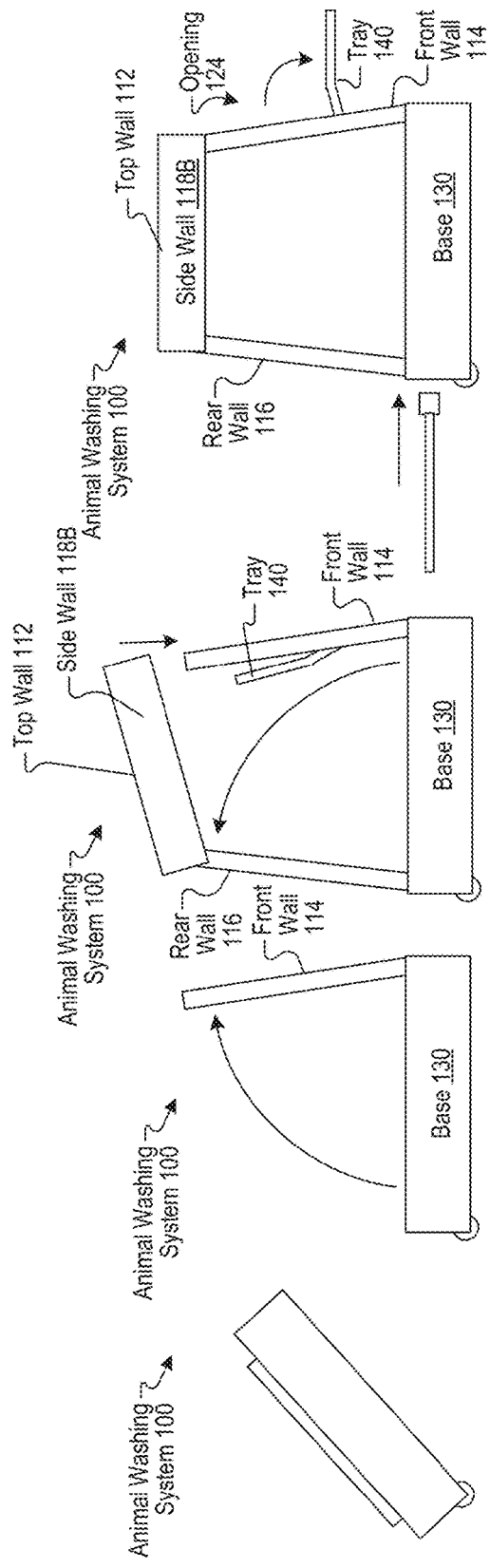
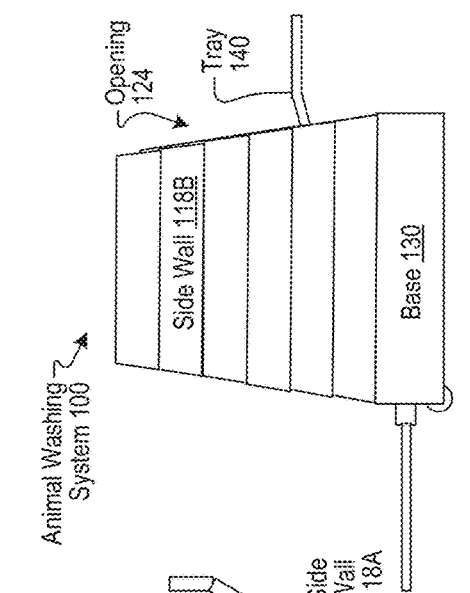
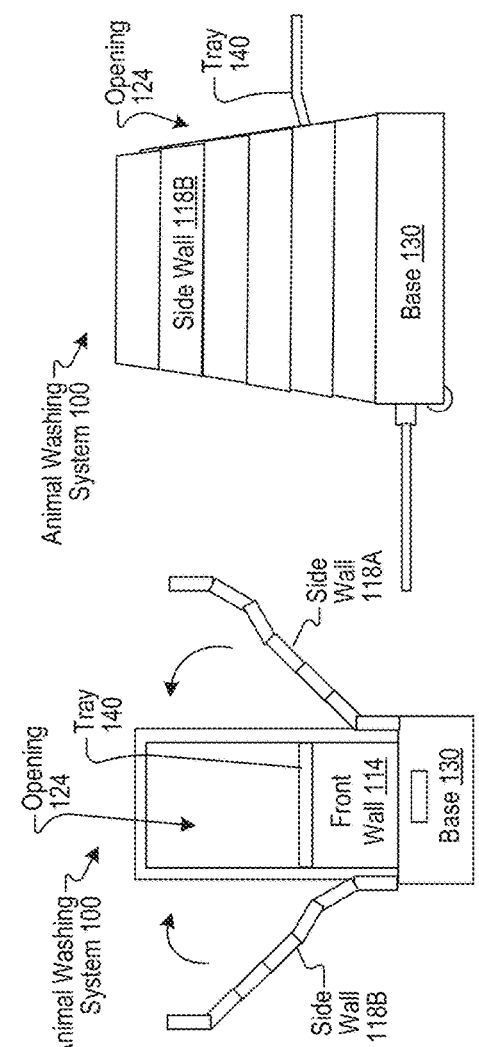
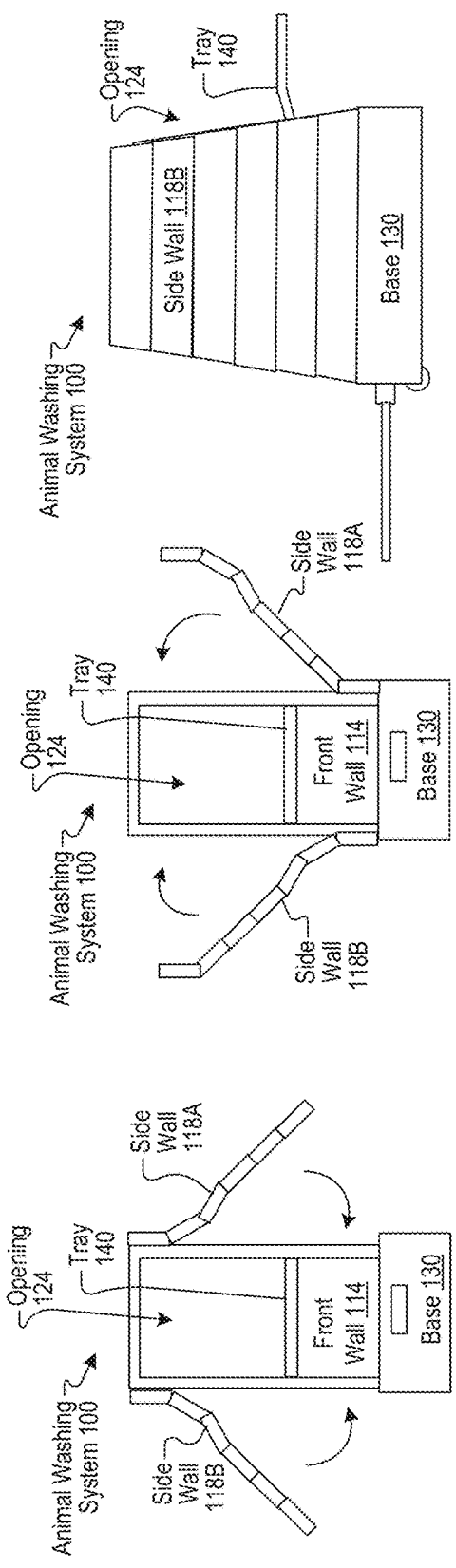

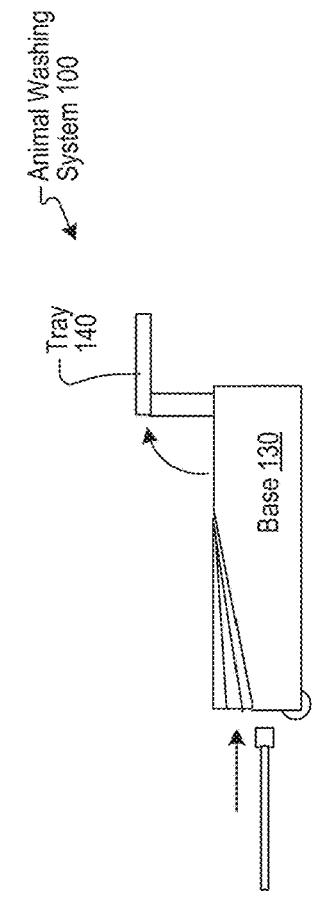
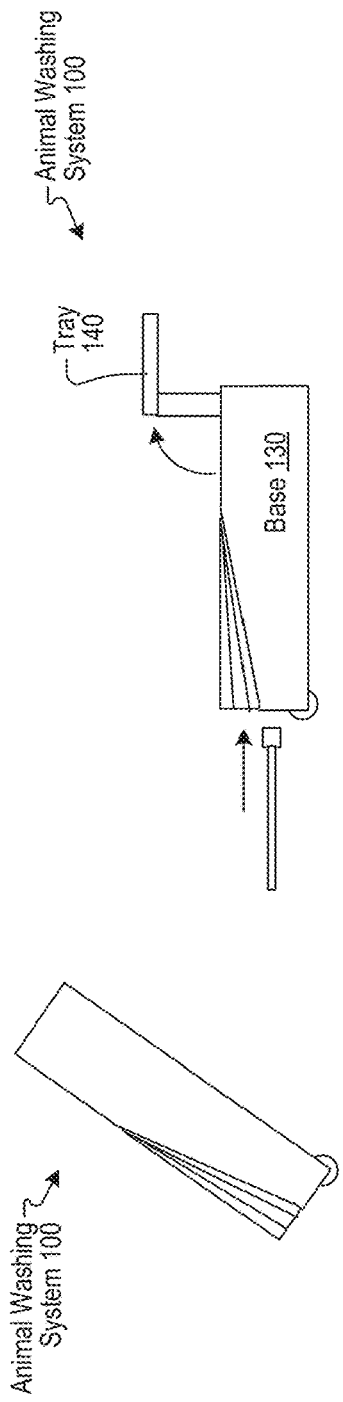
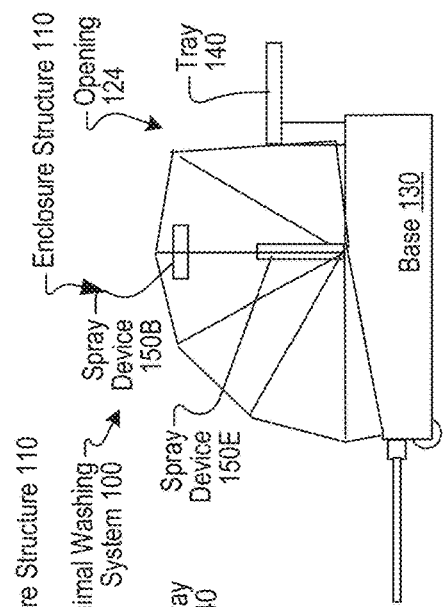
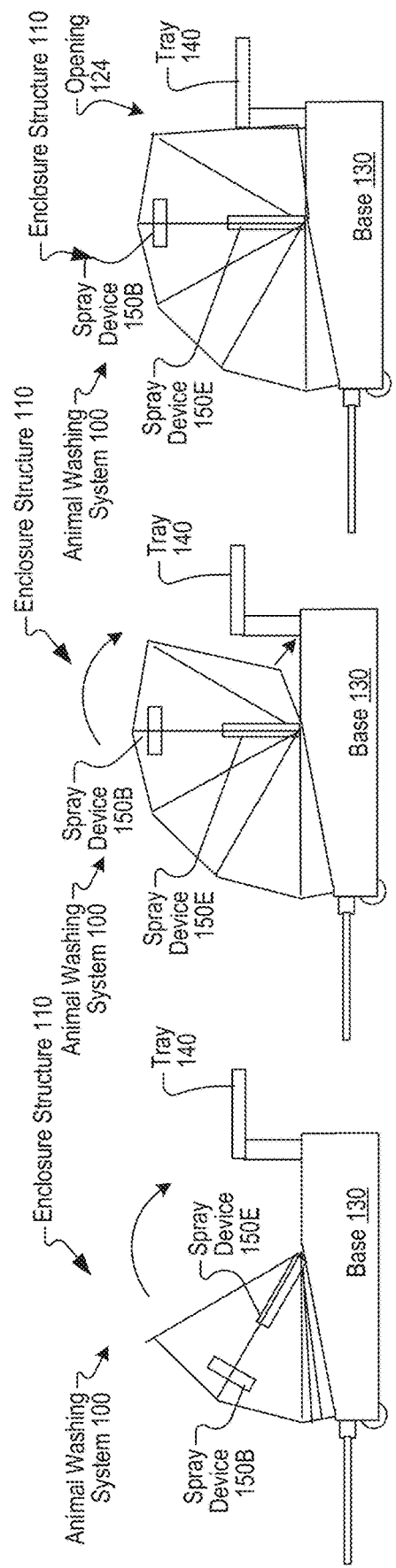
FIG. 10B
FIG. 10C
FIG. 10D
FIG. 10E
FIG. 10F

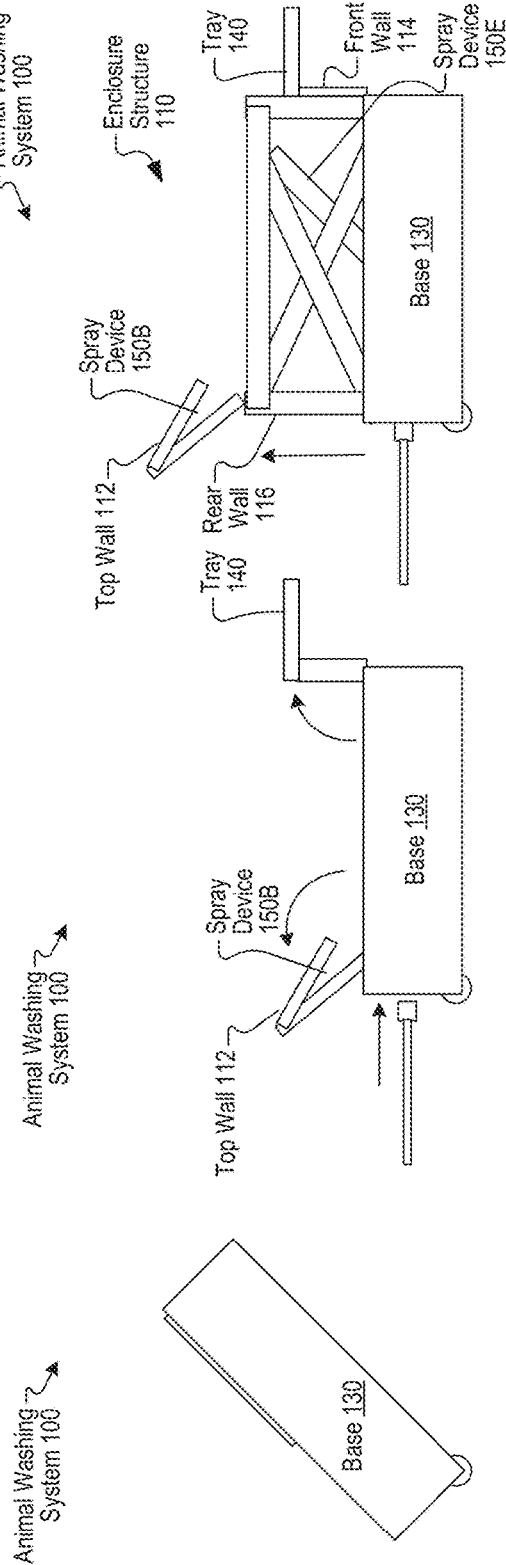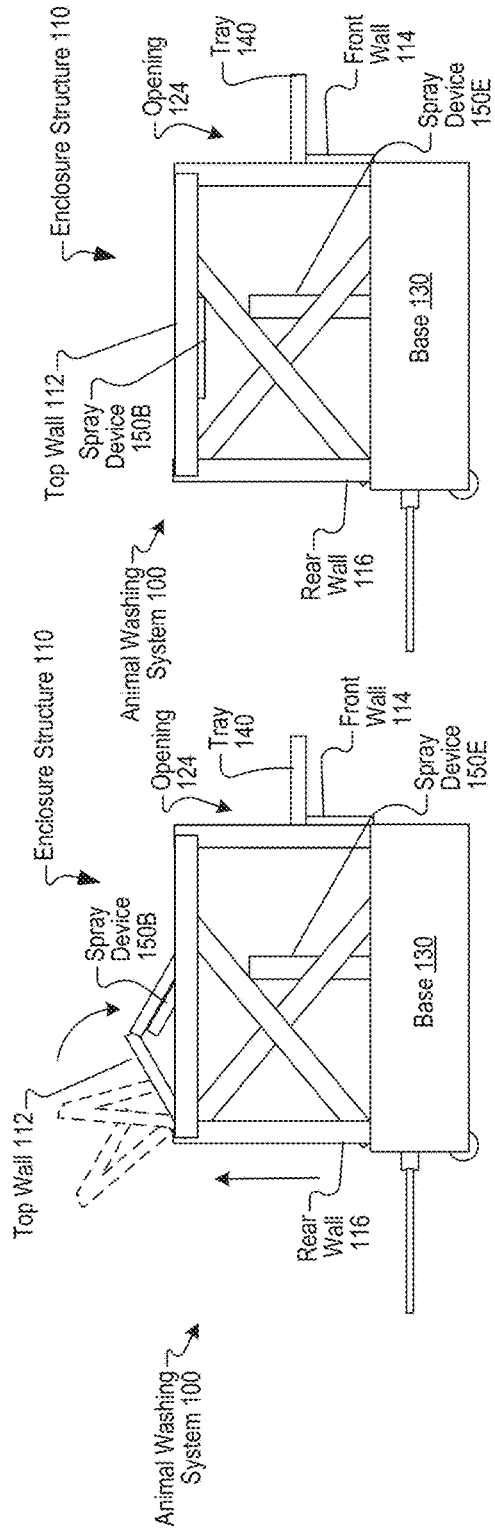

ANIMAL WASHING SYSTEM

RELATED APPLICATIONS

This application claims the benefit of U.S. Provisional App. No. 63/256,088, filed Oct. 15, 2021, and U.S. Provisional App. No. 63/310,892, filed Feb. 16, 2022, the entire contents of which are incorporated by reference.

TECHNICAL FIELD

Embodiments of the present disclosure relate to washing systems, and in particular to animal washing systems.

BACKGROUND

Grooming is part of the well-being and healthiness of animals, which can improve the quality of life of animals. Grooming includes washing (e.g., bathing) of an animal. An animal can be washed in a sink, in a walk-in shower, in a bathtub, outdoors using a hose, etc.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIGS. 7A-E illustrate views of animal washing systems that have a pod archetype, according to certain embodiments.

FIGS. 8A-G illustrate views of animal washing systems that have a gullwing archetype, according to certain embodiments.

FIGS. 9A-H illustrate views of animal washing systems that have a frame archetype, according to certain embodiments.

FIGS. 10A-F illustrate views of animal washing systems that have an armadillo archetype, according to certain embodiments.

FIGS. 11A-F illustrate views of animal washing systems that have a lift archetype, according to certain embodiments.

DETAILED DESCRIPTION OF EMBODIMENTS

Figure 1A:
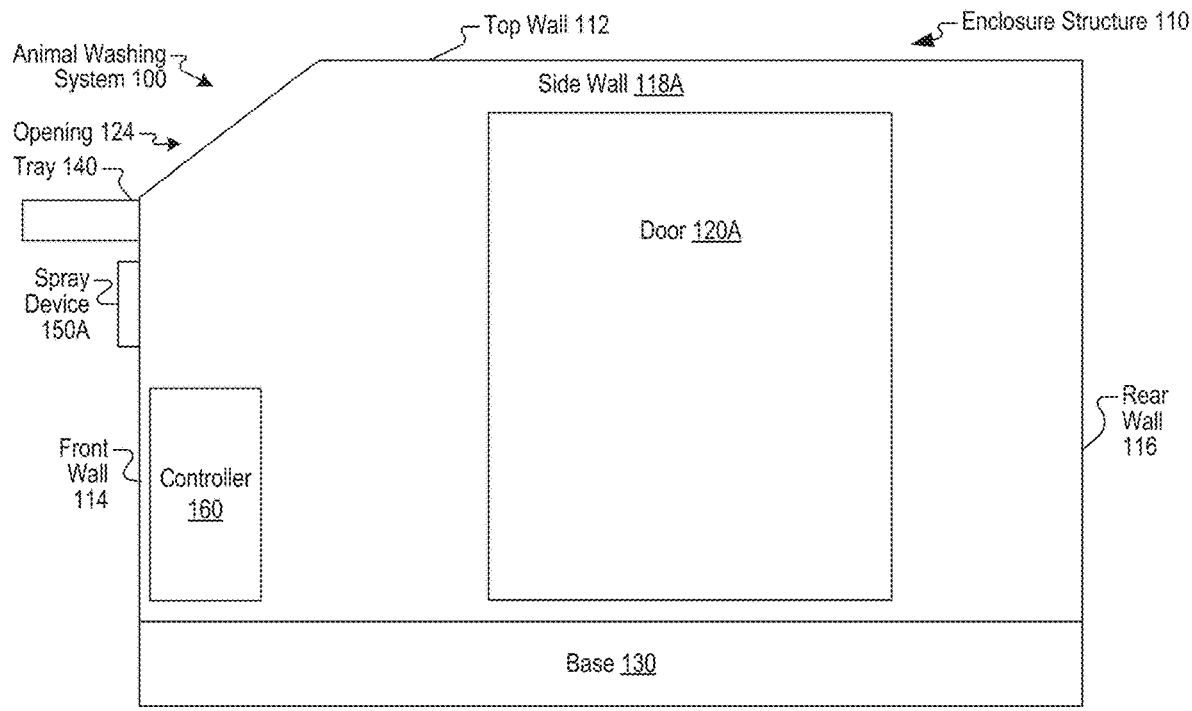
FIGS. 1A-D illustrate views of animal washing systems, according to certain embodiments.

Embodiments described herein are related to animal washing systems (e.g., dog washing systems).

Grooming is part of the well-being and healthiness of animals and improves the quality of life of animals. Grooming includes washing (e.g., bathing).

Conventionally, animals, such as dogs, are washed by hand in a bathtub, sink, walk-in shower, or outside. Washing animals can dirty and cause damage to the inside of a house and can dirty and injure the person washing the animal. Washing animals outside can expose the animal and person washing the animal to adversely cold temperatures (e.g., water and/or air may be cold enough to cause hypothermia). Washing animals with heated water from a faucet can expose the animal and person washing the animal to adversely hot temperatures (e.g., hot water can scald the skin). Given the difficulties of washing animals, animals may go long periods of time without being washed, leading to poor well-being, poor health, and decreased quality of life.

The devices, systems, and methods of the present disclosure provide animal washing systems. In some embodiments, animal washing system includes an enclosure structure that forms an interior volume. (In some embodiments, animal washing system does not include an enclosure structure that forms an interior volume.) An animal is to be disposed at least partially in the interior volume of the enclosure structure. In some embodiments, a dog enters through a door (e.g., side door, rear door) of the enclosure structure and sticks its head through an opening formed by the enclosure structure so that the entire body of the dog is in the interior volume of the enclosure structure except for the head of the dog which extends out of the enclosure structure. In some embodiments, a dog enters the base of the animal washing system 100 and an enclosure structure is placed or extended over the dog. In some embodiments, the enclosure structure has one or more portions that are open (e.g., the user can keep the back and/or front open, without any closure structure). Spray covers may also be used at one or more portions of the animal washing system (e.g., the front and/or back of the device).

The animal washing system includes spray devices (e.g., shower heads) configured to wash the animal. In some embodiments, the animal washing system includes a top spray device, a bottom spray device, a first side spray device, a second side spray device, and/or a front spray device (e.g., and/or a third and fourth side spray device and a rear spray device). The front spray device may be directed at the chest (e.g., and underside) of the animal. In some embodiments, the front spray device may be detachable to spray the head of the animal that is outside of the enclosure structure. In some embodiments, the spray devices include a rear sprayer (e.g., back sprayer) that sprays the backside of the animal.

The animal washing system includes valves. Each valve selectively provides fluid (e.g., water, soap, water and soap mixture, etc.) to a corresponding spray device to wash the animal. The animal washing system further includes a controller configured to selectively actuate each valve to wash the animal. The controller may control the valves in cycles (e.g., a schedule of which valves are to be actuated at different times, valves are toggled to provide different amounts of spray). In some embodiments, a spray device slowly comes on (e.g., slowly provides greater and greater pressure of spray, valve slowly opens), stays at full (e.g., provides full pressure of spray, valve completely open, valve partially open to reduce pressure for comfort, etc.), and slowly turns off (e.g., slowly provides less and less pressure of spray, valve slowly closes). In some embodiments, while, before, or after the spray device slowly turns off, another spray device slowly turns on (e.g., cross fade into next sprayer).

In some embodiments, the controller controls the valves in a first cycle to cause fluid to spray on the animal from the top spray device and the bottom spray device. The controller then controls the valves in a second cycle to cause fluid to spray on the animal from the first side spray device and the second side spray device. In some embodiments, the controller then controls the valves in a third cycle to cause fluid to spray on the animal from the third side spray device and the fourth side spray device. The controller then controls the valves in a fourth cycle to cause fluid to spray on the animal from the top spray device and the bottom spray device. The cycles may include: 1) top sprayer; 2) upper left and upper right sprayer; 3) lower left and lower right sprayer; 4) front and rear sprayer.

In some embodiments, the animal washing system includes a fluid reservoir that can be filled with one or more fluids, such as shampoo, soap, conditioner, perfume, etc. Water mixes with the one or more fluids and the water-fluid mixture is sprayed onto the animal via the spray devices. In some embodiments, the animal washing system includes a heating device (e.g., instant water heater) that heats the water that is to be sprayed onto the animal (e.g., prior to the water being mixed with the one or more fluids). In some embodiments, the animal washing system includes a pressure device (e.g., pump) that increases the pressure of the water that is to be sprayed onto the animal (e.g., prior to the water being mixed with the one or more fluids, prior to the water being heated, etc.). In some embodiments, gas (e.g., hot air) is blown through the sprayers to dry the animal. In some embodiments, a drying device (e.g., warm air generator, air heater, air pump) is used to provide the heated air through the sprayers to dry the animal. In some embodiments, air is provided through the spray devices at a higher pressure than liquid provided through the spray devices.

The systems, devices, and methods of the present disclosure have advantages over conventional solutions. The animal washing system of the present disclosure can be used in a bathtub, walk-in-shower or any interior area that has a water supply and drainage (e.g., bathroom floor that has a drain, etc.), or outside without causing the mess and damage of conventional solutions. The controller of the animal washing system of the present disclosure causes automation of animal washing which prevents time, dirtying, and injury of a person of conventional solutions. The animal washing system of the present disclosure can use less water, shampoo, and time compared to conventional solutions. The animal washing system of the present disclosure can cause less stress to animals (e.g., which decreases animal aversion to washing) compared to conventional solutions. The animal washing system of the present disclosure can prevent usage of adverse temperatures (e.g., preventing hypothermia and scalding) of conventional solutions. The present disclosure can provide better well-being, better health, and increased quality of life to animals compared to conventional solutions. In some embodiments, the amount of shampoo to be used on the animal is controlled (e.g., user filling to a predetermined line) and could provide benefits for rationing shampoo supply and helping to prevent irritation of skin of the animal from overuse of shampoo.

Although certain embodiments of the present disclosure describe animal washing systems used for washing dogs, in some embodiments, animal washing systems of the present disclosure may be used to wash other types of animals. In some embodiments, the term "animals" also includes humans. The animal washing system can be used to wash humans that are being more time efficient, that work in smelly industries (e.g., fish, sewage, etc.), in the case of hazmat handling or spills, etc.

Figure 1B:
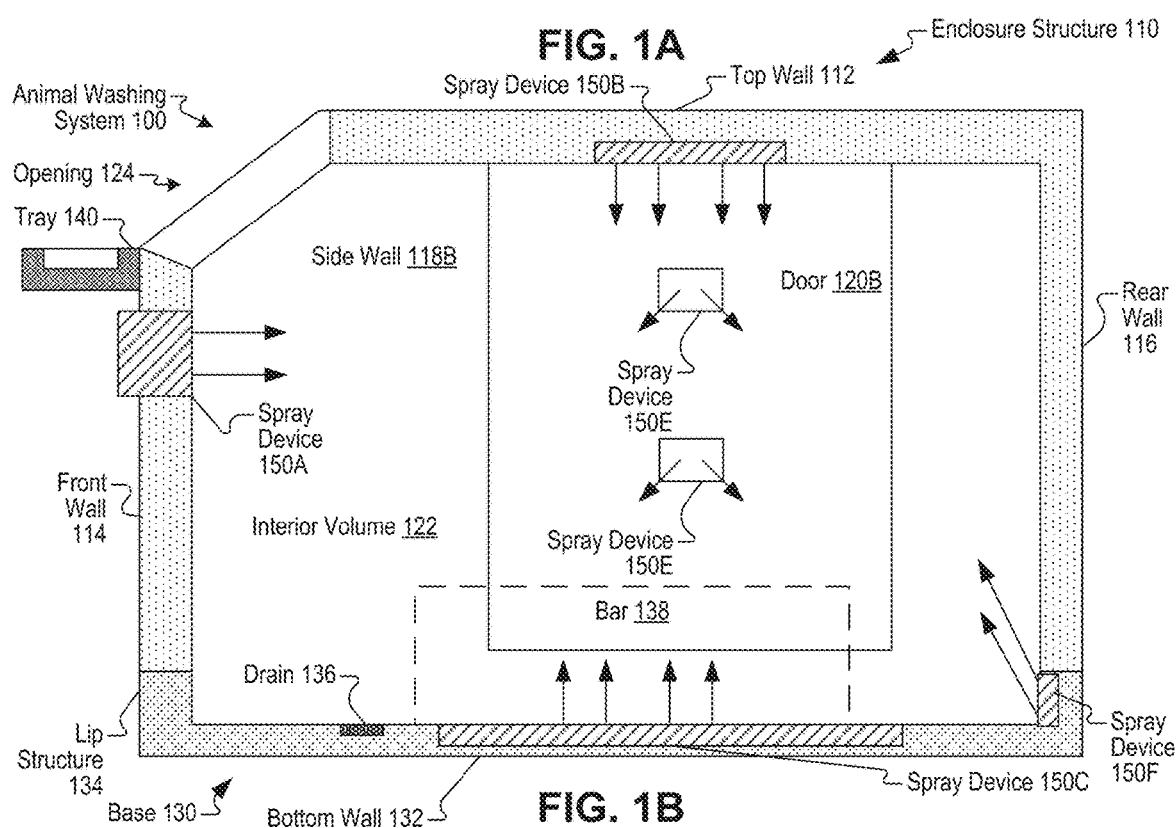
Figure 1C:
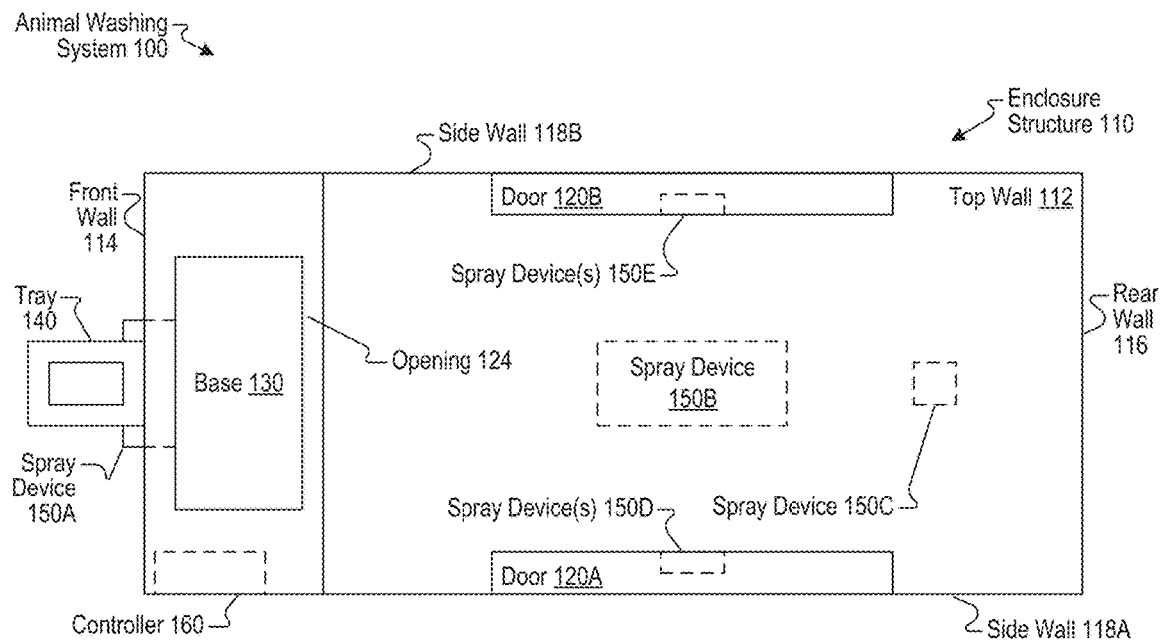
Figure 1D:
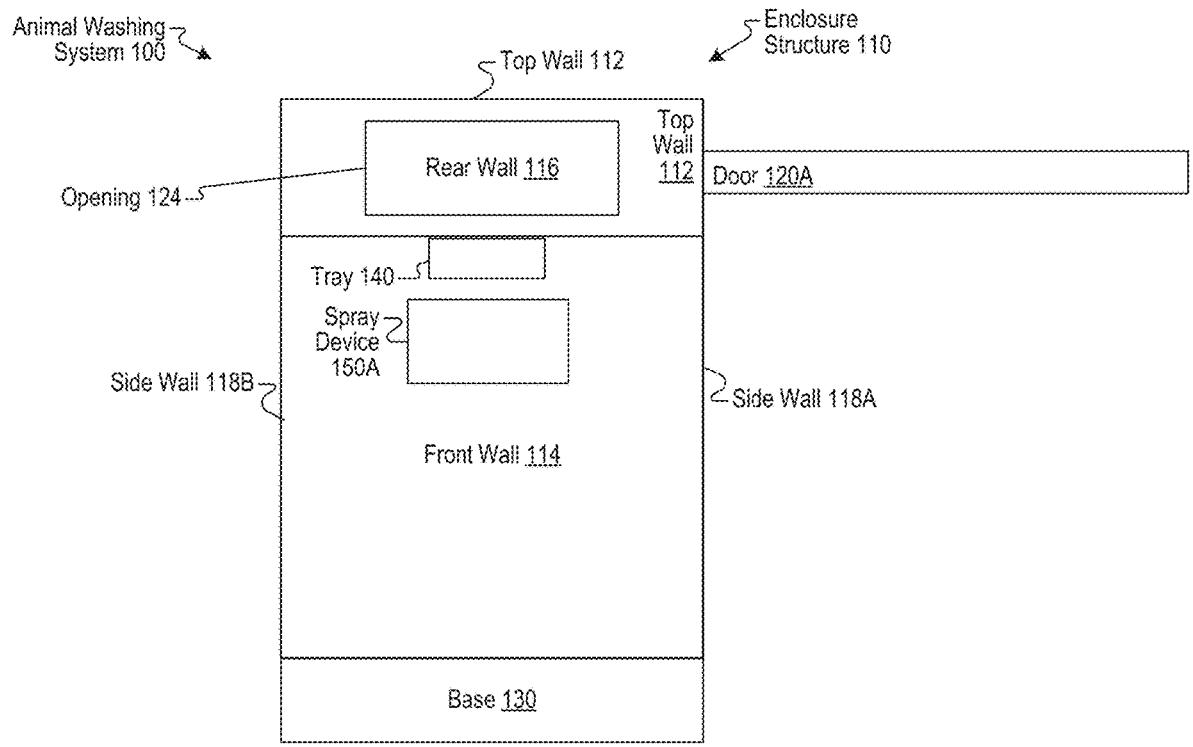

FIGS. 1A-D illustrates views of an animal washing system 100, according to certain embodiments. FIG. 1A illustrates a side view of an animal washing system 100. FIG. 1B illustrates a cross-sectional side view of an animal washing system 100. FIG. 1C illustrates a top view of an animal washing system 100. FIG. 1D illustrates a front view of an animal washing system 100. In some embodiments, each of FIGS. 1A-D refers to the same animal washing system 100.

An animal washing system 100 may be an animal washing device, a dog washing system, a dog washing device, an automatic dog washer, etc. Animal washing system 100 may make animal washing (e.g., dog washing) at home a better, less painful, and more enjoyable experience for the user than conventional solutions. Animal washing system 100 may carefully clean the body of a dirty animal (e.g., dog). In some embodiments, animal washing system 100 may wash the body of the dirty animal excluding the head. In some embodiments, animal washing system 100 may wash the body of the dirty animal including the head. Animal washing system 100 may provide orders of magnitude of a better clean than conventional solutions. Animal washing system 100 may provide an enhanced clean (e.g., without providing a sterile clean).

In some embodiments, the animal washing system 100 is configured to accommodate and clean larger dogs, such as Labrador Retrievers, Golden Retrievers, German Shepherds, etc.

An animal washing system 100 includes an enclosure structure 110. The enclosure structure 110 may include a top wall 112, a front wall 114, a rear wall 116, a side wall 118A, and a side wall 118B. A door 120A may be secured to side wall 118A (e.g., covering an opening formed by side wall 118A) and/or a door 120B may be secured to side wall 118B (e.g., covering an opening formed by side wall 118B). In some embodiments, the side wall 118A is the door 120A and/or side wall 188B is door 120B. In some embodiments, a door may be secured to another portion of enclosure structure 110 (e.g., covering an opening formed by rear wall 116, front wall 114, or top wall 112). One or more doors 120 may be opened for an animal to enter into an interior volume 122 formed by the enclosure structure 110. Door 120 may be connected to enclosure structure 110 via a hinge located proximate top wall 112 (e.g., door 120 opens up, see FIG. 1D). In some embodiments, door 120 secures (e.g., clicks into place, friction fit, fastens, etc.) to the side wall 118. In some embodiments, responsive to actuation of the door 120 (e.g., via a handle, via lifting, etc.), a hinge device (e.g., piston) lifts the door 120 to be in the open position (e.g., see FIG. 1D). In some embodiments, the door 120 opens up and in some embodiments, the door 120 opens down. In some embodiments, the door 120 moves (e.g., collapses, rolls, opens, etc.) to provide access to an interior volume 122 of the enclosure structure 110. In some embodiments, there is no rear wall (e.g., a mesh spray cover may be placed over the rear of the animal, at the discretion of the user).

For safety of the animal and peace of mind of the user (e.g., animal owner, operator, etc.), the animal may not be fully enclosed and the head of the animal may protrude from the product. Responsive to entering the interior volume 122, the head of the animal may extend through an opening 124 formed by the top wall 112. Each of the doors 120 may be closed to at least partially enclose the animal in the interior volume 122 of the enclosure structure 110. In some embodiments, the enclosure structure 110 may include features (e.g., scoops) to direct water back into the interior volume 122 when the user is manually washing the head of the animal using the spray device 150A in the detached position.

In some embodiments, the animal washing system 100 includes a component disposed in the opening to at least partially seal the area between the neck of the animal and the top wall 112. The component can be a fabric with elastic or adjustable strap to secure to the neck, a stretchy fabric to secure to the neck, a fabric to be fastened together (e.g., via hook and loop fasteners, such as Velcro®) around the neck, etc. The component can prevent fluid from leaving the interior volume 122 of the enclosure structure 110 via the opening. In some embodiments, a component (e.g., fabric) is disposed at the rear of the animal washing system 100 to prevent fluid from leaving the interior volume 122 of the enclosure structure 110 via a rear portion of the animal washing system 100.

The enclosure structure 110 may be disposed on a base 130. The base 130 may have a bottom wall 132 and a lip structure 134 (e.g., that form a tub structure). The bottom wall 132 may be disposed on a substantially horizontal surface, such as a floor of a bathtub, a floor of a walk-in shower, a patio, a balcony, the ground, grass, dirt, etc. The lip structure 134 extends up from the bottom wall 132. The lip structure 134 and bottom wall 132 may capture fluids (e.g., water, soap, etc.) and solids (e.g., hair, mud, dirt, etc.) during the washing of the animal. The pooling of water (and soap) in the base 130 may passively wash the feet and part of the legs of the animal (e.g., the dog's paws).

The base 130 may include a drain 136. The upper surface of the bottom wall 132 may slope to the drain 136 to cause the fluid and solids to move towards the drain 136. The drain 136 may include a filter to capture the solids. In some embodiments, the drain 136 is an opening formed by the lip structure 134 or the base 130 to allow the fluids and/or solids to flow out of the animal washing system 100. In some embodiments, the drain 136 is connected to a drain pipe and the fluids and/or solids flow through the drain 136 and then through the drain pipe to a location outside of the animal washing system 100. The lip structure 134 may connect to (e.g., seal to) front wall 114, rear wall 116, side wall 118A, and/or side wall 118B. To provide drainage, in some embodiments, the animal washing system 100 includes large diameter drainage hose(s) with female quick-connects attached to male quick-connect exit on the base 130. In some embodiments, the animal washing system 100 includes a draw-bridge (e.g., drainage piping is lifted and coupled to the side of the enclosure structure 110 when not in use and is lowered when in use) or attachable drainage pipe. In some embodiments, the source piping and/or drainage piping are stored within the enclosure structure 110, stored on top of enclosure structure 110, stored with an attachment (e.g., hook) on the side of the enclosure structure 110, etc.

The animal washing system 100 may include a bar 138 (e.g., island) that is configured to extend under the animal to prevent the animal from sitting on the bottom wall 132 of the base 130 (e.g., to prevent the animal from sitting in the fluids and/or solids during the washing of the animal). The bar 138 may cause the animal to stand upright and may prevent the animal from sitting. In some embodiments, the bar 138 may extend for the length of the animal (e.g., extend between the front left leg and the front right leg, extend under the stomach, and extend between the rear left leg and the rear right leg of the animal). In some embodiments, the bar 138 may extend for the width of the animal (e.g., under the stomach, behind the front two legs and in front of the rear two legs of the animal). In some embodiments, the bar 138 prevents the animal (e.g., dog) from leaning towards one side or the other (e.g., to keep the dog centered left to right so they are in a central position relative to the spray devices 150). The bar 138 may attach to the bottom wall 132 (e.g., the bar 138 includes a substantially horizontal portion that is attached to substantially vertical portions that connect to the bottom wall 132 of the base 130). The bar 138 may attach to one or more of the walls of the enclosure structure 110 (e.g., bar 138 includes a substantially horizontal portion that has a first distal end connecting to front wall 114 and a second distal end connecting to rear wall 116, bar 138 includes a substantially horizontal portion that has a first distal end connecting to side wall 118A and a second distal end connecting to side wall 118B, etc.). In some embodiments, the bar 138 is integrated into the base 130 (e.g., like a hill or mound). In some embodiments, the bar 138 is adjustable or removable by the user.

The animal washing system 100 may include a tray 140 disposed proximate to the opening 124 formed by the enclosure structure 110. In some embodiments, one or more consumables are automatically distributed to the animal at predetermined times (e.g., when the animal washing starts, in the middle of washing, at the end of washing, and/or other times). The tray 140 may be secured to an outer surface of front wall 114. The tray 140 may be configured to support consumables (e.g., food, fluid, treats, peanut butter, etc.) for the animal to consume during the washing of the animal by the animal washing system 100. The head of the animal protruding through opening 124 may be within licking range of the tray 140 (e.g., licking mat, treat mat, etc.). In some embodiments, the tray 140 is detachable (e.g., to be cleaned, to be stored, to place consumables on the tray 140) from the enclosure structure 110 (e.g., front wall 114).

The animal washing system 100 provides washing via different locations (e.g., top sprayer(s), side sprayer(s), bottom sprayer(s), front sprayer, etc.). The animal washing system 100 includes spray devices 150. Spray devices 150 may include a spray device 150A (e.g., front spray device), spray device 150B (e.g., top spray device), spray device 150C (e.g., bottom spray device), one or more spray devices 150D (e.g., two first side spray devices on side wall 118A), and one or more spray devices 150E (e.g., two second side spray devices on side wall 118B), and/or rear spray device 150F. In some embodiments, animal washing system 100 does not include spray device 150C. In some embodiments, animal washing system 100 includes at least one spray device 150 on each side (e.g., top, bottom, front, rear, left, and right) (e.g., a total of at least six spray devices 150). In some embodiments, animal washing system 100 includes six spray devices 150. In some embodiments, animal washing system 100 includes seven spray devices 150. In some embodiments, animal washing system 100 includes a rear spray device 150E and/or the spray device 150C also sprays the rear of the animal at an angle from below. In some embodiments, animal washing system 100 includes a spray device 150 that is detachable (e.g., a hand sprayer) that can be used to wash the head (e.g., face) or other part of the animal and/or to rinse any remaining cleaning fluid (e.g., suds) from the animal. In some embodiments, one or more of the sprayer devices are stationary or move (e.g., oscillate). In some embodiments, one or more of the spray devices 150 includes a substantially vertical fan-profile nozzle and is configured to oscillate substantially horizontally. In some embodiments, the spray device 150 oscillates left and right (e.g., horizontally) along the length of the animal while spraying a substantially vertical spray pattern. This allows cleaning fluid (e.g., suds, shampoo, conditioner, etc.) to remain on a portion of the animal for a threshold amount of time until the substantially vertical spray pattern oscillates back to that portion of the animal. In some embodiments, one or more of the spray devices 150 are configured to impact an animal with a substantially vertical spray pattern and are configured to move the substantially vertical spray pattern in a substantially horizontal direction along the length of the animal.

A spray device 150 may be integrated into one or more walls (e.g., top wall 112, front wall 114, rear wall 116, side wall 118A, side wall 118B, base 130, and/or frame 170, such as a scaffold) of the enclosure structure 110. For example, spray device 150 may be part of a wall of the enclosure structure 110 that forms openings so that fluid directed through channels in the walls of the enclosure 110 may be directed through the openings onto the animal in the interior volume 122 (e.g., ceiling of the enclosure structure 110 is a top spray device 150B, base 130 is a bottom spray device 150C). In some embodiments, spray device 150 is located in a recess formed by a wall of the enclosure structure 110. In some embodiments, spray device 150 is coupled (e.g., attached, fastened, adhered, etc.) to an interior surface of a wall of the enclosure structure 110.

In some embodiments, the base 130 interfaces with one or more walls (e.g., front wall 114, rear wall, side wall 118A, and/or side wall 118B) of the enclosure structure 110. In some embodiments, an upper surface of the base 130 (e.g., lip structure 134) has one or more ports (e.g., quick connect, inlet, outlet) that interfaces with a corresponding port (e.g., quick connect, inlet, outlet) of a lower surface of one or more walls of the enclosure structure 110. For example, an upper surface of the lip structure 134 may form a port that interfaces with a port formed by a lower surface of front wall 114 so that fluid can flow through lip structure 134 to spray device 150A through front wall 114. In another example, an upper surface of the lip structure 134 may form a port that interfaces with a port formed by a lower surface of a side wall 118 so that fluid can flow through lip structure 134 to spray device 150B, 150D, or 150E through side wall 118.

The spray device 150A (e.g., front spray device, chest spray device, etc.) may be coupled to the front wall 114. The front wall 114 may form an opening and the spray device 150A is disposed in the opening. The spray device 150A may direct fluid flow (e.g., spray) at the chest of the animal. The spray device 150A may be removable (e.g., during washing of the animal) so that a user can uncouple the spray device 150A from the front wall 114 and direct the spray device 150A at the head of the animal (e.g., above the top wall 112, head extending through the opening 124) to wash the head of the animal. Spray device 150A may be a front sprayer that is detachable from a stationary position facing the front of the chest of the animal. The spray device 150A may be detachable for a user to rinse the face or any other part of the animal manually. In some embodiments, the spray device 150A is used to pre-spray an animal (e.g., that is very dirty) and/or post-wash areas of the animal (e.g., that may not have been washed sufficiently). The spray device 150 may be lower and angled up so as to also clean the underside of the animal.

The spray device 150B (e.g., top spray device, shower head) may be coupled to top wall 112. A lower surface of the top wall 112 may form a recess and the spray device 150B may be at least partially disposed in the recess. In some embodiments, the spray device 150B is built (e.g., integrated) into the top wall 112 (e.g., water is routed into the top wall 112 and the top wall 112 has openings to spray the water onto the animal). The spray device 150B may direct fluid flow (e.g., spray) at the upper portion (e.g., back, tail, etc.) of the animal. Spray device 150B may be one or more top sprayers that spray a large area to cover the back of the animal and may provide higher flow.

The spray device 150C (e.g., bottom spray device) may be coupled to the bottom wall 132 of the base 130. Upper surface of the bottom wall 132 of the base 130 may form a recess and the spray device 150C may be at least partially disposed in the recess. In some embodiments, the spray device 150C may be built into (e.g., integral to) the bottom wall 132 (e.g., water is routed into the bottom wall 132 and the bottom wall 132 has openings to spray the water onto the animal). The spray device 150C may direct fluid flow (e.g., spray) at a lower portion (e.g., legs, stomach, genitals, front, back, etc.) of the animal. The spray device 150C may be a bottom sprayer that includes one or more light shower sprayers that spray from the bottom targeted at the underside of the animal (e.g., to clean genital and anus areas). The spray device 150C may be integrated into or attached to the bar 138 (e.g., island).

In some embodiments, the spray devices 150D-E are coupled to the side walls 118A-B or doors 120A-B. In some embodiments, instead of one spray device 150D on side wall 118A and one spray device 150E on side wall 118B, there are two spray devices 150 on side wall 118A and two spray devices 150 on wall 118A. The spray devices 150 on the same side wall 118 may be one above each other or side by side to better cover length. For the spray devices 150 on the same side wall 118, one spray device 150 may spray the side (e.g., torso) of the animal and the other spray device may spray the legs of the animal. The spray device 150 may be lower and angled up so as to also clean the underside of the animal.

In some embodiments, spray device 150F is a back sprayer and may have a fanning action (e.g., left to right, spray moving between side wall 118A and side wall 118B). Spray device 150F may be a rear sprayer that sprays a rear portion of the animal. Spray device 150F may be coupled to the base 130, enclosure structure 110 (e.g., rear wall 116), or may extend from the base 130 or enclosure structure 110.

One or more of the spray devices 150 may be connected to a hose (e.g., piping, tubing, etc.). In some embodiments, the hose retracts into the base 130 and/or a wall of enclosure structure 110 as the animal washing system 100 (e.g., enclosure structure 110) is placed in a collapsed position. In some embodiments, a coil (e.g., spring-loaded coil) retracts a portion of the hose into the base structure 130 and/or wall responsive to the animal washing system 100 (e.g., enclosure structure 110) being placed in a collapsed position. In some embodiments, the spray devices may be connected via a rotating face seal.

The side walls 118A-B or doors 120A-B may form a recess and the spray devices 150D-E may be at least partially disposed in the recesses. In some embodiments, the spray devices 150D-E extend from walls of the enclosure structure 110 (e.g., extend from the top wall 112, bottom wall 132, front wall 114, rear wall 116, or side walls 118A-B) to direct fluid flow (e.g., spray) at side portions of the animal. The spray devices 150D-E may move during fluid flow (e.g., rotate or translate left and right) to spray the sides of the animal. In some embodiments, each of the spray devices 150 is either stationary or moves (e.g., oscillates). Spray devices 150D-E may be in the left and right positions. Each spray device 150D-E may include a nozzle that has a vertical orientation with a fan-profile, may include a spray angle of about 80-120 degrees, and may provide a typical residential building flow and pressure such as a flow rate of about 3-17 gallons per minute (gpm) at about 30-80 pounds per square inch (psi). Each spray device 150D-E may be water-driven to oscillate left to right from center to reach the front and end of the animal. The spray from spray devices 150D-E may cover from top of animal to underside of the animal. The position of spray devices 150D-E may be along or above the horizontal center between the chest and the back of the animal. In some embodiments, the position of the spray devices 150D-E may be adjustable (e.g., between three preset locations).

Animal washing system 100 includes a controller 160. Controller 160 receives fluid and provides fluid to the spray devices 150. The controller 160 may include valves or may be coupled to valves. Each valve is configured to selectively provide fluid to a corresponding spray device to wash the animal. The controller 160 is configured to selectively actuate each valve to wash the animal.

In some embodiments, the animal washing system 100 is configured to be disassembled or collapsed for storage. For example, the top wall 112, front wall 114, rear wall 116, side wall 118A, and side wall 118B may be uncoupled from each other to collapse the enclosure structure 110 for storage. In some embodiments, the base 130 and the enclosure structure 110 can be uncoupled from each other for storage. In some embodiments, the base 130 and the enclosure structure 110 cannot be uncoupled from each other (e.g., are a continuous piece, are non-removably attached to each other, etc.). In some embodiments, the animal washing system 100 can be used as an animal enclosure (e.g., dog house, crate, bed) when not being used for washing (e.g., the animal may rest, sleep, travel, etc. in the animal washing system 100). The bar 138 may be removable or may be configured to be moved out of the way (e.g., towards side wall 118, rear wall 116, or front wall 114) so that the animal washing system 100 can be used as an animal enclosure. In some embodiments, the animal washing system 100 may be stored outside. In some embodiments, user-replaceable supplies (e.g., shampoo, floor mats, towels, treats, etc.) can be stored in or attached to the animal washing system 100. In some embodiments, one or more of the spray devices 150 are attached to a frame 170 (e.g., scaffold) that rotates into the base 130. The enclosure structure 110 may be removed or may collapse and rotate into the base 130.

Setup and takedown of the animal washing system 100 may be easily accomplished in a low number of operations. The animal washing system 100 may be used in locations of apartments and homes, such as in the bathtub, on the balcony, on the patio, on the porch, in the yard (e.g., front yard, side yard, backyard), on the driveway, in the garage, etc.

The animal washing system 100 (e.g., enclosure structure 110 and base 130) may fit into an average sized bathtub. In some embodiments, the base 130 may have a width that is less than 20 to about 22 inches (e.g., width of standard bathtubs), a length that is less than about 34 to about 45 inches (e.g., length of standard bathtubs), and accommodates a bathtub lip of about 14.5 to about 18 inches. In some embodiments, the animal washing system 100 may have a total length that is less than about 44 to about 60 inches (e.g., length of top of bathtub), total width that is less than about 22 to about 32 inches (e.g., width at top of bathtub).

The animal washing system 100 may free stand outside on uneven and/or sloped ground (e.g., grass lawn). The animal washing system 100 may be set down and put away or left out (e.g., outside). The animal washing system 100 may withstand elements and long-term outdoor adverse effects (e.g., ultra violet (UV) rays, heat, rain, snow, basketballs, stacking, etc.). The animal washing system 100 may have a cover. The animal washing system 100 may be portable (e.g., has wheels to be rolled by a user from one location to another) with a carrying handle or may break down into smaller lighter parts.

In some embodiments, to set up the animal washing system 100, a user sets up the animal washing system 100 in the bathtub or outside on the patio, balcony, deck, driveway, or lawn. For the first use, the user may connect the diverter 222 (e.g., with threaded adapters) to a sink (e.g., kitchen, bathroom, utility), shower pipe, or outdoor spigot (e.g., hose bib) using plumbers tape. The user may assemble or unfold the animal washing system 100. The user may connect the drainage hose to the animal washing system 100. The user may connect the source hose to the animal washing system 100. The user may secure a slip collar leash or a fixed collar (e.g., regular collar, non-slip collar) and leash onto the neck of the animal (e.g., dog). The user may walk the animal to the animal washing system 100 (e.g., on a leash or the animal may run into the animal washing system 100 themselves to get a treat or after training with visual and/or auditory cues). The user may secure the animal to the animal washing system 100 by attaching the collar (e.g., slip collar) that is around the neck of the animal to the animal washing system 100). The user may secure the source hose to the diverter 222. The user may test water temperature coming from the water source 210. The owner may switch the diverter 222 so that water will flow through the source hose. The user may load shampoo into the fluid reservoir 229 (e.g., premixing the correct shampoo-water ratio or using a premixed single-use shampoo bottle). The operations may include setting up the components (e.g., water, shampoo), then putting the animal in the interior volume of the animal washing system, and then running the animal washing system 100 to minimize the amount of time the animal is in the interior volume. The user may give the animal a slow dissolving treat on the tray 140 (e.g., removable licking mat). Treat may include a dog treat, peanut butter, yogurt, pumpkin, dog ice cream, etc. The tray 140 may include a licking mat that can be removed and put into the fridge with the treat (e.g., colder treats dissolve more slowly). The removable licking mat may be easier to be cleaned than placing the treat directly on the tray 140. Treats can be provided during the wash (e.g., as a distraction) and/or after the wash (e.g., reward for good behavior). The user turns on the animal washing system 100 (e.g., via user interface 340) to cause washing of the animal.

In some embodiments, to take down the animal washing system 100, a user may turn the animal washing system 100 off or the animal washing system 100 automatically turns off. The floor pool in the base 130 may automatically be drained during or after the wash (e.g., the user may dump any remaining water afterwards). The user may run another cycle (e.g., conditioner after a shampoo cycle). The user may open the animal washing system 100 and do a final wash or rinse with the hand sprayer. The user may open the animal washing system 100 and dry the animal with a towel. The user unsecures the animal. The user leads the animal out with or without a leash. The user covers the animal with a towel to dry the animal (e.g., a dry towel may be integrated with the product for storing or helping the user wrap the dog). After the animal is dried, the user disconnects the drain hose from the animal washing system 100. The user disconnects the source hose from the product and from the diverter 222 (e.g., diverter valve), switching the diverter valve back to normal. The source and drain hoses may be stored within or on the animal washing system 100 (e.g., in interior volume 122). The user may let the animal washing system 100 sit out to dry. The door(s) 120 of the animal washing system 100 may be opened to allow more air to pass through animal washing system 100. The animal washing system 100 may remain in the bathtub or may be placed outside to dry. The animal washing system 100 may be placed on the side or upside down to drain fully. The fluid used may have cleaning properties to allow sitting stagnant water or air may be pumped through the flowpaths (e.g., lines, piping, etc.) formed by the animal washing system 100 to clear the water out of the animal washing system 100. The user may disassemble and/or collapse the animal washing system 100 or may leave the animal washing system 100 up. The user may put the animal washing system 100 away for storage or may leave the animal washing system 100 out (e.g., with a cover).

The animal washing system 100 may facilitate getting the animal into and out of the animal washing system 100. The animal washing system 100 is safe for the animal and the user. Water temperature may be monitored by a temperature sensor. A mat (e.g., dog mat) may be placed on the upper surface of the bottom wall 132 to prevent slipping (e.g., if the animal is panicked). The mat may be integrated or a separate part. Issues stemming from noise, vibrations, high pressure, sudden actions and/or movements, during the actions and/or movements, temperature, etc. may be kept at a minimum. The user may be able to distract and/or comfort the animal by rubbing the head of the animal, giving the animal a treat, placing a slowly dissolving treat (e.g., peanut butter) on a removable licking mat, washing the head of the animal manually, etc.).

For peace of mind of the user, the head of the dog may protrude out of the animal washing system 100, the tail of the animal may be contained (e.g., within enclosure structure 110) for cleanliness, one or more walls of the enclosure structure 110 may be transparent or translucent (e.g., so that the user can see the washing functionality while the animal washing system 100 washes the animal). In some embodiments, the enclosure structure 110 has one or more walls of the enclosure structure 110 that are clear, foggy, and/or ridge plastic that allow a user to at least partially view inside the animal washing system 100. In some embodiments, the enclosure structure 110 has one or more walls of the enclosure structure 110 that are plastic, fabric, etc.

The user may use an adjustable and detachable slip collar to secure the animal to the animal washing system 100. The slip collar may attach to a line that attaches to the animal washing system 100. In some embodiments, the slip collar keeps the head of the animal protruding out of the enclosure structure 110 (e.g., to keep the animal in position for a better clean). The line may be attached to the platform the dog is standing on (e.g., base 130) or to the top wall 112. The animal washing system 100 may be designed for the animal to be standing. A bar 138 (e.g., raised surface and/or box, island) may be under the animal to keep the animal standing. In some embodiments, the bar 138 and slip collar maintains the animal in a central position in the enclosure structure 110 during washing of the animal (e.g., so that the animal does not sit, does not move from side to side, stays equally spaced between side spray devices 150D-E).

The animal washing system 100 may be used for specific animal dimensions, variations in mixed breeds, variations in overweight animals (e.g., slightly wider and lower stomachs). The animal washing system 100 may have a door 120 that accommodates an animal width of about 9 to about 13 inches. The animal washing system 100 may have an inside volume 122 that accommodates a length (e.g., point of shoulder to point of rump) of about 21.5 to about 34 inches. The animal washing system 100 may have an inside volume 122 that accommodates a withers height of about 21.5 to about 26 inches.

In some embodiments, the animal washing system 100 is wide enough for an animal to enter, have room for spray devices 150D-E on the left and right sides, and fit into a bathtub.

User ergonomics may include controls, safety, and weight. The controller 160 may be easily accessible by the user (e.g., user likely near the head of the animal to comfort the animal, give the animal a treat, and/or washing the face of the animal manually). The controller 160 may be as high as possible so that the user does not bend down far (e.g., user may be standing or crouching). The controller 160 may be easy to power on and start a wash cycle. The controller 160 may allow the user to control one or more of psi per spray device (e.g., electronically or mechanically), soap/water ratio (e.g., self-mixing or adding the right amount of shampoo), length time of wet cycle, soap cycle, rinse cycle, any gaps, etc. The user may quickly and easily shut off the product. The animal washing system 100 may have a weight that is easy for the user to carry from storage to setup location and back. The animal washing system 100 may break up into lighter sections and/or parts. The animal washing system 100 may be transported via a handle and/or wheels.

The enclosure structure 110 may be see-through or partially see-through to give a sense of comfort and/or safety to the user. The interior may appear illuminated (e.g., LEDs or natural light entering the side walls 118 and/or top wall 112).

The animal may be guided (not pulled) into the interior volume 122. The base 130 may have a grippy upper surface to prevent slipping and may fill to a predetermined depth to wet and clean paws passively. The face of the animal may be cleaned via detachable spray device 150 and/or a filled mini-cup. Animal washing may occur every 3 to 4 weeks (e.g., depending on breed, season, how dirty the animal gets, etc.).

Pressure (e.g., psi) of water provided to the animal washing system 100 may be high enough to wash the animal and safe for the animal. The animal washing system 100 may work with home water pressures between about 30 and about 80 psi. Incoming water pressure is adjustable for the user to adjust (e.g., mechanically and/or electrically) the water pressure to the level of comfort of the animal. Spray from spray devices 150 may have variable water pressure that starts low and slowly gets higher to cause it to be easier for the animal to handle the spray (e.g., slowly open valves). If the pressure of the water source does not meet a threshold pressure (e.g., water pressure is below 30 psi), a low water pressure mode may be used to switch valves to focus the pressure on specific spray devices 150 one or two at a time.

Flow rate (gpm) to the animal washing system 100 and/or through the animal washing system 100 may be accommodated by hoses that have a flow rate range of 9-17 gpm (e.g., 12-13 gpm). The animal washing system 100 may work at a low flow rate of about 9 gpm.

Water temperature above 7 degrees Celsius (e.g., 45 degrees Fahrenheit) may be safe for animals (e.g., majority of dogs). Temperatures at or below −6 degrees Celsius (e.g., 20 degrees Fahrenheit) may lead to frostbite or hypothermia over time. Small breeds, breeds with thin coats, senior animals, young animals (e.g., puppies), animals with health conditions, etc. may start to feel too cold when the temperature is below 0 degrees Celsius (e.g., 32 degrees Fahrenheit). Normal body temperature for an animal may be between 38 degrees Celsius (e.g., 100 degrees Fahrenheit) and 39 degrees Celsius (e.g., 102.5 degrees Fahrenheit). Hypothermia can set in at a body temperature below 38 degrees Celsius (e.g., 100 degrees Fahrenheit). The animal washing system 100 may include a heating device 228 to warm the water to avoid adverse effects on the animal and user caused by cold water. The heating device 228 may be located between the water source 210 and the animal washing system 100. The heating device 228 may be located away from the water source 210 and the animal washing system 100. The heating device 228 may be powered by alternating current. The heating device 228 may be an instant water heater (e.g., tankless). The heating device 228 may also be able to boost the pressure of the water.

The enclosure structure 110 and/or base 130 may be a plastic similar to a dog crate (e.g., injection molded, thermoformed, rotomolded). The enclosure structure 110 and/or base 130 may be a plastic enclosure with fabric paneling (e.g., plastic structure frame, fabric windows and/or panels).

The animal washing system 100 may include a base 130 (e.g., floor pool) and an enclosure structure 110 (e.g., top half). The enclosure structure 110 may include two sides (e.g., left and right) that form the top half. The enclosure structure 110 may include five sides (e.g., left, right, front, back, top) that form the top half. The enclosure structure 110 may include four sides (e.g., side wall 118A, side wall 118B, front wall 114, top wall 112). The enclosure structure may be one continuous component. The enclosure structure 110 may include a side access door 120 for the animal. The enclosure structure 110 may include quick-connects for the user to quickly and easily connect the source and drainage hoses. The parts of the animal washing system 100 that are related to washing may be modular to make versions of the animal washing system 100 for other sized animals (e.g., medium and small animals). In some embodiments, parts of the animal washing system 100 are modular for serviceability (e.g., individual parts of the animal washing system 100 can be replaced and/or repaired).

In some embodiments, the spray devices 150 include one or more of a top sprayer, bottom sprayer, two side sprayers (e.g., on each side), front sprayer, rear sprayer, and/or a manual sprayer.

In some embodiments, the animal washing system 100 (e.g., enclosure structure 110) includes a tray 140 (e.g., fold down treat tray), includes a slip collar latch point, is sized to fit large dogs, is accessible from all sides, is able to fit in bathtubs, has a simple setup, has a 32 oz refillable soap container, has a water inlet (e.g., hose connector), has a waste out, has an overspray cover, and/or is able to recirculate water from the front.

In some embodiments, liquid pools in the bottom of the animal washing system 100 (e.g., in the base 130) and a pump of the animal washing system 100 receives the pooled water and pumps the pooled water (e.g., recirculated water) through one or more of the spray devices 150. The recirculated water may be mixed with water from the water source and/or liquid (e.g., soap) from the fluid reservoir 229. In some embodiments, the pooled water is filtered prior to being recirculated.

In some embodiments, the animal washing system 100 has an interface that is simple and intuitive, that has a wash type selection, has a hair type selection, has a progress indicator, and/or has a simple start/cancel graphical user element.

Figure 2:
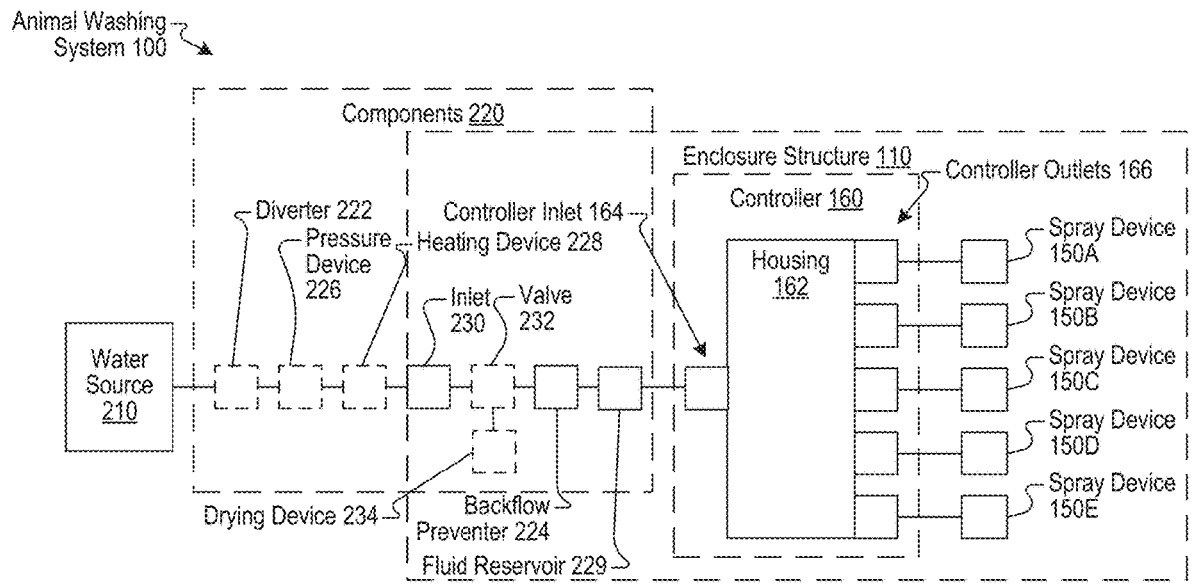
FIG. 2 is a block diagram illustrating fluid flow through an animal washing system, according to certain embodiments.

FIG. 2 is a block diagram illustrating fluid flow of an animal washing system 100, according to certain embodiments.

Animal washing system 100 may be coupled to a water source 210. The water source 210 may include piping (e.g., to a shower head or faucet in a bathtub, walk-in shower, or sink), a faucet (e.g., in a bathtub, walk-in shower, or sink), a hose bib, a spigot, etc.

In some embodiments, the water source 210 is integral to the animal washing system 100. For example, the animal washing system 100 (e.g., the enclosure structure 110) may include a docking station and a removable water source 210 (e.g., water tank, water reservoir, etc.). The water source 210 may be removed from the docking station to be filled and then placed on the docking station for performing wash cycles. The water source 210 may have a spring-loaded component that blocks an opening at the bottom of the water source 210 in a disengaged position and that unblocks the opening in an engaged position. The docking station may have a docking component so that placing of the water source 210 on the docking station causes the docking component to engage with the spring-loaded component to cause the spring-loaded component to be in an engaged position and provide the water from the water source 210 into the animal washing system 100 (e.g., into controller 160).

Fluid flow may be provided from water source 210 to controller 160 through one or more segments of piping. One or more components 220 may be disposed between the water source 210 and the controller 160. The components 220 may include diverter 222, backflow preventer 224, pressure device 226 (e.g., pressure booster), heating device 228 (e.g., water heater), inlet 230, valve 232, drying device 234 (e.g., air pump and/or air heater, etc.), and/or fluid reservoir 229. In some embodiments, fluid reservoir 229 is in-line or on a bypass (e.g., parallel path) so that water can be routed through the fluid (e.g., shampoo) injection or water can be routed around (e.g., bypassing) the fluid (e.g., shampoo) injection to allow control of when fluid (e.g., shampoo is injected). In some embodiments, inlet 230, valve 232, drying device 234, backflow preventer 224, fluid reservoir 229, controller 160, and spray devices 150 are part of the enclosure structure 110. In some embodiments, inlet 230 is where the water enters the enclosure structure. In some embodiments, valve 232 can cause either water from the water source 210 or air from drying device 234 to enter the interior volume 122 of the enclosure structure 110 via one or more spray devices 150. In some embodiments, an additional valve is included at controller inlet 164 for flow ramp (e.g., gradually opening and gradually closing the valve).

In some embodiments, water source 210 is coupled to diverter 222 via piping. Diverter 222 may include a lever that has a first position to provide fluid flow to the animal washing system 100 and a second position to provide fluid flow to a different destination (e.g., through a shower head, through a faucet, etc.).

In some embodiments, a diverter 222 is installed between the shower head (e.g., of a bathtub, of a walk-in shower) and wall pipe and a male quick-connect is threaded onto the diverter 222. In some embodiments, a diverter 222 is installed between a faucet (e.g., of a bathroom sink, of a kitchen sink, of a utility sink) and an aerator and a male quick-connect is threaded onto the diverter 222. In some embodiments, diverter 222 includes threaded adaptors to couple to showerheads and various faucets.

In some embodiments, piping between water source 210 and controller 160 includes one or more hoses (e.g., garden hose type, expandable hose). In some embodiments, a first distal end of the hose has a female quick-connect to connect water source 210 (e.g., source connector) to diverter 222. In some embodiments, a second distal end of the hose has a male quick-connect that attaches to a component 220 (e.g., fluid reservoir 229, inlet 230, etc.) or the controller 160 of the animal washing system 100. In some embodiments, fluid reservoir 229, inlet 230, or the controller 160 has a female quick-connect.

In some embodiments, the animal washing system 100 has a valve 232 (e.g., mechanical valve) that a user can actuate to turn the water on, turn the water off, and/or adjust (e.g., reduce, increase) flow (e.g., pressure) of water to controller 160. In some embodiments, the valve 232 can be actuated to provide air and/or liquid to the controller 160. In some embodiments, the valve 232 can be actuated to adjust the flow of only liquid, adjust the flow of only air, or adjust the combination of liquid and air provided to the controller 160. In some embodiments, valve 232 can be used as an emergency shutoff valve.

The components 220 may include a backflow preventer 224 (e.g., water source 210, heating device 228, inlet 230, valve 232, and/or diverter 222 may be coupled to backflow preventer 224 via piping). The backflow preventer 224 allows fluid flow from water source 210 to the controller 160 and prevents fluid flow back to the water source 210. The backflow preventer 224 may be mechanical or may be electronic.

The components 220 may include a pressure device 226 (e.g., water source 210, diverter 222, and/or backflow preventer 224 may be coupled to pressure device 226 via piping). Pressure device 226 may increase the pressure of the water from water source 210. In some embodiments, the pressure device 226 increases the pressure of the water received from water source 210 responsive to a determination (e.g., by pressure device 226, by controller 160) that the water from water source 210 has a pressure value that does not meet a threshold pressure value. Pressure device 226 may include a pump. Pressure device 226 may be connected to an external source of power (e.g., separate from the power source of the controller 160).

The components 220 may include a heating device 228 (e.g., water source 210, diverter 222, backflow preventer 224, and/or pressure device 226 may be coupled to heating device 228 via piping). Heating device 228 may increase the temperature of the water from water source 210. In some embodiments, the heating device 228 increases the temperature of the water received from water source 210 responsive to a determination (e.g., by heating device 228, by controller 160) that the water from water source 210 has a temperature value that does not meet a threshold temperature value. Heating device 228 may include a resistance heater. Heating device 228 may be connected to an external source of power (e.g., separate from the power source of the controller 160).

The components 220 may include a fluid reservoir 229 (e.g., soap injector). In some embodiments, the fluid reservoir 229 is part of the enclosure structure 110. In some embodiments, the fluid reservoir 229 includes a siphon component that empties a housing (e.g., bottle, vessel) of user-filled water-fluid mixture (e.g., soap/water mixture). In some embodiments, the fluid reservoir 229 mixes water with fluid (e.g., soap) and siphons the fluid-water mixture out of the fluid reservoir 229 which dilutes the fluid-water mixture in the fluid reservoir 229.

Prior to or during water flow from water source 210 to controller 160, fluid reservoir 229 may be configured to receive one or more fluids, such as one or more of soap, shampoo, conditioner, perfume, shampoo concentrate, soap concentrate, conditioner concentrate, perfume concentrate, etc. As water flows from water source 210 to controller 160, a portion of the water may enter the fluid reservoir 229 to mix with the one or more fluids (e.g., dilute the shampoo concentrate). The fluid reservoir 229 may include a siphoning component (e.g., tube, straw, etc.). Once the fluid reservoir 229 has been filled, the water flowing from water source 210 to controller 160 siphons the fluid from the fluid reservoir 229 via the siphoning component. The siphoned fluid from the fluid reservoir 229 then mixes with the water flowing from water source 210 to controller 160 to provide a water-fluid (e.g., water-shampoo) mixture to the controller 160. In some embodiments, a system of bypass valves may be used to direct water into or to bypass (e.g., entirely bypass) the fluid reservoir 229 to control when and for how long shampoo is injected into the flow of water. The bypass valves may be controlled electronically (e.g., via controller 160). In some embodiments, instead of having water flow into the fluid reservoir 229, the fluid in the fluid reservoir 229 may be suctioned or forced out of the fluid reservoir 229 and injected into the stream of water flowing to the controller 160. This may be accomplished via a siphoning effect from a Venturi injector (with or without assistance of one or more pumps and/or pressure regulators), a peristaltic pump, or other such system for injecting soap.

The controller 160 includes a housing 162 that forms a chamber. The housing 162 has a controller inlet 164 and controller outlets 166. Fluid (e.g., water, water-fluid mixture) flows through controller inlet 164, into the chamber formed by housing 162, and out one or more controller outlets 166. Each controller outlet 166 is coupled (e.g., via corresponding piping) to a spray device 150.

The housing 162 may be a splitter where each path has an electronically-controlled variable valve and a hose line (e.g., soft tube, hard tube) running to a spray device 150. A first path may go to top sprayer(s), a second path may go to a left side sprayer, a third path that goes to right side sprayer, a fourth path that goes to bottom sprayer(s), a fifth path that goes to front sprayer, and a sixth path that goes to the rear sprayer. In some embodiments, the housing 162 may have more or less paths and valves (e.g., going to a second left side sprayer and going to a second right side sprayer). In some embodiments, a single variable valve between backflow preventer 224 and fluid reservoir 229 is configured to control ramp up flow of water, while using latching solenoid valves (e.g., just on/off) for running water and/or fluid to each spray device 150.

Each controller outlet 166 may be coupled to a corresponding valve (e.g., valve disposed between the controller outlet 166 and the corresponding spray device 150, valve disposed within controller 160, valve disposed within housing 162 of controller 160). The controller 160 may actuate the valves to open and closed positions to cause fluid to be provided to different spray devices 150. The controller 160 may actuate the valves to be partially opened (e.g., partially closed) to provide different flow rates through the different spray devices 150. In some embodiments, a single motorized valve in the front of the animal washing system 100 (e.g., proximate front wall 114) is configured to control flow rate (e.g., ramp up) and then open/close (e.g., latching solenoid) valves for each sprayer path.

Figure 3:
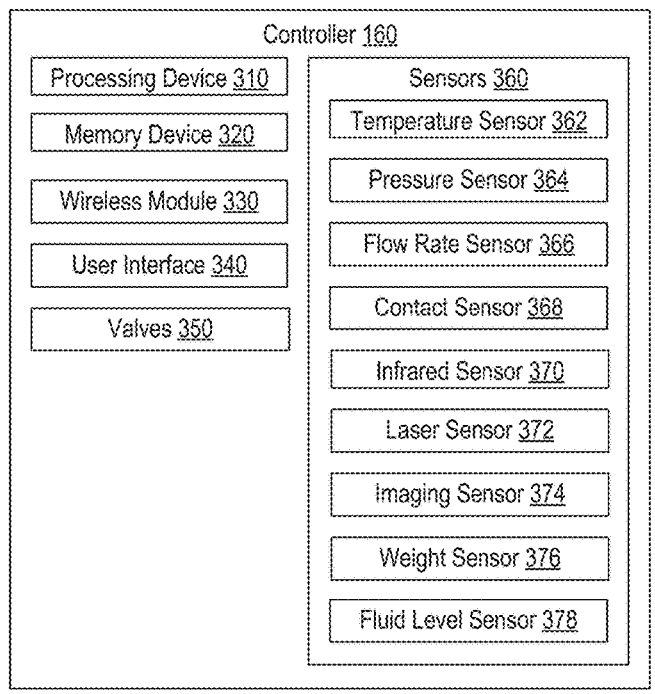
FIG. 3 is a block diagram illustrating a controller of an animal washing system, according to certain embodiments.

FIG. 3 is a block diagram illustrating a controller 160 of an animal washing system 100, according to certain embodiments. In some embodiments, controller 160 includes a processing device 310, a memory device 320, a wireless module 330, a user interface 340, valves 350, and/or sensors 360. Sensors 360 may include temperature sensor 362 (e.g., measure temperature of the water), pressure sensor 364, flow rate sensor 366, contact sensor 368, infrared sensor 370, laser sensor 372, imaging sensor 374, weight sensor 376, and/or the like.

Processing device 310, receives via user interface 340 or wireless module 330, user input. In some embodiments, the user input is indicative of a type of wash (e.g., level of dirtiness of the animal, length of hair of the animal, type of hair of the animal, type of animal, size of animal, sensitivity of the animal, fluid temperature setpoint, fluid pressure setpoint, etc.). In some embodiments, the user input is indicative of an amount or type of fluid that was added to the fluid reservoir 229.

The user interface 340 may include a start button (e.g., initiate a sequence of timed events opening and closing valves), a stop button (e.g., in case of emergency or if the user forgot to load the shampoo into fluid reservoir 229), and one or more other buttons. Other buttons may control how long the animal is to be washed by having one or more of time adjustment, wash mode selection (e.g., regular/super wash mode selection, regular/water-saver (efficiency) mode selection, wash/wash+mode selection), low/mid/high/auto water-pressure mode selection, hair length/type mode selection, dirtiness level mode selection, etc.

The user interface 340 may display progress and indicate modes. The user interface 340 may be monochrome liquid crystal display (LCD), indicator light emitting diodes (LEDs) and a row of LEDs to show progress, an organic LED (OLED) display, etc. In some embodiments, the user interface 340 (e.g., display) indicates which wash mode (e.g., heavy wash, large dog, etc.), which cycle (e.g., wash, rinse, etc.), etc. the animal washing system 100 is performing. In some embodiments, a sensor 360 provides sensor data associated with the fluid reservoir 229 (e.g., height of the fluid in the fluid reservoir 229) and the user interface 340 displays, based on the sensor data, how much cleaning fluid is left in the fluid reservoir 229. In some embodiments, processing device determines that a new container has been coupled to the fluid reservoir 229 (e.g., reading an identifier from the new container) and estimates how much fluid is remaining in the fluid reservoir 229 based on the type of wash cycle, the amount of time of a wash cycle, etc. In some embodiments, the processing device provides an alert responsive to the fluid in the fluid reservoir 229 being below a threshold amount (e.g., not enough for a wash cycle). In some embodiments, the processing device prevents the animal washing system 100 from operating (e.g., prevents a wash cycle) responsive to the fluid in the fluid reservoir 229 being below a threshold amount (e.g., not enough for a wash cycle).

In some embodiments, sensors 360 provide sensor data to the processing device 310 and/or memory device 320. The processing device 310 determines, based on the sensor data, one or more of fluid temperature, fluid pressure, fluid flow rate, etc. The processing device 310 may compare the sensor data to threshold values (e.g., threshold values based on the user input, threshold values for safety of the animal, etc.). Responsive to the sensor data not meeting threshold values, the processing device 310 may cause a pressure device 226 to increase the pressure of the fluid to meet a threshold value, cause a heating device to increase the temperature of the fluid to meet a threshold value, prevent the valves 350 from allowing fluid flow to the spray devices 150, provide an alert to the user (e.g., an alert of low pressure, an alert of low temperature, etc.).

The processing device 310 may use one or more schedules (e.g., stored in the memory device 320, based on user input, etc.) to control actuation of the valves 350, control pressure of the fluid, control temperature of the fluid, etc. A schedule may indicate to which position (e.g., closed open, partially open, etc.) which valve is to be actuated and for how much time (e.g., open for 30 seconds, halfway open for one minute, etc.). Valves 350 may include 6-7 electronically independently controlled water valves that are variably adjustable and not just fully open or closed. The default position of each of the valves 350 may be the closed position.

In some embodiments, the processing device 310 creates a schedule based on user input and sensor data. For example, responsive to determining pressure value (e.g., in housing 162) meets a first threshold value, processing device may cause more valves to be in the open position at the same time (e.g., wash the animal with multiple spray devices 150 simultaneously) and responsive to determining pressure value meets a second threshold value, processing device may cause less valves to be in the open position at the same time (e.g., wash the animal with one spray device 150 at a time).

In some embodiments, the processing device 310 causes user interface 340 to display information associated with the washing of the animal. For example, the information may include the temperature of the fluid, the pressure of the fluid, the cycle of the wash, the spray devices currently being used, how much time since the beginning of the wash, how much time until the end of the wash, which wash mode is selected, etc.

In some embodiments, responsive to the processing device 310 actuating one or more of valves 350 to an at least partially open position, water flows from the water source 210 into fluid reservoir 229 and through housing 162 to one or more spray devices 150 for a wetting cycle. Once the fluid reservoir 229 is filled, the water-fluid mix from the fluid reservoir 229 is siphoned to mix with the water flowing from water source 210 to housing 162 to provide a water-fluid mix via housing 162 to one or more spray devices 150 for a soap cycle. Once the fluid (e.g., soap, shampoo, etc.) from the fluid reservoir 229 has been fully siphoned into the fluid flow to housing 162, water flows via housing 162 to one or more spray devices 150 for a rinse cycle or with the bypass routing and valves, shampoo can be injected at determined moments in the cycle.

In some embodiments, fluid reservoir 229 has a valve 350 that controls the amount of fluid (e.g., soap, shampoo, etc.) and when the fluid is to be provided to the housing 162. The processing device 310 may control the valve 350 of the fluid reservoir 229 (e.g., based on user input) to control the soap cycle of the washing of the animal.

In some embodiments, processing device 310 receives sensor data from a sensor disposed in the animal washing system 100. The processing device 310 may detect, based on the sensor data, whether the door 120 is closed, whether shampoo is loaded in the fluid reservoir 229, how much shampoo is loaded in the fluid reservoir 229, whether an official shampoo bottle is being used, whether water is present, whether an animal is secured, whether an animal is standing in the interior volume 122 of the enclosure structure 110, water pressure (psi), water flow rate (gpm), etc.

In some examples, a sensor (e.g., contact sensor) provides sensor data indicating whether doors 120 are closed. Responsive to processing device 310 receiving sensor data indicating the doors 120 are closed, processing device 310 actuates the valves 350 for washing of the animal and responsive to processing device 310 receiving sensor data indicating one or more of the doors 120 are open, processing device 310 closes the valves 350 or prevents the valves 350 from opening.

In some embodiments, a sensor (e.g., infrared (IR) beam break sensor, laser sensor, imaging sensor, weight sensor, contact sensor, etc.) provides sensor data indicating whether an animal is in the interior volume 122 of the animal washing system 100. Responsive to processing device 310 receiving sensor data indicating the animal is in the interior volume 122, processing device 310 actuates the valves 350 for washing of the animal and responsive to processing device 310 receiving sensor data indicating the animal is not in the interior volume 122, processing device 310 closes the valves 350 or prevents the valves 350 from opening.

In some embodiments, processing device 310 causes an indication (e.g., sound via an auditory device, light via user interface 340, etc.) to indicate that the next cycle (e.g., washing process) has begun, to indicate the washing process has ended, to provide an alert (e.g., a door 120 is open, an animal is not in the interior volume 122), etc.

In some embodiments, processing device 310 has wash cycle modes (e.g., schedules). A regular wash cycle may include wetting, soaping, and rinsing. A gap may happen after the soap cycle but before the rinse cycle to allow suds to saturate. Possible alternative washing modes may allow for more frequent washes in between regular washes. Alternative washing modes may include water only (e.g., no additional fluids added to fluid reservoir 229), water plus scent (e.g., perfume added to fluid reservoir 229), test mode (e.g., actuates each valve 350 for a short period of time), cleaning/maintenance mode (e.g., load vinegar into the fluid reservoir 129 and run a particular cycle to self-clean the device), drying mode (e.g., provides air that has been pressurized and/or heated through the spray devices 150), prewash (e.g., an extra wash cycle), post-wash (e.g., provide fluid through the hand sprayer), etc. In some embodiments, the processing device 310 causes a cycle to start with a chime (e.g., play a chime via a speaker) and to end with another chime (e.g., play a different chime when finished). Each operation (e.g., actuation of a different valve) in a cycle may gradually begin (e.g., gradually open the valve), gradually end (e.g., gradually close the valve), overlap the previous or next operation, etc. Each cycle (e.g., wetting, washing, rinsing) may last about 30 seconds to about 10 minutes. Length of time for wetting cycle, soap cycle, rinsing cycle, and any gaps may be preset and/or adjustable.

In some embodiments, the controller 160 is powered by one or more user-replaceable non-rechargeable batteries (e.g., batteries last about one year given 52 washes per year (3 different dogs washed every 3 weeks)). The controller 160 may auto power on when a mode is selected via user interface 340 and auto power off a predetermined amount of time after a wash is completed. The controller 160 does not pose risk of shock to the animal or the user (e.g., owner). If the battery level is low, the controller 160 may refuse to start a wash (so that the wash does not get stuck midway because of a low battery). The controller 160 may cause visual and/or auditory feedback that the battery needs to be replaced.

Electronics (e.g., controller 160) of the animal washing system 100 may be installed in a waterproof enclosure. The controller 160 may include a printed circuit board (PCB) and other components that are within the waterproof enclosure (e.g., do not have individual waterproofing). The battery may be waterproof.

Figure 4A:
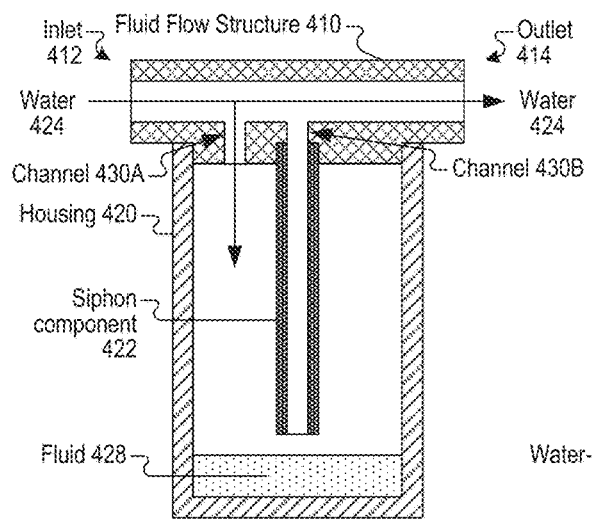
FIGS. 4A-C illustrates views of fluid reservoirs of animal washing systems, according to certain embodiments.
Figure 4B:
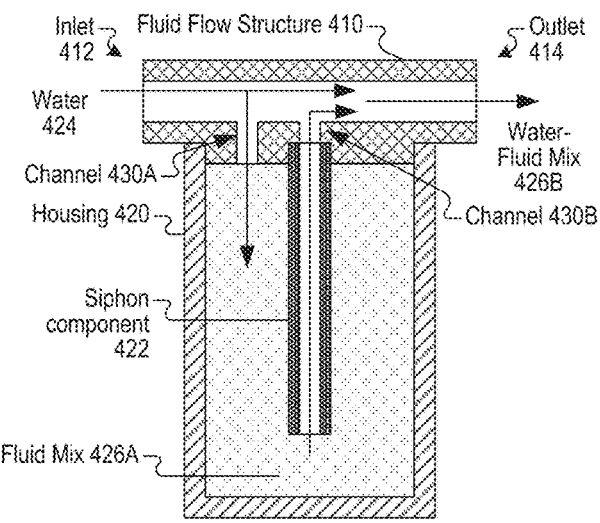
Figure 4C:
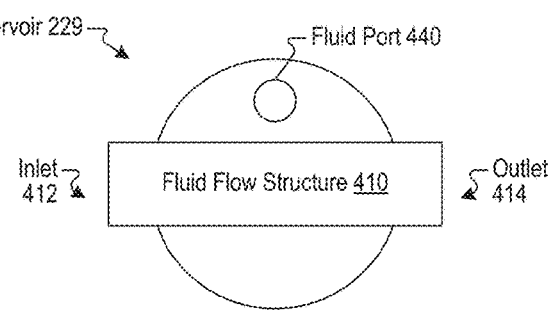

FIGS. 4A-C illustrates views of fluid reservoirs 229 of animal washing systems, according to certain embodiments. FIG. 4A illustrates a cross-sectional view of a fluid reservoir 229 prior to mixing of fluid with water. FIG. 4B illustrates an initial cross-sectional view of a fluid reservoir 229 after mixing of the fluid with water. FIG. 4C illustrates an upper view of a fluid reservoir 229. In some embodiments, a fluid reservoir 229 has one or more components that are similar to those shown in one or more of FIGS. 4A-C. In some embodiments, a fluid reservoir 229 has one or more components that are different from those shown in one or more of FIGS. 4A-C.

Fluid reservoir 229 includes a fluid flow structure 410 (e.g., lid structure) that includes an inlet 412 to receive fluid flow and an outlet 414 to provide fluid flow. Fluid reservoir 229 includes a housing 420 coupled to (e.g., screwed onto, friction fit to, fastened to) the fluid flow structure 410. A siphon component 422 is disposed in the housing 420. The siphon component 422 may be coupled to the fluid flow structure 410. A channel 430A formed by the fluid flow structure 410 allows fluid from the inlet 412 to flow into the housing 420. A channel 430B formed by the fluid flow structure 410 may allow fluid siphoned via siphon component 422 from the housing 420 to flow into the fluid flow structure 410 and out the outlet 414.

In some embodiments, fluid reservoir 229 includes a fluid port 440 to provide fluid 428 into the housing 420. The fluid port 440 may include a channel through the fluid flow structure 410 and/or housing 420. A cap may be placed on the fluid port 440. The cap may be removed and fluid 428 may be poured into the housing 420. In some embodiments, the housing 420 may be removed from the fluid flow structure 410, fluid 428 may be poured into housing 420, and the housing 420 may be re-attached to the fluid flow structure 410. In some embodiments, housing 420 is replaceable by a new housing 420 that includes fluid 428.

Referring to FIG. 4A, housing 420 may include fluid 428. Fluid 428 may be concentrated or not concentrated. Inlet 412 may be coupled to water source 210. Water 424 may flow into the fluid flow structure 410 via inlet 412. The water 424 may flow into the housing 420 via channel 430A and may also flow through fluid flow structure 410 and exit via outlet 414. As water 424 flows through the fluid flow structure 410, water 424 enters the housing 420 and mixes with the fluid 428 to form water-fluid mix 426A.

Referring to FIG. 4B, housing 420 includes water-fluid mix 426A responsive to the water 424 entering the housing 420 and mixing with the fluid 428. Water 424 continues to enter inlet 412, flow through fluid flow structure 410, and exit via outlet 414 which causes suction via siphon component 422 (e.g., fluid flowing across the top of the siphon component 422 causes low pressure in the siphon component 422 which pulls the water-fluid mix 426A up through the siphon component 422 and into the fluid flow structure 410). The water-fluid mix 426A mixes with the water 424 flowing through the fluid flow structure 410 to form water-fluid mix 426B (e.g., a mixture of water 424 and water-fluid mix 426A, a more diluted version of water-fluid mix 426A).

As water-fluid mix 426A exits the housing 420 via siphon component 422 and channel 430B, more water 424 enters the housing 420 via channel 430A and mixes with the water-fluid mix 426A. This continues until housing includes only water 424 (or a very diluted water-fluid mix 426A) or until the wash cycle is completed.

In FIG. 4A, the animal washing system 100 is in a wetting cycle. In FIG. 4B, the animal washing system 100 is in a soap cycle. Once only water 424 (or a very diluted water-fluid mix 426A) is in the fluid flow structure 410, the animal washing system 100 is in a rinse cycle.

In some embodiments, the fluid reservoir 229 does not have channel 430A. A premixed water-fluid mix 426 is added to the housing 420 and the housing 420 is connected to the fluid flow structure. As water flows through the fluid flow structure 410, the premixed water-fluid mix 426 is siphoned into the fluid flow structure 410 and provided via outlet. Once the premixed water-fluid mix 426 is completely siphoned from the housing 420, only water 424 flows through the fluid flow structure 410 to the controller 160.

Figure 5:
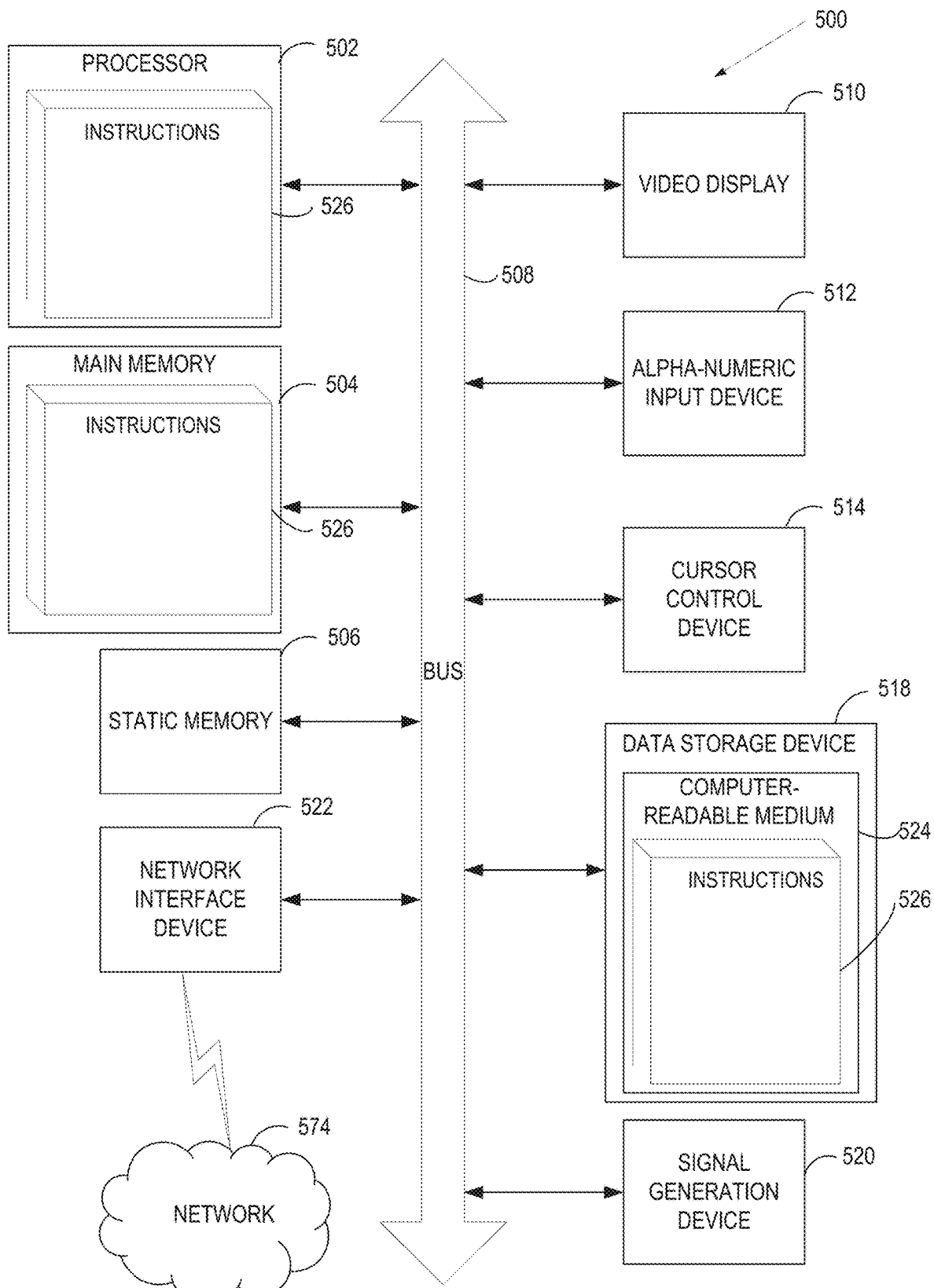
FIG. 5 is a block diagram illustrating a computer system, according to certain embodiments.

FIG. 5 is a block diagram illustrating a computer system 500, according to certain embodiments. In some embodiments, the computer system 500 is a controller 160 of an animal washing system 100. In some embodiments, the computer system 500 is configured to communicate with controller 160 of animal washing system 100.

In some embodiments, computer system 500 is connected (e.g., via a network, such as a Local Area Network (LAN), an intranet, an extranet, or the Internet) to other computer systems. In some embodiments, computer system 500 operates in the capacity of a server or a client computer in a client-server environment, or as a peer computer in a peer-to-peer or distributed network environment. In some embodiments, computer system 500 is provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 includes a processing device 502, a volatile memory 504 (e.g., Random Access Memory (RAM)), a non-volatile memory 506 (e.g., Read-Only Memory (ROM) or Electrically-Erasable Programmable ROM (EEPROM)), and a data storage device 516, which communicate with each other via a bus 508.

In some embodiments, processing device 502 is provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

In some embodiments, computer system 500 further includes a network interface device 522 (e.g., coupled to network 574). In some embodiments, computer system 500 also includes a video display unit 510 (e.g., an LCD), an alphanumeric input device 512 (e.g., a keyboard), a cursor control device 514 (e.g., a mouse), and a signal generation device 520.

In some implementations, data storage device 516 includes a non-transitory computer-readable storage medium 524 on which store instructions 526 encoding any one or more of the methods or functions described herein, including instructions for implementing methods described herein.

In some embodiments, instructions 526 also reside, completely or partially, within volatile memory 504 and/or within processing device 502 during execution thereof by computer system 500, hence, in some embodiments, volatile memory 504 and processing device 502 also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Figure 6A:
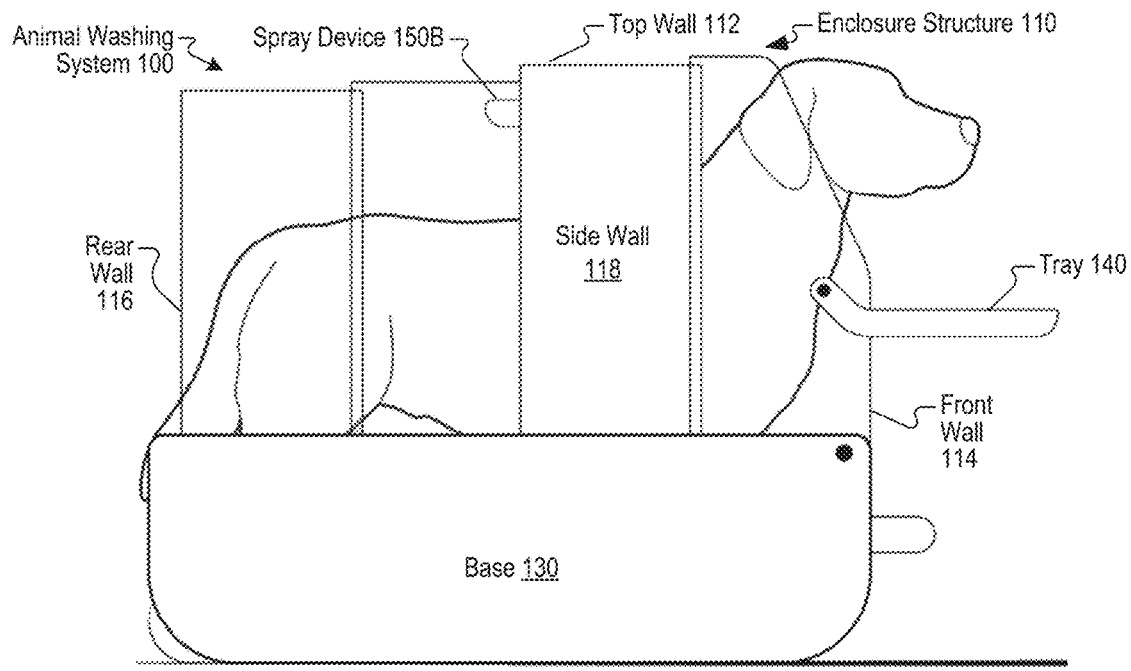
FIGS. 6A-R illustrate views of animal washing systems that have a slide archetype, according to certain embodiments.

FIGS. 6A-R illustrate views of animal washing systems 100 that have a slide archetype (e.g., sliding cover), according to certain embodiments. The slide archetype may be compact and may have an automatic opening. In some embodiments, the animal washing system 100 may have translucent hard plastic segments, a solid segment that hides spray devices 150 (e.g., shower heads) and plumbing (e.g., piping, hoses, etc.), an interface area, a leash lock, etc.

Figure 6B:
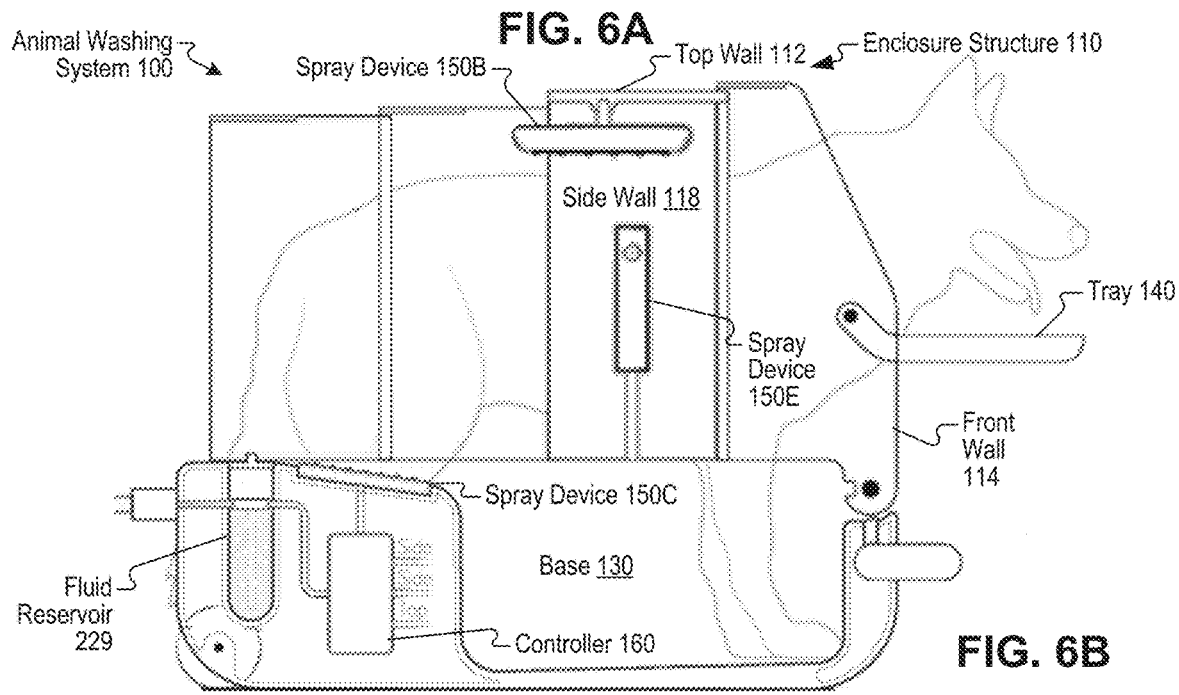

In some embodiments, the animal washing system 100 has one or more components that vary from those shown in one or more of FIGS. 6A-R. In some embodiments, the fluid reservoir 229 is located at the front (e.g., proximate front wall 114) of the animal washing system 100. In some embodiments, there are four enclosure parts (e.g., as shown in FIGS. 6A-B) that form top wall 112. In some embodiments, there are three enclosure parts that form top wall 112. In some embodiments, spray device 150B (e.g., top sprayer) and spray device 150A (e.g., front sprayer) are oscillating fan-profile nozzle sprinklers (e.g., similar to the spray devices 150D-E). In some embodiments, spray device 150A is not detachable as a hand sprayer (e.g., there is a separate hand sprayer). In some embodiments there are two spray devices 150D on side wall 118A and two spray devices 150E on side wall 118B. In some embodiments, at least a portion of the spray devices 150 (e.g., spray devices 150D-E) are on an independent frame (e.g., scaffold) which rotates down (e.g., into the base 130). In some embodiments, the spray device 150F (e.g., rear sprayer) is a shower head. In some embodiments, animal washing system 100 does not include spray device 150F (e.g., rear sprayer).

Figure 6C:
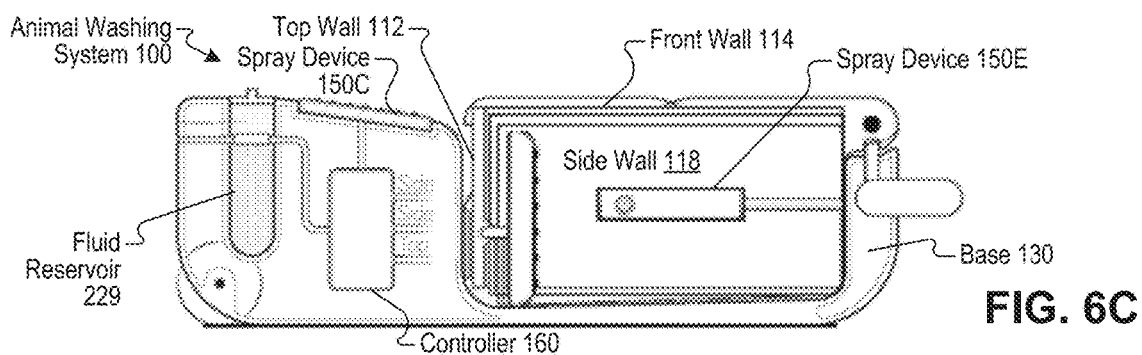

FIG. 6A illustrates a side view of an animal washing system 100, where an animal is located inside the enclosure structure 110. FIG. 6B illustrates components of the animal washing system 100. FIG. 6C illustrates components of the animal washing system 100 responsive to the animal washing system 100 being in a collapsed position.

FIGS. 6D-G illustrate setup of the animal washing system 100, according to certain embodiments.

Figure 6E:
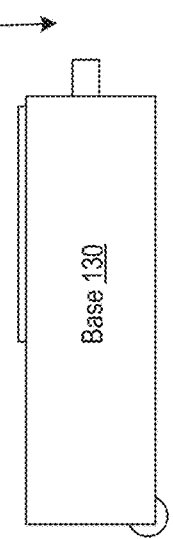
Figure 6D:
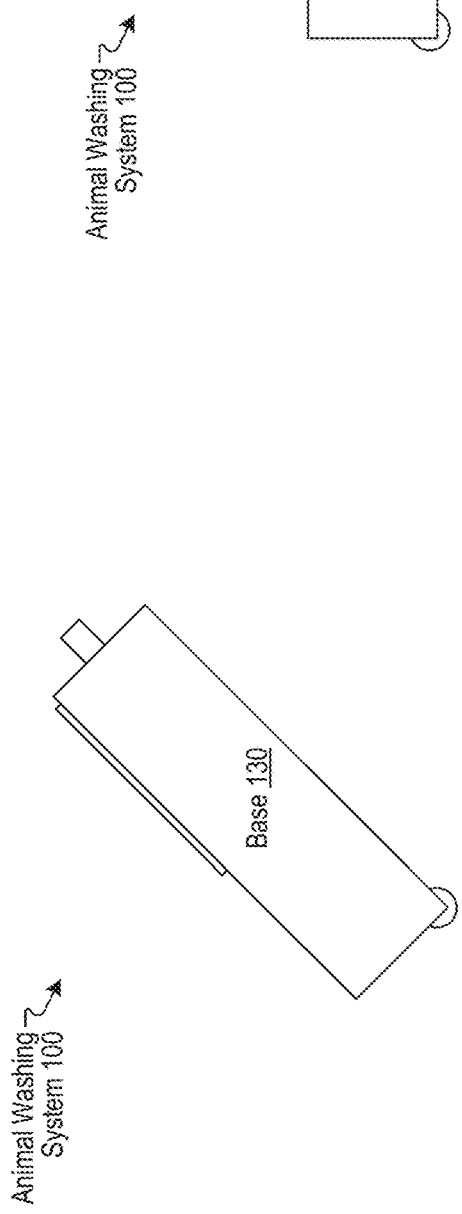

As illustrated in FIG. 6D, the animal washing system 100 may be wheeled to a location for setup. The setup location may be a location where fluids may drain (e.g., in a bathtub, on a surface that has a drain, outside, on a patio, etc.).

As illustrated in FIG. 6E, the animal washing system 100 may be placed on a substantially horizontal surface. The animal washing system 100 may fit in a large and/or small bathtub. An additional handle may be located on the base 130 (e.g., base molding) to help remove the animal washing system 100 from the bathtub.

Figure 6G:
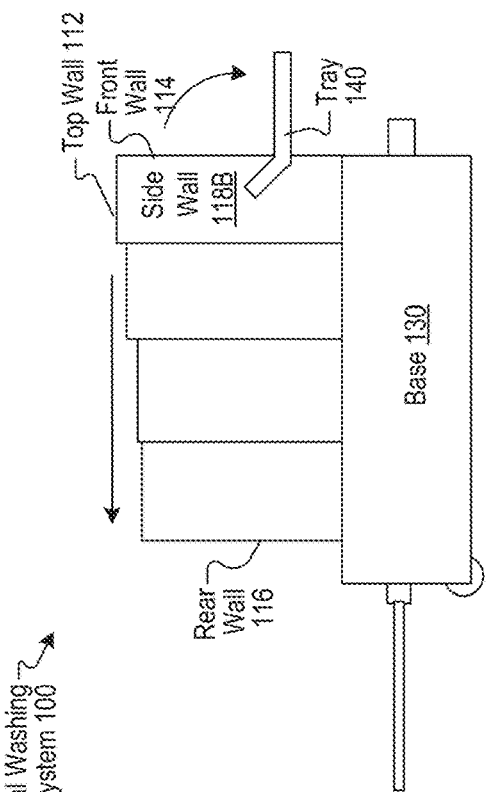
Figure 6F:
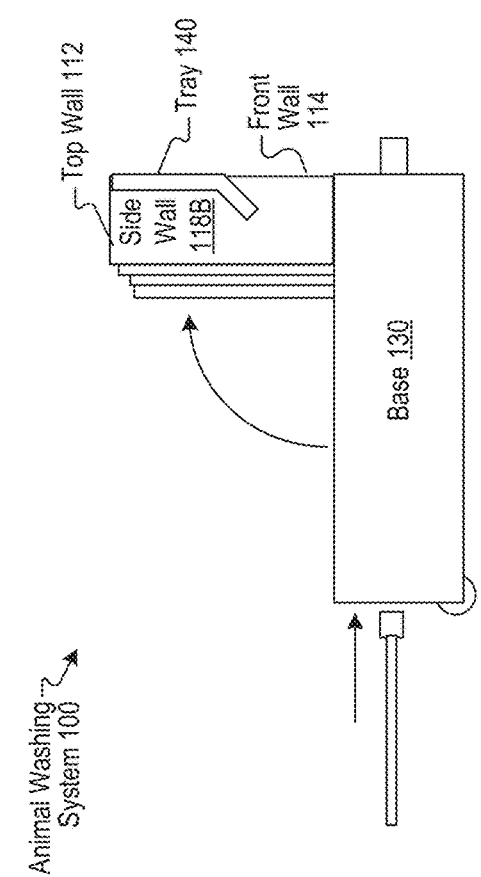

As illustrated in FIG. 6F, the enclosure structure 110 may pivot to an upright position and one or more piping (e.g., water hose, waste hose, etc.) may be attached to the animal washing system 100 (e.g., to base 130). The water piping may be connected to a water source and/or waste piping may be directed to a drainage location (e.g., a drain, grass, soil, gutter, curb, landscaping, etc.). The enclosure structure 110 may have a protrusion that protrudes from each side wall 118 and interfaces with the base 130 (via a recess or opening formed by the base 130). In some embodiments, pressing of the handle causes the enclosure structure 110 to automatically unfold. In some embodiments, pressing of the enclosure structure 110 disposed in the base 130 causes the enclosure structure 110 to disengage (e.g., disengage with a clip in the base 130) and automatically rotate to an upright position. In some embodiments, an independent frame (e.g., scaffold) attached to spray devices 150 (e.g., spray devices 150D-E) is rotated to an upright position separate from the enclosure structure 110 rotating to the upright position.

As illustrated in FIG. 6G, the tray 140 may be rotated to an extended position and the side walls 118 of the enclosure structure may be extended. Consumables (e.g., treats) may be added to the tray 140. In some embodiments, the animal enters the base 130 to eat the consumables on the tray 140 and then the side walls 118 of the enclosure structure 110 are extended (e.g., sliding cover back). The animal may be secured to the enclosure structure 110 via a slip collar attached to a slip collar latch point. A rear wall 116 may cover a rear opening of the animal washing system 100. In some embodiments, the rear wall 116 is material (e.g., fabric) that covers the rear opening formed by the top wall 112 and side walls 118. In some embodiments, the rear wall 116 is a splash cover placed over an open area (e.g., the back of the enclosure structure 110 is open, the animal is walked into and out of the enclosure structure 110 through the back of the enclosure structure 110, the sidewalls are telescoped or periscoped around the animal, and the splash cover is placed over the open rear area). Spray convers may be located around the neck of the animal (e.g., at the front of the animal washing system 100) and may cover the backside of the animal washing system 100 (e.g., so that water does not splash out of the back).

The base 130 (e.g., folded section of the animal washing system 100) may include a lower sprayer (e.g., spray device 150C), an easy access liquid soap fill (e.g., fluid reservoir 229), and a locking latch. The enclosure structure 110 (e.g., unfolded section of the animal washing system 100) may have a top sprayer (e.g., spray device 150B), a side sprayer (e.g., oscillating spray device, spray devices 150D-E), water in, and a manifold (e.g., housing 162 of controller 160).

FIGS. 6H-J illustrate views of the animal washing system 100 in a collapsed position. FIG. 6H illustrates a perspective view, FIG. 6I illustrates a side view, FIG. 6J illustrates a top view, FIG. 6K illustrates a front view, and FIG. 6L illustrates a rear view.

Figure 6M:
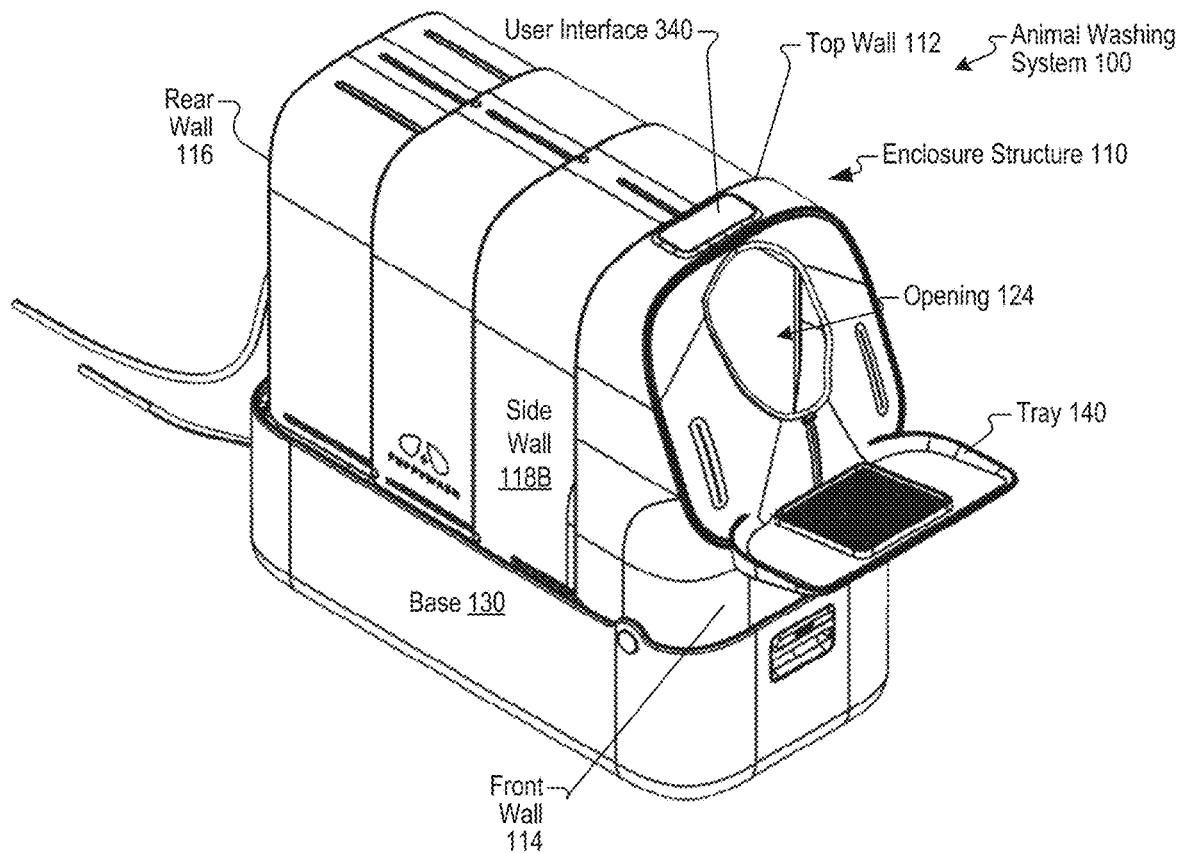
Figure 6N:
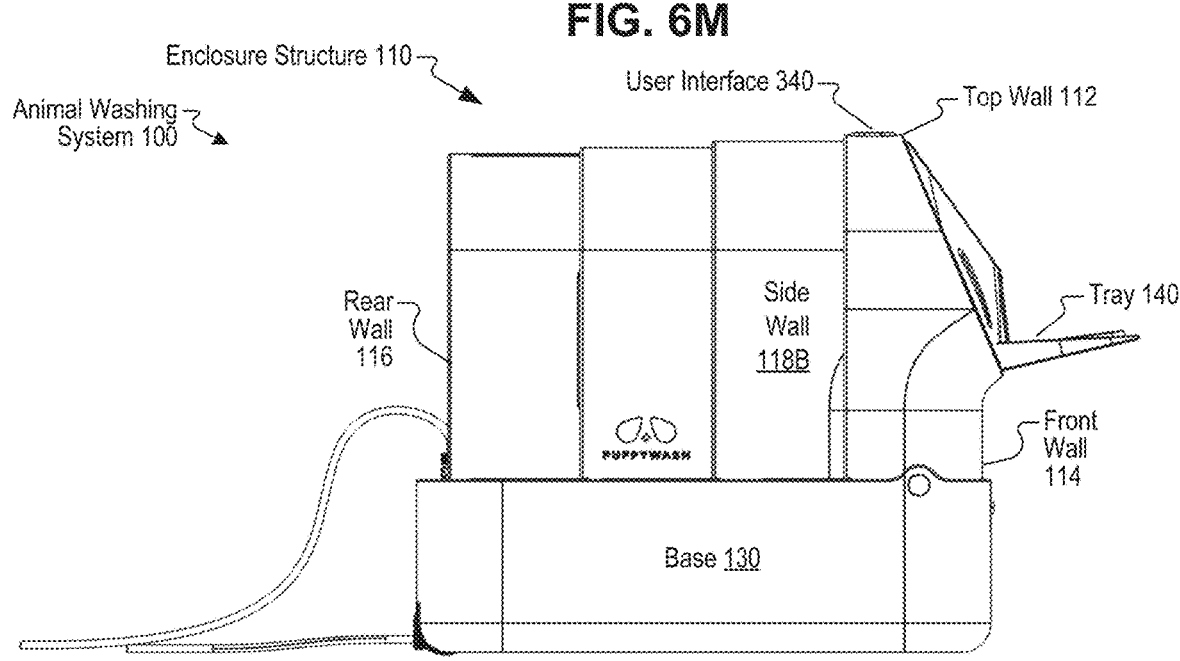
Figure 7A:
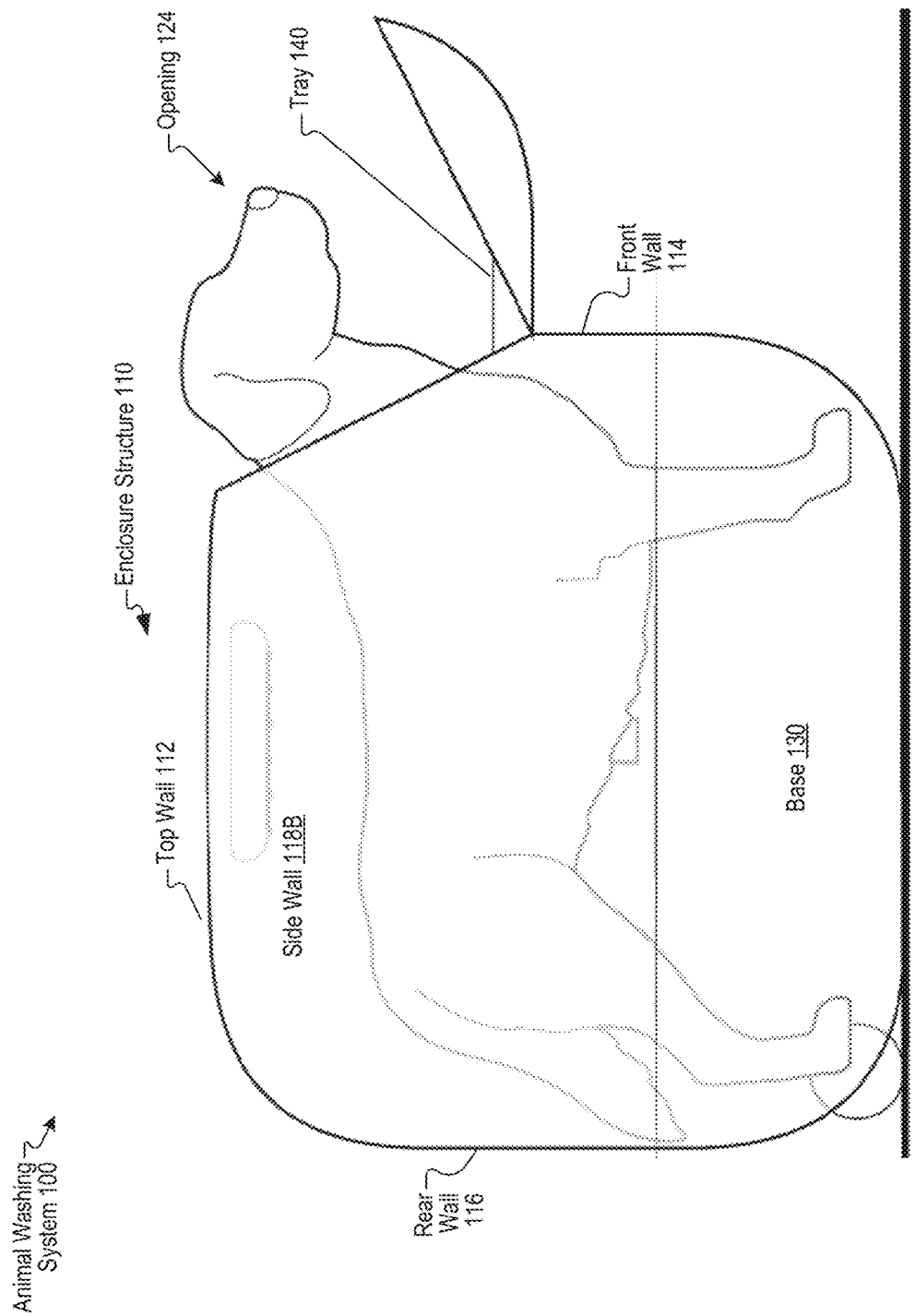
Figure 8A:
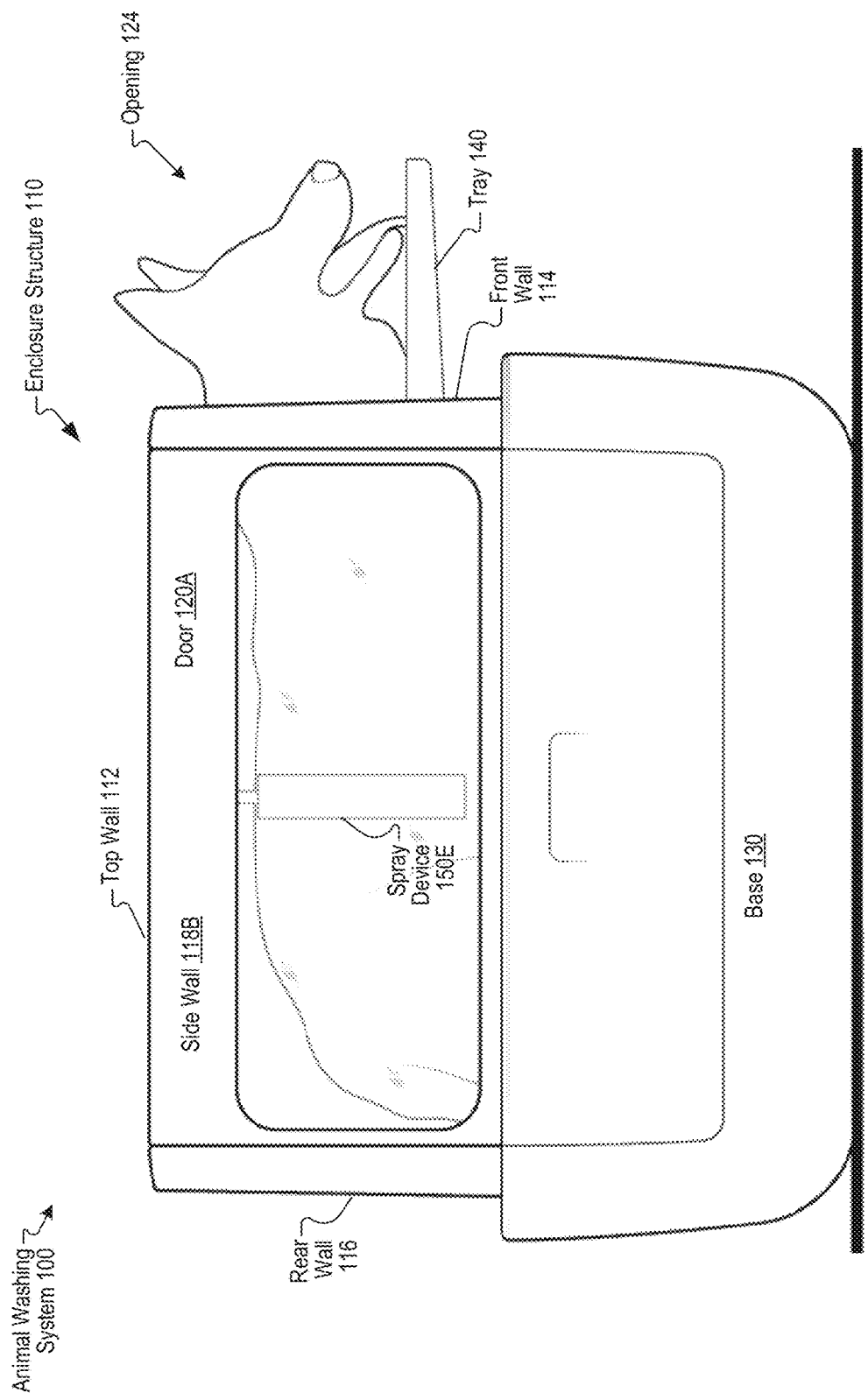
Figure 9A:
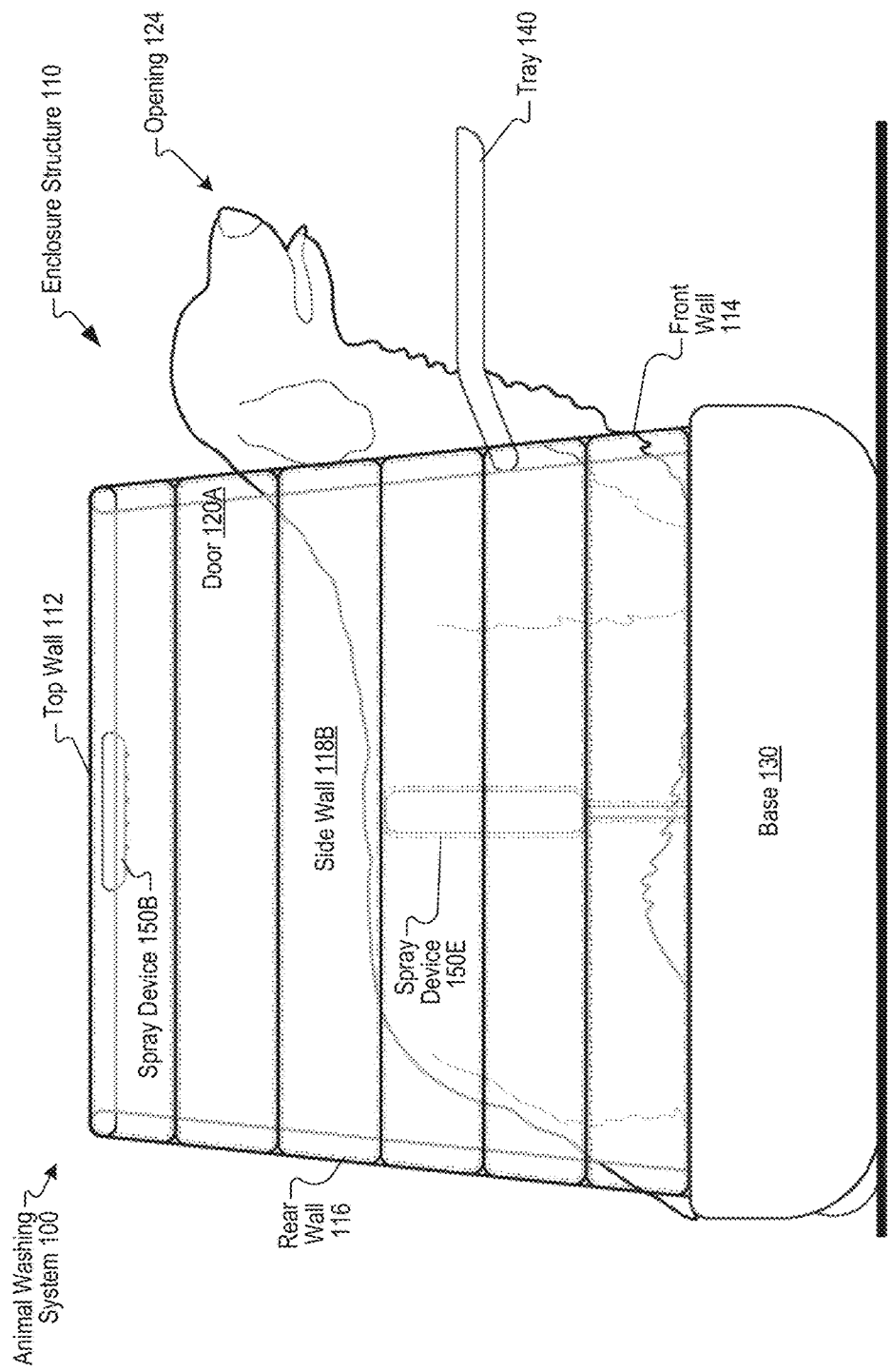

FIGS. 6M-R illustrate views of the animal washing system 100 in an upright position. FIG. 6M illustrates a perspective view, FIG. 6N illustrates a side view, FIG. 6O illustrates a bottom view, FIG. 6P illustrates a top view, FIG. 6Q illustrates a front view, and FIG. 6R illustrates a rear view.

As illustrated in FIGS. 6L and 6R, the fluid reservoir 229 may be accessible via the rear surface of the base 130. In some embodiments, the fluid reservoir 229 includes a handle for lifting the animal washing system 100. In some embodiments, the fluid reservoir 229 is disposed in the base 130 below a handle configured for lifting the animal washing system 100. In some embodiments, the fluid reservoir 229 pivots out, cleaning fluid (e.g., soap, shampoo) is added in the top of the fluid reservoir, and the fluid reservoir 229 is pivoted to a closed position. In some embodiments, the fluid reservoir 229 can be removed from the base 130 to be filled and then may be re-attached to the base 130.

FIGS. 7A-E illustrate views of animal washing systems 100 that have a pod archetype, according to certain embodiments. The pod archetype may be simple to connect, may have a large, robust structure, and may completely encase (e.g., encapsulate) the body of the animal (e.g., except for the head of the animal). In some embodiments, the animal washing system 100 may have two large handles to simplify removing and assembling of the top half, an interface area, a lease lock, molded semi-translucent plastic body, etc. In some embodiments, two large handles may simplify removing and assembling the top half. The animal washing system may fit in a large and/or small bathtub.

As illustrated in FIG. 7B, the setup user experience may include rolling the animal washing system 100 to a location for use.

As illustrated in FIG. 7C, the setup may further include removing the top half (e.g., of the enclosure structure 110) and folding out the tray 140 (e.g., treat tray) from the lower half (e.g., base 130). In some embodiments, the tray 140 is attached to the base 130 (e.g., without being attached to the enclosure structure 110). In some embodiments, the tray 140 is attached to the enclosure structure 110 (e.g., without being attached to the base 130). The animal entering the animal washing system 100 (e.g., enter the base 130) to get treats. The water connection (e.g., and waste hose) may be connected to the animal washing system 100.

As illustrated in FIGS. 7D-E, the top half (e.g., enclosure structure 110) may be attached to the bottom half (e.g., base 130) and the washing cycle may be started. In some embodiments, there are connections between the base 130 and walls (e.g., side walls 118A-B) of the enclosure structure 110 that engage when the top half is placed on the bottom half. The connections may allow liquid to flow through the base 130 and the walls to the spray devices 150.

FIGS. 8A-G illustrate views of animal washing systems 100 that have a gullwing (e.g., door that opens upward) archetype, according to certain embodiments. The gullwing archetype may include one or more doors that open upward (e.g., hinged at the roof or the opposite side of the enclosure structure). The gullwing archetype may be simple to connect, may have a large, robust structure, may completely encase the body of the animal (e.g., except for the head of the animal), and may have clear windows. The animal washing system may include clear plastic windows (e.g., on both sides), an interface area, a leash lock, etc.

As illustrated in FIG. 8B, the setup may include pulling out the animal washing system 100 to a location for use.

As illustrated in FIG. 8C, the setup may further include flipping the top half and assembling the top half to the base 130 (e.g., top half can be assembled in both directions). As illustrated in FIG. 8C, the setup may further include attaching the water connection (e.g., and waste hose).

As illustrated in FIG. 8D, the setup may further include folding open the doors (e.g., top door 120B folds on itself creating a larger opening, bottom door folds down). As illustrated in FIG. 8D, the top door may open to allow the animal to enter the animal washing system 100. The lower door may not be opened when the animal washing system 100 is placed in a bathtub due to bathtub height. The animal washing system 100 may fit in a large and/or small bathtub.

As illustrated in FIG. 8E, the setup may further include folding down the tray 140 (e.g., treat tray). The animal may enter the animal washing system 100 to get treats from the tray 140.

As illustrated in FIGS. 8F-G, the setup may further include closing the doors and staring the washing cycle.

FIGS. 9A-H illustrate views of animal washing systems 100 that have a frame archetype (e.g., moveable cover, rising cover), according to certain embodiments. The frame archetype may be compact, may be lightweight, may not limit height, and may have sides (e.g., side walls 118A-B) that can be removed for drying. The animal washing system 100 may include a plastic endcap, an interface area, a leash lock, side panels (e.g., side walls 118A-B) that can be removed for drying and/or cleaning, rigid transparent slats or panels, etc. The slats or panels (e.g., side walls 118A-B) of the animal washing system 100 may be made of one or more of plastic, fabric, neoprene, silicone, rubber, real leather, synthetic leather, polyurethane, thermoplastic polyurethane (TPU), etc. In some embodiments, the animal washing system 100 fits in a large and/or small bathtub.

As illustrated in FIG. 9B, the setup may include pulling out the animal washing system 100 to a location for use.

As illustrated in FIGS. 9C-D, the setup may further include folding out the frame (e.g., front wall 114, rear wall 116, top wall 112, side walls 118A-B) and assembling the animal washing system 100. For example, the front wall 114 may be pivotably attached to a first distal end of the base 130 and the rear wall 116 may be pivotably attached to a second distal end of the base 130. The front wall 114 may be pivoted out of the base 130 into a substantially upright position and the rear wall may be pivoted out of the base 130 into a substantially upright position. A top wall 112 may be pivotably attached to the rear wall 116 and/or the front wall 114. Responsive to the rear wall 116 and front wall 114 being in substantially upright positions, the top wall 112 may be pivoted (e.g., relative to the rear wall 116, relative to the front wall 114) and may engage with the front wall 114 or rear wall 116. The side walls 118A-B may be attached to the top wall 112 or the base 130. In some embodiments, the side walls 118A-B are in a folded state.

As illustrated in FIGS. 9E, setup may further include attaching the water connection (e.g., and waste hose) and folding down the tray 140 (e.g., treat tray). Consumables (e.g., treats) may be added to the tray 140 and the animal may enter the animal washing system 100 (e.g., enter the base 130) to get treats.

The animal washing system 100 may include FIG. 9F and/or FIG. 9G to cover the sides of the animal washing system 100 with side walls 118A-B.

As illustrated in FIG. 9F, the side walls 118A-B may fold down from a location proximate the top wall 112 to cover the sides of the animal washing system 100. The side walls 118A-B may attach to a portion of the animal washing system 100 proximate the base 130.

As illustrated in FIG. 9G, the side walls 118A-B may fold up from a location proximate the base 130 to cover the sides of the animal washing system 100. The side walls 118A-B may attach to a portion of the animal washing system 100 proximate the top wall 112.

In some embodiments, one side wall 118 may fold down and the other side wall 118 may fold up. In some embodiments, the side walls 118 may be removed from the base 130 and attached to the front wall 114 and rear wall 116.

As illustrated in FIG. 9H, responsive to the side walls 118 (e.g., slats, panels) covering the sides of the animal washing system 100, the wash cycle of the animal washing system may be started.

Figure 10A:
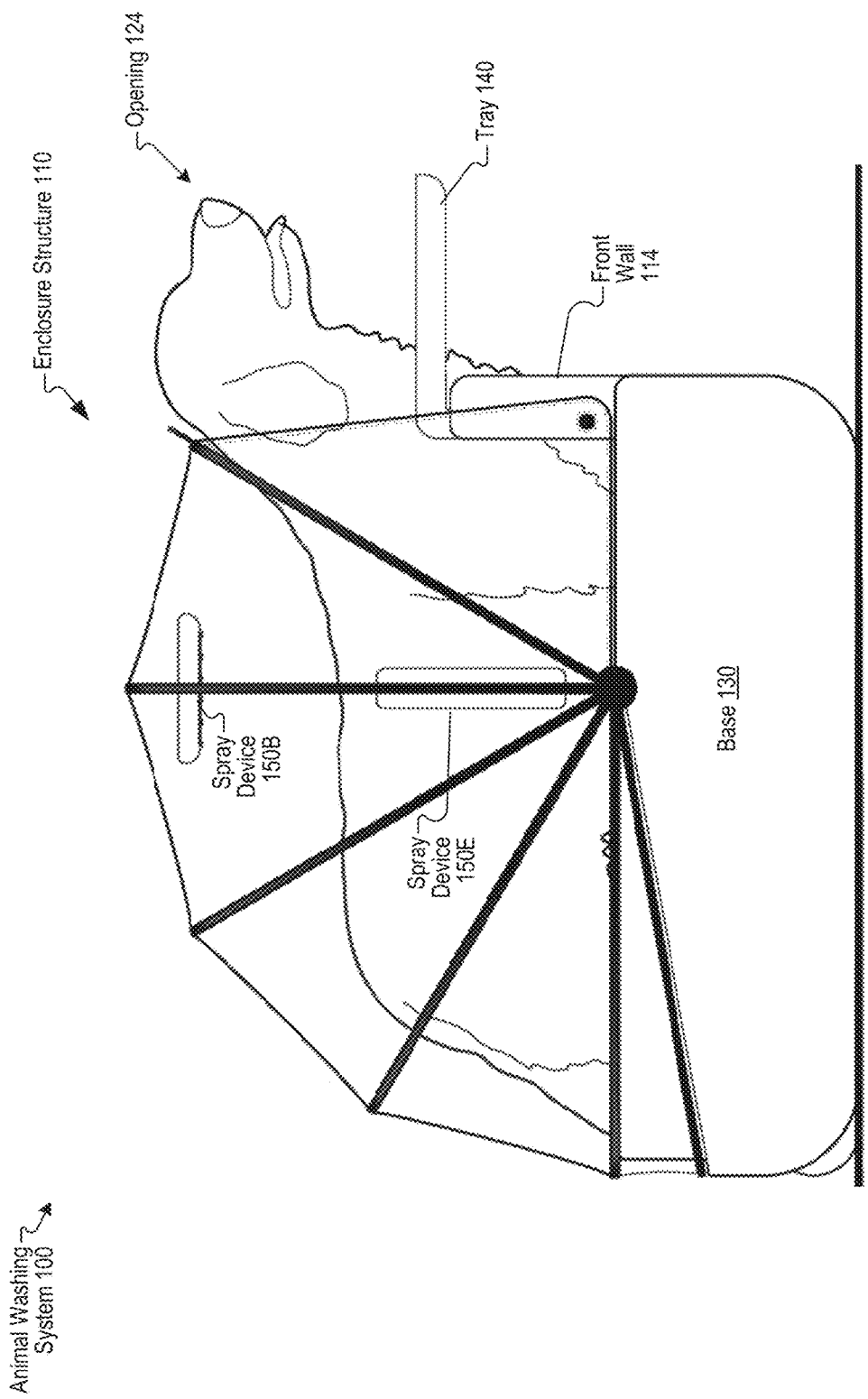
Figure 11A:
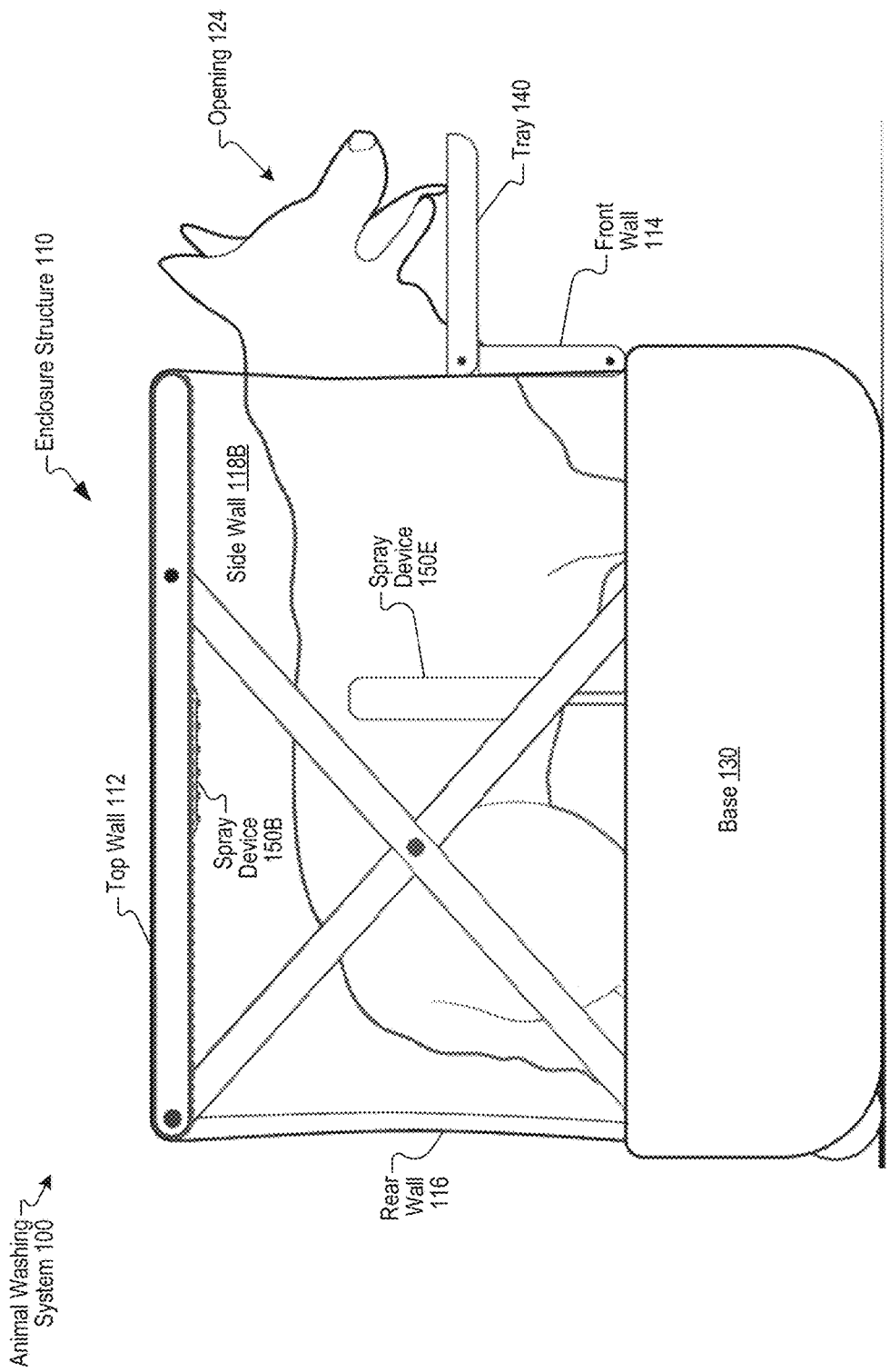

FIGS. 10A-C illustrate views of animal washing systems that have an armadillo archetype, according to certain embodiments. The armadillo archetype may be compact, may be lightweight, and may have simple set-up. The animal washing system may include an interface area, a leash lock, a translucent nylon mesh or clear waterproof fabric, showerheads that rotate up with the cover, etc. In some embodiments, the animal washing system 100 may fit in a large and/or small bathtub.

FIGS. 10B-F illustrate setup of the animal washing system 100.

As illustrated in FIG. 10B, the setup may include pulling out the animal washing system 100. As illustrated in FIG. 10C, setup may include attaching the water connection (e.g., and waste hose) and folding out the tray 140 (e.g., treat tray and splash guard). The animal enters animal washing system 100 (e.g., base 130) to get treats.

As shown in FIGS. 10D-F, the enclosure structure 110 (e.g., cover) is pulled from a first distal end of the base 130 towards a second distal end of the base 130 that is proximate the tray 140. Side covers of the enclosure structure 110 may be connected to a location proximate the base 130 and tray 140. The washing cycle may then be started.

FIGS. 11A-F illustrate views of animal washing systems 100 that have a lift archetype, according to certain embodiments. The lift archetype may be compact and may have automatic set-up. The animal washing system 100 may include a clear plastic top window, an interface area, a leash lock, a nylon mesh fabric, automated scissor lift, etc. In some embodiments, the animal washing system 100 may fit in a large and/or small bathtub.

FIGS. 11B-F illustrate setup of the animal washing system 100.

As illustrated in FIG. 11B, the setup may include pulling (e.g., rolling) out the animal washing system 100 to a location for use.

As illustrated in FIG. 11C, setup may further include attaching the water connection (e.g., and waste hose), folding out the tray 140 (e.g., treat tray), and folding out the top wall 112 (e.g., top cover). The animal enters the animal washing system 100 to get treats.

As illustrated in FIG. 11D, setup may include pushing a button to automatically unfold the fabric sides of the enclosure structure 110.

As illustrated in FIG. 11E, setup includes folding down the top wall 112 (e.g., top cover). At FIG. 11F, the washing cycle may be started.

An animal washing system can include any combination of features from the different FIGS. and description of the present disclosure. In some embodiments, an animal washing system may include one or more of a ramp that the animal goes up to enter the enclosure structure, an Mill configuration (e.g., animal is located on a platform that is moved into and out of the enclosure structure, components to locate the animal washing system over a bathtub, a door that rolls into the enclosure structure similar to a garage door or bread bin, a rising cover (e.g., rises up and down), a sliding cover (e.g., slides left and right), gullwing, gullwing hybrid, hatch (e.g., door rotates up and to the rear), barn doors (e.g., doors rotate out to either side), single horizontal door, frame and panels (e.g., fabric or hard panels, fabric folds up, fabric attached via magnet), rotating cover (e.g., similar to rotating collapsible stroller canopy), origami (e.g., side walls fold out), top half that removes, etc.

Figure 12A:
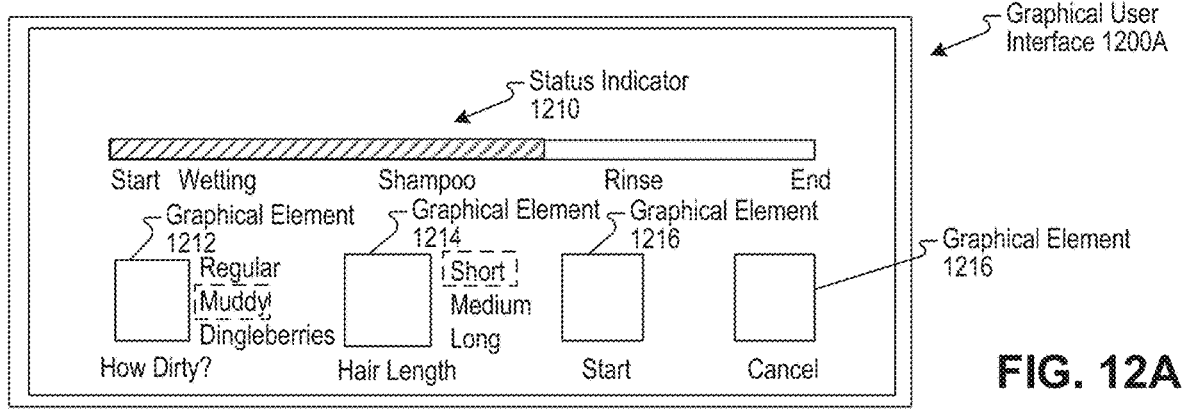
FIGS. 12A-C illustrate graphical user interfaces associated with animal washing systems, according to certain embodiments.
Figure 12B:
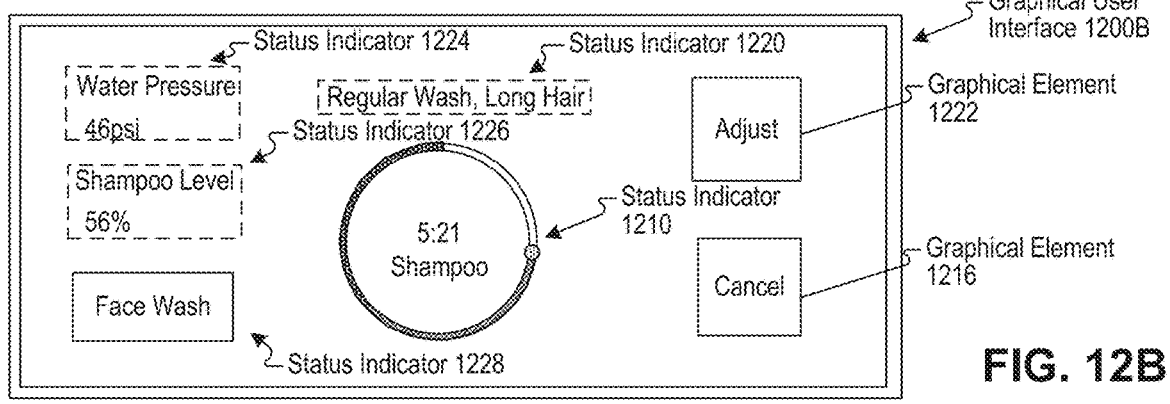
Figure 12C:
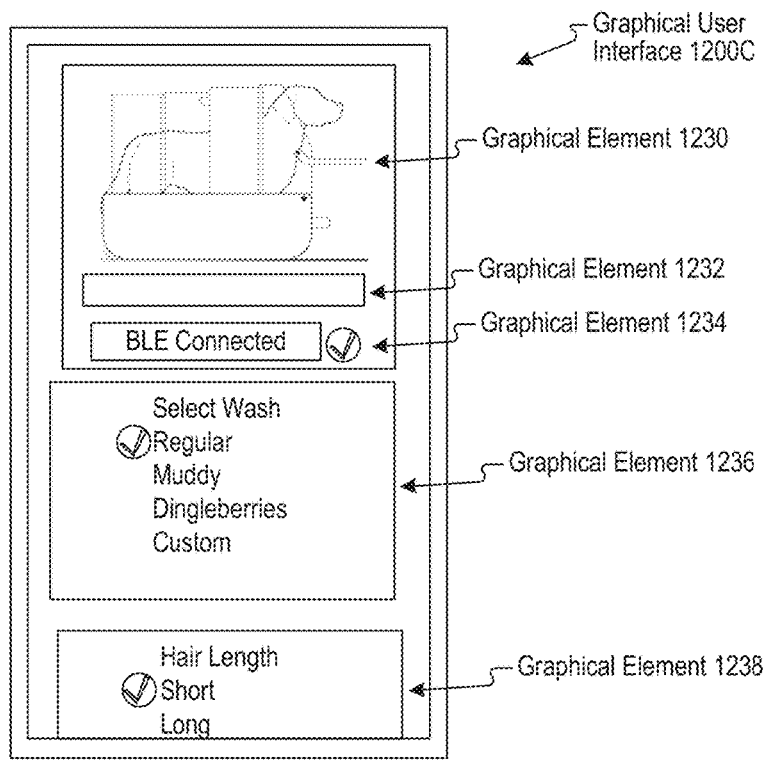

FIGS. 12A-C illustrate graphical user interfaces (GUIs) 1200A-C associated with animal washing systems (e.g., animal washing systems 100), according to certain embodiments. In some embodiments, GUI 1200 is integral to the animal washing system 100 (on top wall 112, on base 130, etc.). In some embodiments, GUI 1200 is removably attached to the animal washing system 100 (on top wall 112, on base 130, etc.). In some embodiments, GUI 1200 is displayed via a user device (e.g., smart phone, tablet, computer, etc.) that is remote from the animal washing system 100 (e.g., communicates wirelessly with animal washing system 100).

In some embodiments, GUI 1200 receives user input to control animal washing system 100. In some embodiments, GUI 1200 displays information associated with the current state of animal washing system 100.

Referring to FIG. 12A, GUI 1200A may include a status indicator 1210. The status indicator 1210 may display the current portion of the wash cycle that the animal washing system 100 is currently operating. The status indicator 1210 may be a bar that is filled to the current cycle. The different portions of the wash cycle may include Start, Wetting, Shampoo, Rinse, and End.

A processing device (e.g., controller 160) may determine which portion of the wash cycle the animal washing system 100 is operating based on an amount of time since the wash cycle started, a quantity of cleaning fluid in the fluid reservoir 229, whether a valve to the fluid reservoir 229 is open, whether a valve 232 is providing air or water to the controller 160, etc.

GUI 1200A may include a graphical element 1212 (e.g., button) to select how dirty the animal is (e.g., regular, muddy, dingleberries). GUI 1200A may include a graphical element 1214 (e.g., button) to select the hair length of the animal (e.g., short, medium, long). Processing device (e.g., controller 160) may determine a type of wash based on the user input via graphical elements 1212 and 1214.

GUI 1200A may include a graphical element 1216 to start the wash cycle. GUI 1200A may include a graphical element 1218 to cancel the wash cycle (e.g., to turn off the animal washing system 100). Processing device (e.g., controller 160) may open a valve 232 to provide fluid to the controller 160 responsive to user input via graphical element 1216 and may close the valve 232 responsive to user input via graphical element 1218.

Referring to FIG. 12B, GUI 1200B may include a status indicator 1210. The status indicator may be a dial showing how far the washing cycle has reached. The status indicator 1210 may include an indication of how much time has passed since the beginning of the wash cycle or how much time is left in the wash cycle. The status indicator 1210 may indicate the current cycle (e.g., shampoo).

GUI 1200B may include a wash type indicator 1220. For example, the wash type indicator 1220 may indicate how dirty the animal is and/or the hair length of the animal (e.g., Regular Wash, Long Hair).

GUI 1200B may include a graphical element 1222 to adjust the type of wash. For example, a user may click on the graphical element 1222 to go through different options of types of wash (e.g., how dirty the animal is, hair length, etc.).

GUI 1200B may have a graphical element 1224 that displays the water pressure (e.g., water pressure 46 psi) of water entering the controller 160. GUI 1200C may have a graphical element 1226 that displays the shampoo level (e.g., shampoo level 56%) of the fluid reservoir 229. GUI 1200D may have a graphical element 1228 that can be selected to wash the face of the animal (e.g., provide fluid to spray device 150A, provide fluid to the hand sprayer).

Referring to FIG. 12C, GUI 1200C may include graphical elements 1230-1238. GUI 1200C may be a touch screen where a user may select different options.

In some embodiments, graphical element 1230 illustrates a graphical representation of the type of animal washing system with which the GUI 1200C associated (e.g., to which the user device displaying GUI 1200C is wirelessly connected). Graphical element 1232 may illustrate an identifier (e.g., name) of the animal washing system with which the GUI 1200C associated (e.g., to which the user device displaying GUI 1200C is wirelessly connected). Graphical element 1234 may display an indication of wireless connection (e.g., BLE connected). Graphical element 1236 may display the type of wash selected (e.g., regular, muddy, dingleberries, custom). Graphical element 1238 may display the hair length of the animal (e.g., short, medium, long).

In some embodiments, a GUI 1200 includes any combination of features of GUIs 1200A-C.

Figure 13A:
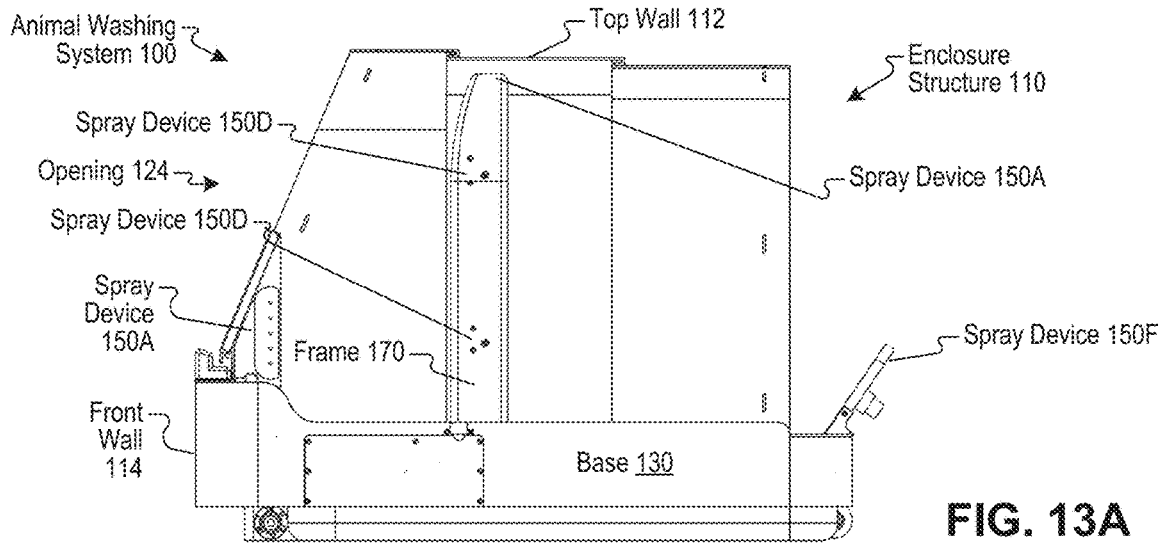
FIGS. 13A-F illustrate views of animal washing systems, according to certain embodiments.
Figure 13B:
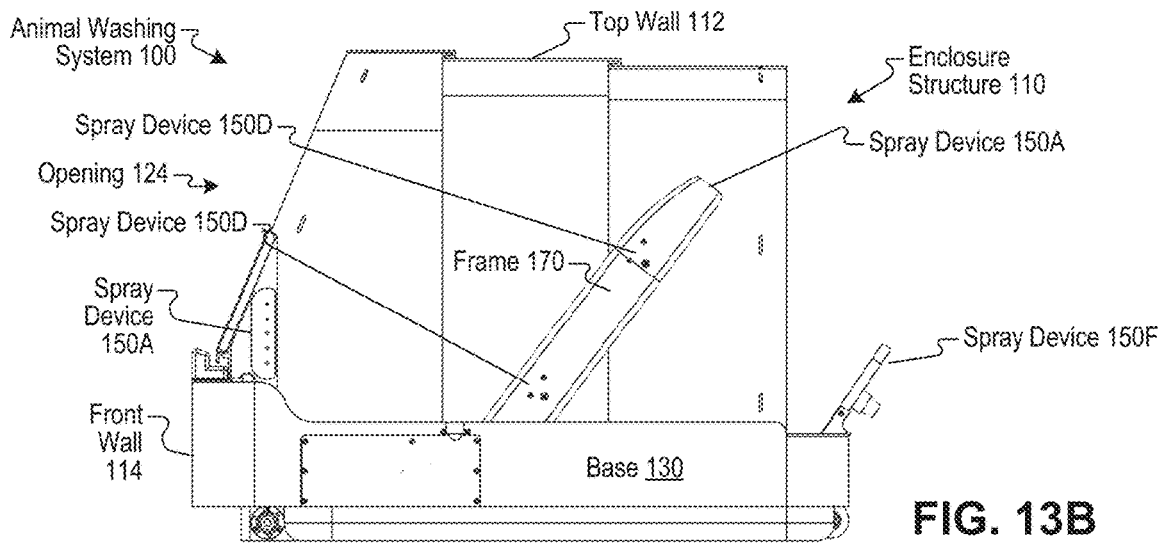
Figure 13C:
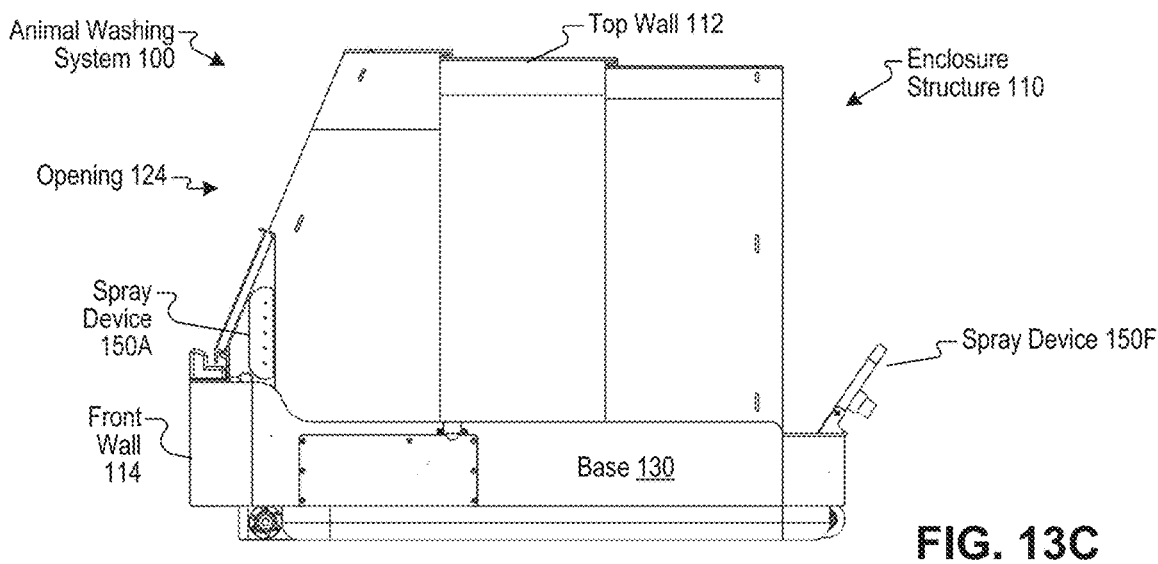
Figure 13D:
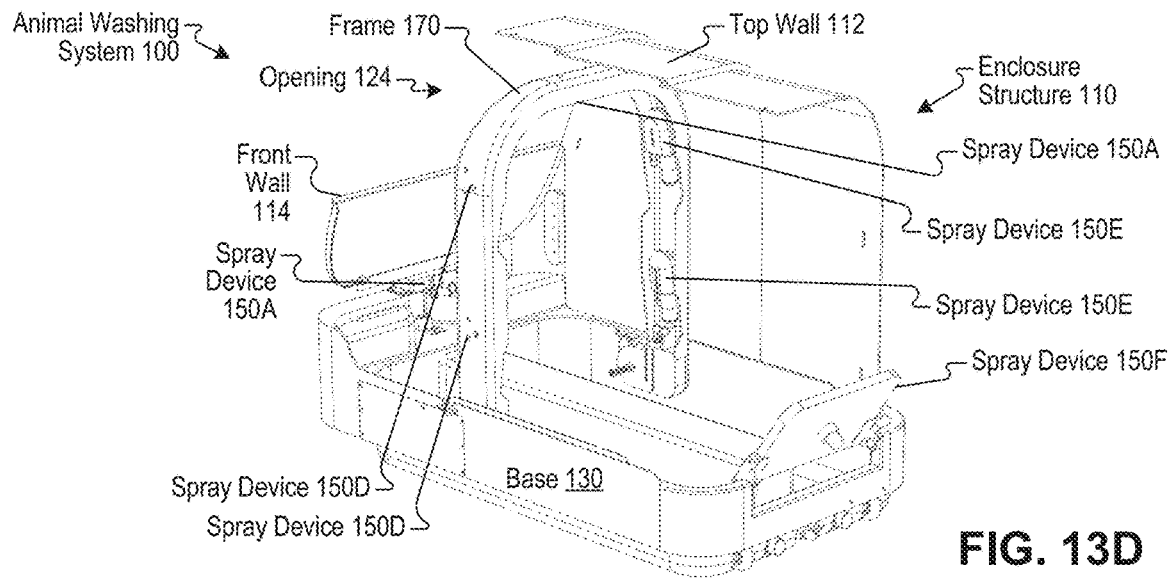
Figure 13E:
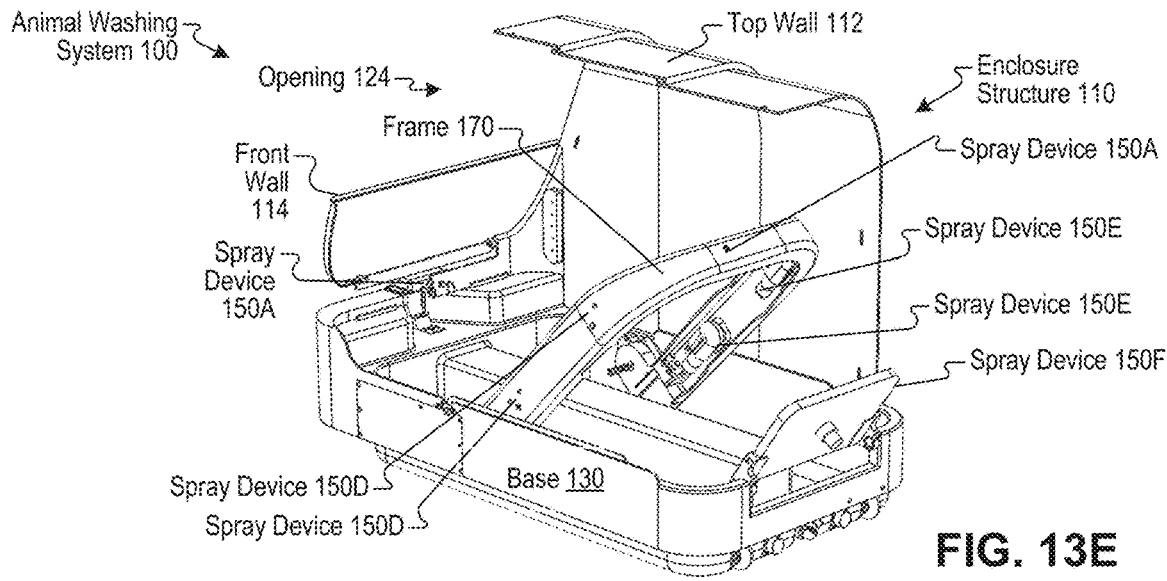
Figure 13F:
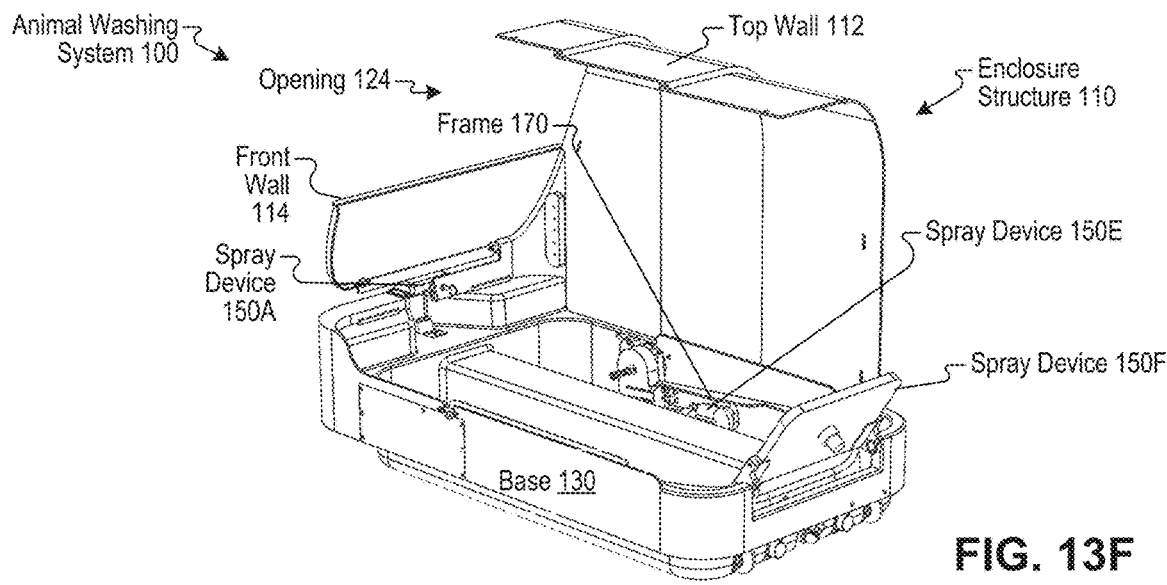

FIGS. 13A-F illustrate views of animal washing systems 100, according to certain embodiments. The animal washing system 100 may include a frame 170 (e.g., scaffolding). One or more spray devices 150 may be coupled (e.g., attached, integral) to frame 170. FIGS. 13A-C are side views and FIGS. 13D-F are perspective views. FIGS. 13A and 13D illustrate the frame 170 in an upright position. FIGS. 13B and 13E illustrate the frame 170 in an inclined position. FIGS. 13C and 13F illustrate the frame 170 in a declined position.

An animal washing system 100 includes spray devices 150. One or more of the spray devices 150 may be coupled (e.g., attached, integral) to portions of frame 170. For example, spray device 150A may be coupled to an upper portion of frame 170, spray devices 150D may be coupled to a first side portion of frame 170, and spray devices 150E may be coupled to a second side portion of frame 170. Spray device 150F (e.g., rear sprayer) may be coupled to the base 130. Spray device 150F may rotate relative to base 130 (e.g., from a stored position, to a use position).

The frame 170 may be rotatably coupled to base 130. The frame 170 may form an inverted U-shape that has a top portion, a first side portion that extends from the top portion to a first distal end, and a second side portion (e.g., opposite the first side portion) that extends from the top portion to a second distal end. The first distal end may be rotatably coupled to a first side of the base 130 and the second distal end may be rotatably coupled to a second side of the base 130. The frame 130 may rotate from an upright position to an inclined position and from the inclined position to a declined position. The frame 130 may be rotated to the upright position to be used to wash an animal. The frame 130 may be rotated to the declined position to store the animal washing system 100. The frame 130 may be secured into the upright position and/or into the declined position (e.g., via a friction fit, via fasteners, etc.).

The enclosure structure 110 may collapse and/or rotate into the base 130 for storage of the animal washing system 100.

In some embodiments, one or more of the spray devices 150 are oscillating sprayers and/or sprinklers. In some embodiments, the spray devices 150 are hydraulically driven (e.g., flow of water through a spray device 150 causes the spray device 150 to oscillate). In some embodiments, the spray devices 150 are electrically driven (e.g., an electric motor causes a spray device 150 to oscillate). In some embodiments, spray devices 150 oscillate back and forth along the length of the animal (e.g., moves left and right instead of up and down). The spray devices 150 may oscillate back and forth along the length of the animal from a first side (e.g., spray devices 150D), from a second side (e.g., spray devices 150E), and from above the animal (e.g., one or more spray devices 150A).

In some embodiments, one or more of the spray devices 150 have a fan profile nozzle that causes the fluid to impact the animal in a substantially vertical spray pattern (e.g., substantially vertical spray formation, substantially vertical line, thin vertical line, substantially vertical rectangle, substantially vertical oval, etc.). The fluid may be a mixture of water and a cleaning solution (e.g., shampoo, conditioner, etc.). The fluid may impact the animal in a substantially vertical spray pattern with a concentrated force that causes the suds to bubble up (e.g., bubbling suds effect). As the spray device 150 moves (e.g., oscillates) along the length of the animal, the suds remain on the animal and clean the animal. As the spray device 150 oscillates back, either more suds are deposited over the existing suds (e.g., the fluid is a mixture of water and cleaning solution) or the water rinses away the existing suds (e.g., the fluid is water). By moving the direction of the fluid from the spray device 150 left and right along the length of the animal, the cleaning solution can remain on the animal to perform a cleaning operation (e.g., cleaning shampoos that are recommended to be applied to the fur and let sit for a threshold amount of time before rinsing) (e.g., instead of moving the direction of the fluid from the spray device 150 up and down where gravity would cause the new fluid to wash away the old fluid and not allow the cleaning solution to remain on the animal for the threshold amount of time).

In some embodiments, a spray device 150 is located in a fixed location and the spray device 150 causes the substantially vertical spray pattern to move horizontally along the length of the animal (e.g., the spray device 150 pivots at the fixed location). In some embodiments, a spray device 150 moves substantially horizontally (e.g., along a track) to cause the substantially vertical spray pattern to move horizontally along the length of the animal. In some embodiments, the spray device 150 moves substantially horizontally (e.g., along a track) and pivots (e.g., as the spray device 150 moves along the track) to cause the substantially vertical spray pattern to move substantially horizontally along the length of the animal.

In some embodiments, the methods, components, and features described herein are implemented by discrete hardware components or are integrated in the functionality of other hardware components such as ASICS, FPGAs, DSPs or similar devices. In some embodiments, the methods, components, and features are implemented by firmware modules or functional circuitry within hardware devices. In some embodiments, the methods, components, and features are implemented in any combination of hardware devices and computer program components, or in computer programs. In some embodiments, a mechanical timer (e.g., purely mechanical timer, no electronics) runs different valves or triggers different events.

Unless specifically stated otherwise, terms such as "actuating," "receiving," "providing," "obtaining," "determining," "identifying," "causing," "transmitting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. In some embodiments, the terms "first," "second," "third," "fourth," etc. as used herein are meant as labels to distinguish among different elements and do not have an ordinal meaning according to their numerical designation.

Examples described herein also relate to an apparatus for performing the methods described herein. In some embodiments, this apparatus is specially constructed for performing the methods described herein, or includes a general purpose computer system selectively programmed by a computer program stored in the computer system. Such a computer program is stored in a computer-readable tangible storage medium.

Some of the methods and illustrative examples described herein are not inherently related to any particular computer or other apparatus. In some embodiments, various general purpose systems are used in accordance with the teachings described herein. In some embodiments, a more specialized apparatus is constructed to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

The terms "over," "under," "between," "disposed on," and "on" as used herein refer to a relative position of one material layer or component with respect to other layers or components. For example, one layer disposed on, over, or under another layer may be directly in contact with the other layer or may have one or more intervening layers. Moreover, one layer disposed between two layers may be directly in contact with the two layers or may have one or more intervening layers. Similarly, unless explicitly stated otherwise, one feature disposed between two features may be in direct contact with the adjacent features or may have one or more intervening layers.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion.

Reference throughout this specification to "one embodiment," "an embodiment," or "some embodiments" means that a particular feature, structure, or characteristic described in connection with the embodiment is included in at least one embodiment. Thus, the appearances of the phrase "in one embodiment," "in an embodiment," or "in some embodiments" in various places throughout this specification are not necessarily all referring to the same embodiment. In addition, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Also, the terms "first," "second," "third," "fourth," etc. as used herein are meant as labels to distinguish among different elements and can not necessarily have an ordinal meaning according to their numerical designation. When the term "about," "substantially," or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. An animal washing system comprising:
   an enclosure structure comprising a plurality of walls and a base, one or more of the plurality of walls being pivotably coupled to a first portion of the base, the plurality of walls and the base forming an interior volume, wherein an animal is to be located at least partially in the interior volume, wherein the plurality of walls are configured to slide towards the first portion of the base to overlap each other and pivot to be disposed in a recess formed by the base;
   a plurality of spray devices coupled to the enclosure structure, wherein the plurality of spray devices are configured to wash the animal;
   a plurality of valves, wherein each valve is configured to selectively provide fluid to a corresponding spray device of the plurality of spray devices to wash the animal; and
   a controller configured to selectively actuate each valve of the plurality of valves to wash the animal.

2. The animal washing system of claim 1, wherein the plurality of spray devices comprise:
   an upper spray device coupled to an upper wall of the enclosure structure;
   a first side spray device coupled to a first side wall of the enclosure structure;
   a second side spray device coupled to a second side wall of the enclosure structure; and
   a bottom spray device coupled to a bottom wall of the enclosure structure.

3. The animal washing system of claim 1, wherein the plurality of spray devices comprises a hand sprayer that is configured to be decoupled from the enclosure structure to wash the animal.

4. The animal washing system of claim 1 further comprising a temperature sensor configured to provide temperature data, and wherein the controller is configured to interrupt operation of the animal washing system responsive to the temperature data not meeting a threshold value.

5. The animal washing system of claim 1, wherein the controller is configured to simultaneously reduce first spray from a first spray device of the plurality of spray devices while increasing second spray from a second spray device of the plurality of spray devices.

6. The animal washing system of claim 1 further comprising a sensor configured to provide sensor data indicative of whether the animal is located within the enclosure structure, and wherein the controller is configured to prevent operation of the animal washing system responsive to the sensor data indicating the animal is not located within the enclosure structure.

7. The animal washing system of claim 1 further comprising wheels, wherein the animal washing system is portable via the wheels.

8. The animal washing system of claim 1 further comprising a protruding structure that extends from a lower interior surface of the enclosure structure to prevent mispositioning of the animal during washing of the animal.

9. The animal washing system of claim 1 further comprising a sensor configured to provide sensor data indicative of fluid pressure provided to the animal washing system, and wherein the controller is to selectively activate each valve based on the fluid pressure.

10. The animal washing system of claim 1 further comprising a fluid reservoir, wherein water from a water source is to mix with a cleaning fluid from the fluid reservoir to provide a fluid mixture through the plurality of spray devices to wash the animal.

11. The animal washing system of claim 1, wherein the enclosure structure forms an opening, wherein a head of the animal is to extend through the opening, wherein the animal washing system further comprises a tray located proximate the opening, and wherein the tray is configured to support consumables for consumption by the animal.

12. The animal washing system of claim 1, wherein one or more of the plurality of spray devices are configured to impact an animal with a substantially vertical spray pattern and are configured to move the substantially vertical spray pattern in a substantially horizontal direction along a length of the animal.

13. An animal washing system comprising:
   an enclosure structure configured to at least partially enclose an animal located in an interior volume of the enclosure structure, the enclosure structure comprising:
      a base forming a recess; and
      a plurality of walls, wherein one or more of the plurality of walls are pivotably coupled to a first distal portion of the base, wherein the plurality of walls are configured to pivot to have an upper portion of the plurality of walls be above the base and the plurality of walls are configured to extend along a length of the base to a second distal portion of the base in a washing position, wherein the plurality of walls are configured to slide into each other and pivot into the recess formed by the base in a storage position; and
   a plurality of spray devices, wherein each of the plurality of spray devices is coupled to the base or a corresponding wall of the plurality of walls a surface of the enclosure structure.

14. The animal washing system of claim 13, wherein the plurality of spray devices comprises:
- a first spray device coupled to an upper wall of the plurality of walls;
- a second spray device coupled to a first side wall of the plurality of walls;
- a third spray device coupled to a second side wall of the plurality of walls; and
- a fourth spray device coupled to the base.

15. The animal washing system of claim 13 further comprising a tray pivotably coupled to one or more of the plurality of walls, and wherein the tray is configured to support consumables for consumption by the animal.

\* \* \* \* \*